(12) United States Patent
Terashita et al.

(10) Patent No.: US 12,429,734 B2
(45) Date of Patent: *Sep. 30, 2025

(54) LIQUID CRYSTAL DISPLAY DEVICE

(71) Applicant: Sharp Display Technology Corporation, Kameyama (JP)

(72) Inventors: Shinichi Terashita, Kameyama (JP); Kouichi Watanabe, Kameyama (JP); Takehisa Yoshida, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,437

(22) Filed: Jun. 18, 2024

(65) Prior Publication Data

US 2025/0028205 A1    Jan. 23, 2025

(30) Foreign Application Priority Data

Jul. 20, 2023   (JP) ................. 2023-118314

(51) Int. Cl.
*G02F 1/13363*     (2006.01)
*G02F 1/1333*      (2006.01)
(Continued)

(52) U.S. Cl.
CPC .... *G02F 1/133638* (2021.01); *G02F 1/13338* (2013.01); *G02F 1/13363* (2013.01);
(Continued)

(58) Field of Classification Search
CPC ......... G02F 1/133638; G02F 1/134363; G02F 1/134372; G02F 1/133553; G02F 2203/02; G02F 1/1398

See application file for complete search history.

(56) References Cited

U.S. PATENT DOCUMENTS 7,106,400 B1     9/2006  Tsuda et al.
12,204,193 B1 *  1/2025  Terashita ............ G02F 1/13706
(Continued)

FOREIGN PATENT DOCUMENTS

JP           3394926 B2    4/2003
JP        2012-134475 A    7/2012
(Continued)

*Primary Examiner* — Alexander P Gross
(74) *Attorney, Agent, or Firm* — ScienBiziP, P.C.

(57) ABSTRACT

A liquid crystal display device includes a first substrate, a liquid crystal layer, a second substrate, a retardation layer, and a polarizer in this order from a back face side, and includes a plurality of pixels arrayed in a matrix shape, in which the first substrate includes a reflective layer that reflects light, a first electrode and a second electrode that are capable of generating a transverse electrical field in the liquid crystal layer, and a first horizontal alignment film that is in contact with the liquid crystal layer, the second substrate includes a second horizontal alignment film in contact with the liquid crystal layer, the retardation layer includes a λ/4 plate and a λ/2 plate, the liquid crystal layer includes a positive-type liquid crystal material or a negative-type liquid crystal material, and has a twist alignment when no voltage is applied, and an angle formed by a polarization axis of the polarizer and an alignment direction of liquid crystal molecules defined by the first horizontal alignment film is within a predetermined range.

16 Claims, 60 Drawing Sheets

(51) Int. Cl.
*G02F 1/1337* (2006.01)
*G02F 1/1343* (2006.01)
*G02F 1/139* (2006.01)

(52) U.S. Cl.
CPC ............ *G02F 1/133723* (2013.01); *G02F 1/134318* (2021.01); *G02F 1/134363* (2013.01); *G02F 1/134372* (2021.01); *G02F 1/1398* (2021.01); *G02F 2201/123* (2013.01); *G02F 2203/02* (2013.01); *G02F 2413/02* (2013.01)

(56) References Cited

U.S. PATENT DOCUMENTS

| | | | |
|---|---|---|---|
| 2009/0284693 A1* | 11/2009 | Adachi | G02F 1/134363 349/98 |
| 2012/0138922 A1 | 6/2012 | Yamazaki et al. | |
| 2013/0214273 A1 | 8/2013 | Yamazaki et al. | |
| 2013/0320334 A1 | 12/2013 | Yamazaki et al. | |
| 2014/0125933 A1 | 5/2014 | Tamaki | |
| 2014/0183532 A1 | 7/2014 | Yamazaki et al. | |
| 2014/0286076 A1 | 9/2014 | Aoki et al. | |
| 2015/0179805 A1 | 6/2015 | Yamazaki et al. | |
| 2016/0240694 A1 | 8/2016 | Yamazaki et al. | |
| 2016/0266438 A1* | 9/2016 | Takahashi | G02F 1/133553 |
| 2017/0033229 A1 | 2/2017 | Yamazaki et al. | |
| 2017/0309751 A1 | 10/2017 | Yamazaki et al. | |
| 2017/0309754 A1 | 10/2017 | Yamazaki et al. | |
| 2018/0308989 A1 | 10/2018 | Yamazaki et al. | |
| 2021/0159345 A1 | 5/2021 | Yamazaki et al. | |

FOREIGN PATENT DOCUMENTS

| | | |
|---|---|---|
| JP | 2014-007399 A | 1/2014 |
| JP | 2014-209727 A | 11/2014 |
| JP | 5767195 B2 | 8/2015 |

* cited by examiner

FIG. 42B

LIQUID CRYSTAL DISPLAY DEVICE

CROSS-REFERENCE TO RELATED APPLICATIONS

This application claims the benefit of priority to Japanese Patent Application Number 2023-118314 filed on Jul. 20, 2023. The entire contents of the above-identified application are hereby incorporated by reference.

BACKGROUND

Technical Field

The disclosure described below relates to a liquid crystal display device.

Liquid crystal display devices, which utilize a liquid crystal material to function as a display device, are generally classified into transmissive liquid crystal display devices and reflective liquid crystal display devices depending on a display method. The transmissive liquid crystal display devices are devices that perform display in a transmission mode in which transmitted light from backlight on the back face of a screen is used, and the reflective liquid crystal display devices are devices that perform display in a reflection mode in which external light (also referred to as ambient light) instead of the backlight is used. For a display device having such characteristics, a transflective liquid crystal display device has been proposed in which each pixel has a region for performing display in the transmission mode and a region for performing display in the reflection mode (see, for example, JP 5767195 B).

Liquid crystal display devices may be roughly classified according to a liquid crystal driving method. For example, a vertical electrical field mode liquid crystal display device in which a liquid crystal layer is driven by an electrical field in a direction substantially perpendicular to a substrate plane to perform display and a transverse electrical field mode liquid crystal display device in which a liquid crystal layer is driven by an electrical field in a direction substantially parallel to a substrate plane to perform display are known. Examples of the vertical electrical field mode include a Twisted Nematic (TN) mode and a Multi-domain Vertical Alignment (MVA) mode, and examples of the transverse electrical field mode include an In-plane Switching (IPS) mode and a Fringe Field Switching (FFS) mode.

SUMMARY

In recent years, liquid crystal display devices used in smartphones, tablets, and the like have usually been provided with a touch sensor function. Various types of touch sensors are known, such as a resistive film type, a capacitive type, and an optical type. A liquid crystal display device provided with a touch sensor (also referred to as a touch panel) is categorized into a type in which the touch sensor is externally attached (external type) and a type in which the touch sensor is built in (built-in type). The built-in type touch panel is more advantageous than the external type touch panel in terms of frame narrowing, thickness reduction, weight reduction, and the like, and also has an advantage in that the light transmittance can be increased.

There are two types of built-in type touch panels, that is, on-cell types and in-cell types. The cell means a display panel (also referred to as a liquid crystal panel) including an active matrix substrate represented by a thin film transistor (TFT) substrate, a counter substrate disposed so as to face the substrate, and a liquid crystal layer held between the substrates. In general, in the in-cell type, a layer having a touch sensor function is disposed in the display panel, and in the on-cell type, the layer having a touch sensor function is disposed between the display panel and a polarizer provided on an observation face side of the display panel. The in-cell type can in principle realize the thinnest and lightest touch panel. In addition, liquid crystal display devices capable of performing display in the reflection mode are suitable for outdoor use, and thus, there is a need for in-cell type touch panels capable of performing display in the reflection mode, but such touch panels have not yet been realized.

A reason why such a touch panel has not been realized is considered to be due to the fact that in current reflective liquid crystal display devices, one of a pair of electrodes (also called a counter electrode or a common electrode) for applying a voltage to the liquid crystal layer is placed on the counter substrate side. Consequently, the inventors have considered that, since both of a pair of electrodes are provided only on an active matrix substrate side for a transverse electrical field mode such as an FFS mode, an in-cell type touch panel capable of performing display in a reflection mode can be realized. However, as a result of further studies, it has been found that even when a transverse electrical field mode of the related art is simply adopted for a reflective liquid crystal display device, a reflectance is low, for example, approximately 60% of a reflectance in a case where a VA mode, which is a type of a vertical electrical field mode, is adopted. When a reflectance is low in this manner, a contrast ratio decreases, and thus it is considered that the reflective liquid crystal display device cannot be practically used as an in-cell type touch panel.

Consequently, the inventors have, through ardent research, found that a liquid crystal display device is useful as an in-cell type touch panel, which is a transverse electrical field mode liquid crystal display device, capable of improving a contrast ratio and performing display in a reflection mode when the liquid crystal display device is configured to include a first substrate, a liquid crystal layer, a second substrate, a retardation layer, and a polarizer in this order from a back face side and to include a plurality of pixels arrayed in a matrix shape, the liquid crystal display device being configured such that the first substrate includes a reflective layer that reflects light, a first electrode and a second electrode that are capable of generating a transverse electrical field in the liquid crystal layer, and a first horizontal alignment film that is in contact with the liquid crystal layer, the second substrate includes a second horizontal alignment film that is in contact with the liquid crystal layer, and the liquid crystal layer takes a twist alignment when no voltage is applied. However, it has been found that this device has a new problem of high cost because a special retardation plate is preferably adopted as a retardation layer. In order to achieve cost reduction in an optical film field, it is conceivable to use a film having a large amount of production and circulation, to reduce a material loss, or to improve productivity.

The disclosure has been made in view of the above-described current situation, and an object thereof is to provide a liquid crystal display device that is useful as an in-cell type touch panel capable of improving a contrast ratio at a low cost and performing display in a reflection mode.

(1) One embodiment of the disclosure is a liquid crystal display device that includes a first substrate, a liquid crystal layer, a second substrate, a retardation layer, and a polarizer in this order from a back face side, the liquid crystal display device including a plurality of pixels arrayed in a matrix shape, in which the first substrate includes a reflective layer that reflects light, a first electrode and a second electrode configured to generate a transverse electrical field in the liquid crystal layer, and a first horizontal alignment film that is in contact with the liquid crystal layer, the second substrate includes a second horizontal alignment film in contact with the liquid crystal layer, the retardation layer includes a λ/4 plate and a λ/2 plate, the liquid crystal layer includes a positive-type liquid crystal material or a negative-type liquid crystal material, and has a twist alignment when no voltage is applied, an angle formed by a polarization axis of the polarizer and an alignment direction of liquid crystal molecules defined by the first horizontal alignment film is 63.5° or more and 71.5° or less when the liquid crystal layer includes the positive-type liquid crystal material, and an angle formed by the polarization axis of the polarizer and the alignment direction of the liquid crystal molecules defined by the first horizontal alignment film is 20.5° or more and 26° or less when the liquid crystal layer includes the negative-type liquid crystal material.

(2) Further, in the liquid crystal display device according to a certain embodiment of the disclosure, in addition to the configuration of (1) described above, the retardation layer further includes a positive C plate.

(3) Further, in the liquid crystal display device according to a certain embodiment of the disclosure, in addition to the configuration of (2) described above, the positive C plate is located between the λ/4 plate and the λ/2 plate.

(4) Further, in the liquid crystal display device according to a certain embodiment of the disclosure, in addition to the configuration of (2) or (3) described above, an absolute value of a thickness direction retardation Rth (nm) of the positive C plate is 150 nm to 270 nm.

(5) Further, in the liquid crystal display device according to a certain embodiment of the disclosure, in addition to the configuration of (2), (3) or (4) described above, the retardation layer further includes a second positive C plate, and the second positive C plate is located between the λ/2 plate and the polarizer.

(6) Further, in the liquid crystal display device according to a certain embodiment of the disclosure, in addition to the configuration of (5) described above, an absolute value of a thickness direction retardation Rth (nm) of the second positive C plate is 50 nm to 130 nm.

(7) Further, in the liquid crystal display device according to a certain embodiment of the disclosure, in addition to the configuration of (1), (2), (3), (4), (5), or (6) described above, a twist angle of the liquid crystal layer when no voltage is applied is 70° or more and 85 or less.

(8) Further, in the liquid crystal display device according to a certain embodiment of the disclosure, in addition to the configuration of (1), (2), (3), (4), (5), (6), or (7) described above, when the liquid crystal layer includes the positive-type liquid crystal material, a product (dΔn) of a thickness d of the liquid crystal layer and a birefringence index Δn of the liquid crystal material is 218 nm or more and 255 nm or less.

(9) Further, in the liquid crystal display device according to a certain embodiment of the disclosure, in addition to the configuration of (1), (2), (3), (4), (5), (6), (7), or (8) described above, when the liquid crystal layer includes the positive-type liquid crystal material, an angle formed by an in-plane slow axis of the λ/2 plate and an alignment direction of a liquid crystal material defined by the first horizontal alignment film is 47.5° or more and 52.5° or less.

(10) Further, in the liquid crystal display device according to a certain embodiment of the disclosure, in addition to the configuration of (1), (2), (3), (4), (5), (6), (7), (8), or (9) described above, when the liquid crystal layer includes the negative-type liquid crystal material, a product (dΔn) of a thickness d of the liquid crystal layer and a birefringence index Δn of the liquid crystal material is 230 nm or more and 260 nm or less.

(11) Further, in the liquid crystal display device according to a certain embodiment of the disclosure, in addition to the configuration of (1), (2), (3), (4), (5), (6), (7), (8), (9), or (10) described above, when the liquid crystal layer includes the negative-type liquid crystal material, an angle formed by an in-plane slow axis of the λ/2 plate and an alignment direction of a liquid crystal material defined by the first horizontal alignment film is 38.5° or more and 42.5° or less.

(12) Further, in the liquid crystal display device according to a certain embodiment of the disclosure, in addition to the configuration of (1), (2), (3), (4), (5), (6), (7), (8), (9), (10), or (11) described above, at least one of the first electrode and the second electrode includes a plurality of strip portions and a slit located between two strip portions adjacent to each other among the plurality of strip portions.

(13) Further, in the liquid crystal display device according to a certain embodiment of the disclosure, in addition to the configuration of (1), (2), (3), (4), (5), (6), (7), (8), (9), (10), (11), or (12) described above, the liquid crystal layer is a single domain alignment.

(14) Further, in the liquid crystal display device according to a certain embodiment of the disclosure, in addition to the configuration of (1), (2), (3), (4), (5), (6), (7), (8), (9), (10), (11), (12), or (13) described above, display is performed in a normally black mode.

(15) Further, in the liquid crystal display device according to a certain embodiment of the disclosure, in addition to the configuration of (1), (2), (3), (4), (5), (6), (7), (8), (9), (10), (11), (12), (13), or (14) described above, one of the first electrode and the second electrode is a pixel electrode provided in each of the plurality of pixels and the other is a common electrode including a plurality of segments each configured to function as a touch sensor electrode, and the first substrate includes a plurality of touch wiring lines each connected to a corresponding one of the touch sensor electrodes.

(16) Further, in the liquid crystal display device according to a certain embodiment of the disclosure, in addition to the configuration of (1), (2), (3), (4), (5), (6), (7), (8), (9), (10), (11), (12), (13), (14), or (15) described above, the first substrate includes a thin film transistor provided in each of the plurality of pixels and including an oxide semiconductor layer, and the oxide semiconductor layer includes an In—Ga—Zn—O-based semiconductor.

(17) Further, in the liquid crystal display device according to a certain embodiment of the disclosure, in addition to the configuration of (1), (2), (3), (4), (5), (6), (7), (8), (9), (10), (11), (12), (13), (14), (15), or (16), the liquid crystal display device further includes a light source.

According to the disclosure, it is possible to provide a liquid crystal display device that is useful as an in-cell type touch panel capable of improving a contrast ratio at a low cost and performing display in a reflection mode.

BRIEF DESCRIPTION OF DRAWINGS

The disclosure will be described with reference to the accompanying drawings, wherein like numbers reference like elements.

FIG. 6 is also a diagram conceptually showing settings of an optical axis according to Example 1.

FIG. 11 is also a diagram conceptually showing settings of an optical axis according to Example 3.

FIG. 42B is a diagram showing results in Examples 8 and 9.

DESCRIPTION OF EMBODIMENTS

Definition of Terms

Figure 1:
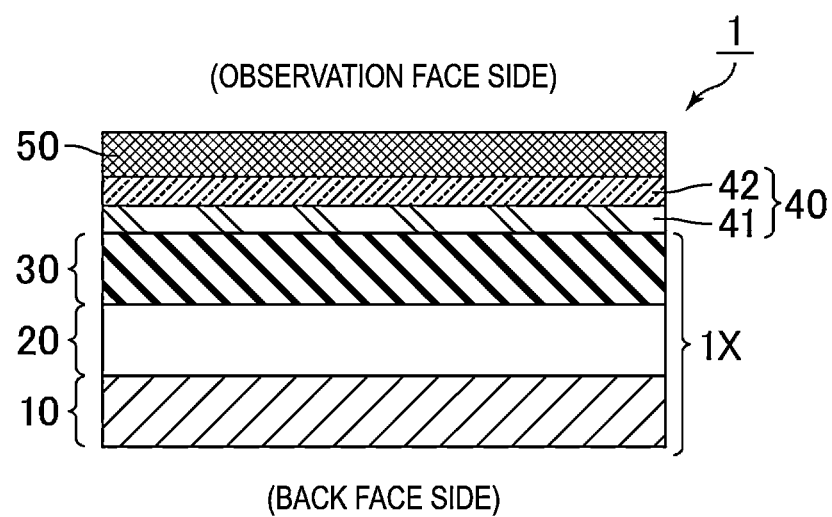
FIG. 1 is a schematic cross-sectional view of a liquid crystal display device 1 according to an example of a first embodiment.

In the present specification, an observation face side means a side closer to a screen (display surface) of a liquid crystal display device, and a back face side means a side farther from the screen (display surface) of the liquid crystal display device.

A voltage non-applied state means a state in which a voltage applied to a liquid crystal layer is less than a threshold voltage (including no voltage application). A voltage applied state means a state in which a voltage applied to the liquid crystal layer is a threshold voltage or higher. In the present specification, the voltage non-applied state is also referred to as "when no voltage is applied", and the voltage applied state is also referred to as "when a voltage is applied".

A polar angle means an angle formed between a subject direction (for example, a measurement direction) and a normal direction of the screen of the liquid crystal panel. An azimuthal direction means a direction when the subject direction is projected onto the screen of the liquid crystal panel, and is expressed by an angle (azimuth angle) formed between the subject direction and a reference azimuthal direction. Here, the reference azimuthal direction (0°) is set to a horizontal right direction of the screen of the liquid crystal panel. In the angle and the azimuth angle, a positive angle is counterclockwise from the reference azimuthal direction, and a negative angle is clockwise from the reference azimuthal direction. Counterclockwise and clockwise both represent the rotation direction when the screen of the liquid crystal panel is viewed from the observation face side (front). In addition, the angle represents a value measured in a state where the screen of the liquid crystal panel is viewed in a plan view, and means an acute angle unless the rotation direction or the like is specified.

An axial azimuthal direction of the optical film means an azimuthal direction of a polarization axis of a polarizer in a case of the polarizer, and means an azimuthal direction of a slow axis in a case of a retardation layer. The polarization axis of the polarizer means an absorption axis in a case of an absorption-type polarizer, and means a reflection axis in a case of a reflection-type polarizer. The axial azimuthal direction of the retardation layer means an azimuthal direction of an in-plane slow axis of the retardation layer unless otherwise specified.

The retardation layer means a layer in which at least one of an in-plane retardation (also referred to as an in-plane phase difference) Re and a thickness direction retardation (also referred to as a thickness direction phase difference) Rth has a value of 10 nm or more. Preferably, the retardation layer has a value of 20 nm or more. In the present specification, numerical values described herein as Re and Rth are absolute values unless otherwise specified.

The in-plane retardation Re is defined as Re=(nx−ny)×d.
The thickness direction retardation Rth is defined as Rth={nz−(nx+ny)/2}×d.

nx represents a principal refractive index in an in-plane slow axis direction of each retardation layer.

ny represents a principal refractive index in an in-plane fast axis direction of each retardation layer.

nz represents a principal refractive index in a direction perpendicular to a plane of each retardation layer.

The slow axis direction is an azimuthal direction in which the refractive index is maximized, and the fast axis direction is an azimuthal direction in which the refractive index is minimized. d represents a thickness of the retardation layer.

An A plate is a retardation plate satisfying "nx>ny≈nz".

Among C plates, a positive C plate (also referred to as a +C plate) is a retardation plate satisfying "nz>nx≈ny" and has a positive value of Rth. The negative C plate (also referred to as —C-plate) is a retardation plate satisfying "nz<nx≈ny", and has a negative value of Rth.

A measurement wavelength for an optical parameter such as a refractive index and a retardation is 550 nm unless otherwise specified.

Being substantially parallel means that an angle (absolute value) formed between two lines is within a range of 0°±10°, and such an angle is preferably within a range of 0°±5°, and more preferably 0° (that is, being parallel in a narrow sense is meant). In addition, being substantially orthogonal (or being substantially perpendicular) means that an angle (absolute value) formed between two lines is within a range of 90°±10°, preferably within a range of 90°±5°, and more preferably 90° (that is, being orthogonal or perpendicular in a narrow sense is meant).

A liquid crystal display device according to embodiments of the disclosure will be described below. The disclosure is not limited to the contents described in the following embodiments, and design changes can be made as appropriate within the scope that satisfies the configuration of the disclosure.

First Embodiment

Figure 2:
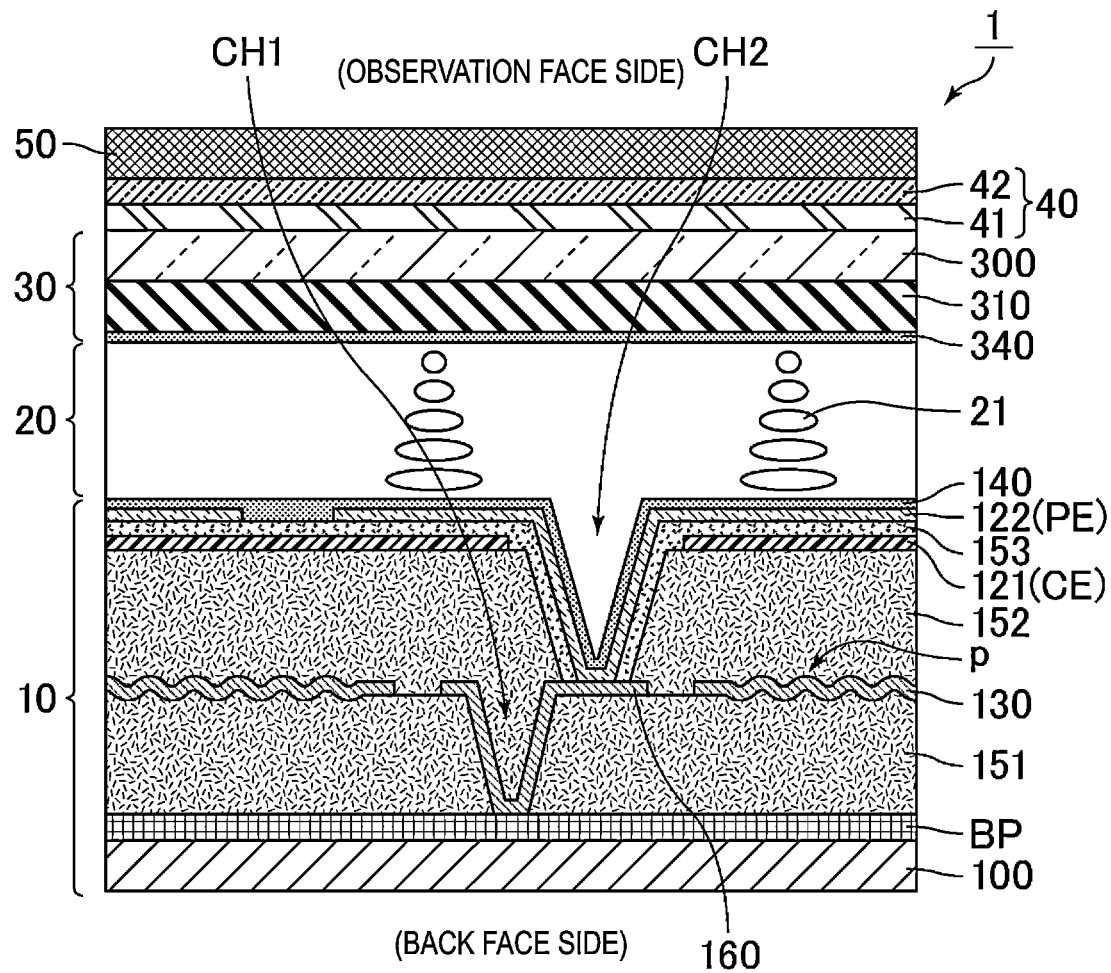
FIG. 2 is a schematic cross-sectional view showing more specifically the liquid crystal display device 1 according to an example of the first embodiment.
Figure 3:
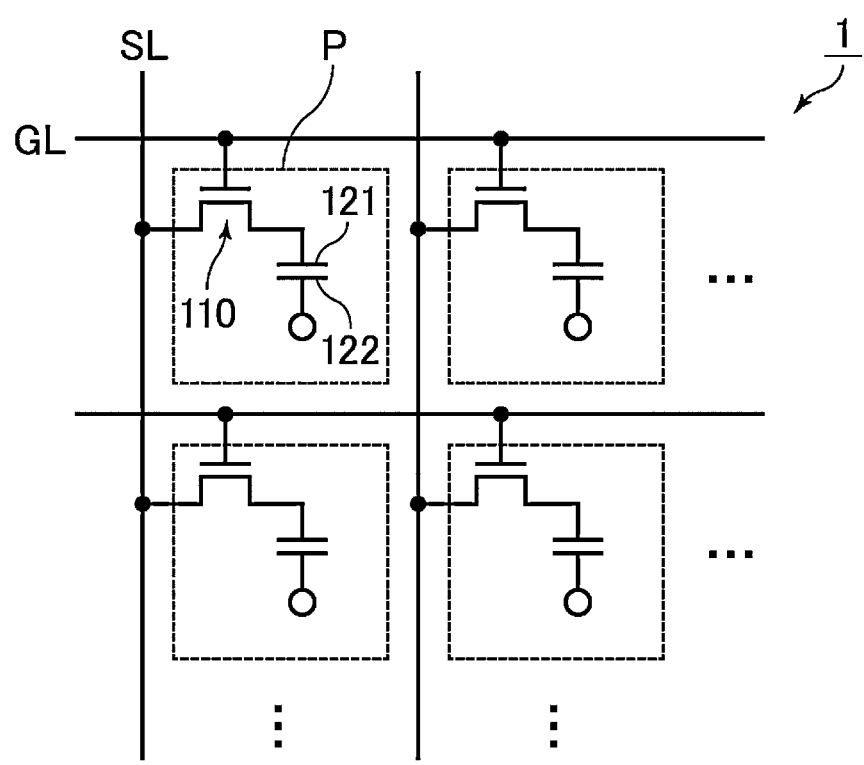
FIG. 3 is a schematic plan view of the entire liquid crystal display device 1 according to an example of the first embodiment, when viewed from an observation face side.

FIG. 1 is a schematic cross-sectional view of a liquid crystal display device 1 according to an example of the present embodiment, and FIG. 2 is a schematic cross-sectional view showing more specifically the liquid crystal display device 1 according to an example of the present embodiment. FIG. 3 is a schematic plan view obtained when a whole of the liquid crystal display device 1 according to an example of the present embodiment is viewed from an observation face side. As shown in FIG. 1, the liquid crystal display device 1 includes a first substrate 10, a liquid crystal layer 20, a second substrate 30, a retardation layer 40, and a polarizer 50, in order from a back face side. In the present embodiment, a TFT substrate is used as the first substrate 10. A portion or a structural body including a structure in which the liquid crystal layer 20 is interposed between the first substrate 10 and the second substrate 30 is also referred to as a liquid crystal panel 1X.

The liquid crystal display device 1 includes a plurality of pixels P arrayed in a matrix shape, as shown in FIG. 3. Although the plurality of pixels P typically include three types of pixels, that is, a red pixel, a green pixel, and a blue pixel, the number of types of pixels may be two or less or four or more. Each pixel P includes a thin film transistor (TFT) 110 and a first electrode 121 and a second electrode 122 that are capable of generating a transverse electrical field in the liquid crystal layer 20. A gate electrode of the TFT 110 is electrically connected to a corresponding gate wiring line (also referred to as a scanning wiring line) GL, and a source electrode of the TFT 110 is electrically connected to a corresponding source wiring line (also referred to as a signal wiring line) SL. A drain electrode of the TFT 110 is electrically connected to the second electrode 122.

First Substrate

As shown in FIG. 2, the first substrate 10 includes a reflective layer 130 that reflects light, the first electrode 121, the second electrode 122, and a first horizontal alignment film 140 in contact with the liquid crystal layer 20 in order from the back face side to the observation face side. It is preferable that the first substrate 10 further include a support substrate 100 and a backplane circuit BP on the back face side of the reflective layer 130. If necessary, an insulating layer (also referred to as an insulating film) is provided between the layers and the like. For example, a first interlayer insulating layer 151 is provided so as to cover the backplane circuit BP, a second interlayer insulating layer 152 is provided on the first interlayer insulating layer 151 with a reflective layer 130 interposed therebetween, and a dielectric layer (also referred to as a third interlayer insulating layer) 153 is provided between the first electrode 121 and the second electrode 122.

The support substrate 100 is preferably transparent and has an insulating property, and examples of the support substrate 100 include a glass substrate and a plastic substrate.

The backplane circuit BP is provided on the support substrate 100. The backplane circuit BP is a circuit for driving the plurality of pixels P, and includes the TFT 110, a gate wiring line GL, and a source wiring line SL. Usually, the backplane circuit BP also includes a gate insulating film.

The TFT 110 is provided in each of the plurality of pixels P. Each TFT 110 suitably includes an oxide semiconductor layer as an active layer (and is also referred to as an oxide semiconductor TFT). The oxide semiconductor contained in the oxide semiconductor layer has recently attracted attention as an active layer material that may replace amorphous silicon or polycrystalline silicon, and has higher mobility than amorphous silicon. Thus, the oxide semiconductor TFT is capable of operating faster than amorphous silicon TFT. Further, since the oxide semiconductor layer is formed by a process simpler than that for the polycrystalline silicon layer, the oxide semiconductor layer can be applied to a device that requires a large area.

Since the oxide semiconductor TFT has excellent off-leakage characteristics, a driving method can be used that performs display with a reduced rewriting frequency of an image. For example, when displaying a still image, the oxide semiconductor TFT can be operated so that the image data is rewritten at a frequency of once per second. Such a driving method is called pause driving or low frequency driving, and allows for significant reduction of a power consumption of the liquid crystal display device. By adopting the pause driving and performing touch detection in a period in which rewriting of an image is not performed, it is possible to suppress a decrease in the sensitivity of a touch operation due to noise from the drive circuit and to increase an S/N ratio (signal-to-noise ratio) to approximately 10 times that in the related art, for example.

The oxide semiconductor TFT is also advantageous in reducing a size of the TFT, and thus, a configuration in which a memory circuit is provided for each pixel P (also referred to as MIP (Memory In Pixels)) can be suitably realized.

The oxide semiconductor may be an amorphous oxide semiconductor or a crystalline oxide semiconductor including a crystalline portion. Examples of the crystalline oxide semiconductor include a polycrystalline oxide semiconductor, a microcrystalline oxide semiconductor, or a crystalline oxide semiconductor having a c-axis oriented substantially perpendicular to a layer surface.

The oxide semiconductor layer may be a single layer, or may have a layered structure including two or more layers. The oxide semiconductor layer having a layered structure may include an amorphous oxide semiconductor layer and a crystalline oxide semiconductor layer, may include a plurality of crystalline oxide semiconductor layers with different crystal structures, and may include a plurality of amorphous oxide semiconductor layers. When the oxide semiconductor layer has a dual-layer structure including an upper layer and a lower layer, an energy gap of the oxide semiconductor included in the lower layer and an energy gap of the oxide semiconductor included in the upper layer may be different.

Materials, structures, and film formation methods of an amorphous oxide semiconductor and the above-described crystalline oxide semiconductors, a configuration of an oxide semiconductor layer having a layered structure, and the like are described in, for example, JP 2014-007399 A. The entire contents of the disclosure of JP 2014-007399 A are incorporated herein by reference.

Specifically, the oxide semiconductor layer suitably contains at least one metal element among In (indium), Ga (gallium), and Zn (zinc). In particular, an oxide semiconductor film containing a ternary oxide of In, Ga, and Zn is more preferable. A preferable example of the ternary oxide of In, Ga, and Zn is indium gallium zinc oxide. A semiconductor containing a ternary oxide of In, Ga, and Zn is called an In—Ga—Zn—O-based semiconductor, but in such a semiconductor, a proportion (composition ratio) of In, Ga, and Zn is not particularly limited, and for example, In:Ga:Zn=2:2:1, In:Ga:Zn=1:1:1, In:Ga:Zn=1:1:2, and the like may be adopted.

The In—Ga—Zn—O-based semiconductor may be amorphous or crystalline. In the crystalline In—Ga—Zn—O-based semiconductor, a c-axis is suitably oriented approximately perpendicular to a layer plane.

The crystal structure of the crystalline In—Ga—Zn—O-based semiconductor is disclosed in, for example, JP 2014-007399 A, JP 2012-134475 A, and JP 2014-209727 A. The entire contents of the disclosure of JP 2012-134475 A and JP 2014-209727 A are incorporated herein by reference. The TFT having the In—Ga—Zn—O-based semiconductor layers, which has high mobility (more than 20 times compared to a-Si TFT) and a low leakage current (less than 1/100 compared to a-Si TFT), is suitably used as a drive TFT (for example, a TFT included in a drive circuit provided around a display region including a plurality of pixels on the same substrate as the display region) and a pixel TFT (TFT provided in a pixel).

The oxide semiconductor layer may include an oxide semiconductor other than the In—Ga—Zn—O-based semiconductor. Examples include a ternary oxide of In, Sn (tin), and Zn, and preferred examples include $In_2O_3$—$SnO_2$—ZnO; InSnZnO. A semiconductor including a ternary oxide of In, Sn, and Zn is referred to as an In—Sn—Zn—O-based semiconductor. Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, and an In—Ga—Zn—Sn—O based semiconductor.

The first interlayer insulating layer 151 is provided so as to cover the backplane circuit BP. A surface of the first interlayer insulating layer 151 on a reflective layer 130 side preferably has an uneven shape (also referred to as an uneven surface structure). Accordingly, the reflective layer 130 is capable of having an uneven surface structure reflecting such an uneven shape. The first interlayer insulating layer 151 having an uneven surface structure may be suitably formed by using a photosensitive resin, for example, as described in JP 3394926 B.

The reflective layer (also referred to as a reflective film) 130 is provided on the first interlayer insulating layer 151. The reflective layer 130 is formed from a material that reflects light. In particular, the reflective layer is preferably formed of a metal material having high reflectivity. Examples of the material of the reflective layer 130 include a silver alloy and an aluminum alloy.

The reflective layer 130 preferably has an uneven shape reflecting the uneven surface structure preferably provided in the first interlayer insulating layer 151. That is, the reflective layer 130 also suitably has the uneven surface structure. Such an uneven surface structure is also called MRS (Micro Reflective Structure), and is provided to diffusely reflect ambient light and realize a white display close to paper white. The uneven surface structure is preferably configured of a plurality of protruding portions p randomly arranged, for example, such that a center interval between the adjacent protruding portions p is 5 μm or more and 50 μm or less. The center interval between the adjacent protruding portions p is more preferably 10 μm or more and 20 μm or less. Suitably, a shape of each protruding portion p is substantially circular or substantially polygonal when viewed from a normal direction of the support substrate. An area of the protruding portion p occupying one pixel P is preferably approximately 20 to 40%, for example, and a height of the protruding portion p is preferably 1 μm or more and 5 μm or less, for example.

The second interlayer insulating layer 152 is provided on the first interlayer insulating layer 151 so as to cover the reflective layer 130. That is, between the first interlayer insulating layer 151 and the second interlayer insulating layer 152, the reflective layer 130 is disposed.

Here, the first interlayer insulating layer 151 and the second interlayer insulating layer 152 are preferably formed of an organic insulating material or an inorganic insulating material. Examples of the organic insulating film obtained by using the organic insulating material include an organic film (relative dielectric constant ε=2 to 5) such as acrylic resin, polyimide resin, and novolac resin, and layered bodies thereof. A film thickness of the organic insulating film is not particularly limited, but is 2 μm or more and 4 μm or less, for example. Examples of the inorganic insulating films obtained by using the inorganic insulating material include an inorganic film (relative dielectric constant ε=5 to 7) such as silicon nitride (SiNx) and silicon oxide ($SiO_2$), and a layered film thereof. A film thickness of the inorganic insulating film is not particularly limited, but is 1500 Å or greater and 3500 Å or less, for example. Alternatively, a layered body of the organic insulating film and the inorganic insulating film may be used. In particular, the first interlayer insulating layer 151 and the second interlayer insulating layer 152 are suitably an organic insulating film.

From the viewpoint of manufacturing, the interlayer insulating layers 151 and 152 suitably have high transparency, and are preferably formed of the same material having a high transmittance. In addition, the first interlayer insulating layer 151 farther from the observation face side than the reflective layer 130 may have a low transmittance or may be opaque. From the viewpoint of light use efficiency, the second interlayer insulating layer 152 may have a high transmittance or may be formed of a material having a high transmittance different from that of the first interlayer insulating layer 151.

The first electrode 121 is disposed on the reflective layer 130 via the second interlayer insulating layer 152, and the dielectric layer 153 is disposed between the first electrode 121 and the second electrode 122. Thus, the reflective layer 130 is located on a side opposite to the liquid crystal layer 20 with respect to the first electrode 121 and the second electrode 122 (that is, on a side closer to the back face side with respect to the first electrode 121 and the second electrode 122). Regarding the first electrode 121 and the second electrode 122, in the present embodiment, the second electrode 122 is located relatively on the observation face side, and the first electrode 121 is located on the back face side. An electrode located relatively on the observation face side is also referred to as an upper layer electrode, and an electrode located relatively on the back face side is also referred to as a lower layer electrode.

One of the first electrode 121 and the second electrode 122 is a pixel electrode PE, and the other is a common electrode CE. A pixel electrode is provided for each of the plurality of pixels P. The pixel electrode is electrically connected to the backplane circuit BP. In the present embodiment, the first electrode 121 (lower layer electrode) is the common electrode CE, and the second electrode 122 (upper layer electrode) is the pixel electrode PE.

It is suitable that at least one of the first electrode 121 and the second electrode 122 include a plurality of strip portions SP and a slit S1 positioned between two adjacent strip portions among the plurality of strip portions. Each strip portion SP corresponds to an electrode portion, and the slit S1 corresponds to an opening portion. Such an electrode is also referred to as a slit electrode or a finger electrode. From the viewpoint of easily generating a transverse electrical field, it is suitable that at least the upper layer electrode (pixel electrode PE in the present embodiment) be a slit electrode. In such a case, the lower layer electrode (common electrode CE in the present embodiment) may be a planar electrode, that is, a so-called solid electrode, or may be a slit electrode.

It is preferable that extension directions of the plurality of strip portions SP constituting the slit electrode be substantially parallel to each other. Further, it is suitable that they have a linear shape extending in the same direction. The linear shape means that not the outer edge of the strip portion SP but the center line of the strip portion SP has a linear shape, and the center line of the strip portion SP means a line bisecting the strip portion SP in the width direction. The width direction means a direction substantially perpendicular to a direction in which the strip portions SP extend in a plan view. The strip portion SP may have a bent portion (also referred to as a kink portion) in the middle (for example, an end portion) thereof, but preferably does not have a bent portion.

The extension direction of the plurality of strip portions SP may be different for each pixel, but are preferably the same in two or more adjacent pixels. In particular, it is most preferable that the extension direction be the same in all of the pixels in terms of maximizing display performance.

Further, in a plan view, an angle (this angle is also referred to as a finger angle) formed by an alignment orientation of the liquid crystal molecules 21 defined by the first horizontal alignment film 140 and the direction in which the plurality of strip portions SP extend may be 0° or may be more than 0° and 30° or less. An aspect in which the finger angle is 0° is an aspect in which the alignment orientation of the liquid crystal molecules 21 defined by the first horizontal alignment film 140 is substantially parallel to the direction in which the plurality of strip portions SP extend. It is suitable to examine the finger angle also in consideration of a twist angle to be described later.

A width L of each strip portion SP varies depending on an applied voltage or the like, but is preferably 0.3 µm to 10 µm, for example. The width is more preferably 1 µm to 5 µm. An interval between the two strip portions SP adjacent to each other (that is, an interval between the center lines of the strip portions) also varies depending on an applied voltage or the like, but is preferably 0.3 µm to 10 µm, for example. The interval is more preferably 1 µm to 5 µm.

Incidentally, in the present embodiment, a configuration in which the pixel electrode PE is provided above the common electrode CE is described, but in a relatively large liquid crystal display device, that is, a liquid crystal display device in which the pixel P area is relatively large, the pixel electrode PE is preferably provided above the common electrode CE. In such a configuration (also referred to as a V2 structure), it is not necessary to form a slit in the common electrode CE serving as a lower layer electrode, and thus, as compared with a configuration in which the common electrode CE is provided above the pixel electrode PE (also referred to as a V3 structure), an increase in resistivity (sheet resistivity) of the common electrode CE is suppressed, and therefore, weakening of a fringe electrical field applied to the liquid crystal layer 20 is suppressed. In such a configuration (V2 structure), when the pixel electrode PE is a slit electrode, the resistivity of the pixel electrode PE increases, but since a voltage input from outside is applied to the pixel electrode PE, it is easy to reduce an influence caused due to the increase of the resistivity (that is, to suppress weakening of a fringe electrical field). In order to suppress the increase in the resistivity of the common electrode CE, it is possible to consider using a low resistance wiring line formed from a metal material (for example, connecting the low resistance wiring line to a common electrode), but in such a configuration, an adverse effect on the display due to specular reflection and the like resulting from the low resistance wiring line (for example, a glare, an iridescent diffraction, and an interference pattern) may occur, and it is necessary to block light with a black matrix, and the like, and a reflection aperture ratio may not be sufficiently improved.

In a configuration in which the pixel electrode PE is provided above the common electrode CE, the common electrode CE does not exist in a region where a second contact hole CH2 is formed, and thus, such a region no longer contributes to a reflective display, and as compared with a configuration in which the common electrode CE is provided above the pixel electrode PE, the reflectivity may be lower. The area of the region that does not contribute to the reflective display, such as the contact hole, is required to be of a certain size regardless of the size of the pixel P area. Thus, the proportion of the region that does not contribute to the reflective display in the pixel P increases as the pixel P area decreases (that is, as the definition increases), and the above-described decrease in the reflectivity becomes significant. Conversely, in a relatively large liquid crystal display device, it is easier to reduce a proportion occupied by a region not contributing to the reflective display within the pixel P, and therefore, it is easier to suppress the decrease in reflectivity described above. For these reasons, in a relatively large liquid crystal display device, it is advantageous to have a configuration in which the pixel electrode PE is provided above the common electrode CE.

On the other hand, as described above, the decrease in reflectivity due to the region where the second contact hole CH2 is formed not contributing to the reflective display increases as the pixel P area becomes smaller (that is, the higher the high definition becomes), and thus, in a liquid crystal display device having a relatively high-definition, that is, in a liquid crystal display device in which the pixel P area is relatively small, it is preferable that the common electrode CE be provided above the pixel electrode PE (see first modification example of a first embodiment described later).

Each of the first electrode 121 and the second electrode 122 is preferably formed of a transparent conductive material. Examples of the transparent conductive material include an indium tin oxide (ITO), an indium zinc oxide (IZO (registered trademark)), and a mixture thereof.

In an aspect shown in FIG. 2, the pixel electrode PE (second electrode 122 in the present embodiment) is electrically connected to the backplane circuit (more specifically, to a drain electrode of the TFT 110) via a contact electrode 160. The contact electrode 160 is formed in the same layer as the reflective film 130, and is formed of the same material (metal film and the like) as the reflective film 130. The first interlayer insulating layer 151 is formed with a first contact hole CH1 that exposes a part of the backplane circuit BP (more specifically, at least a part of the drain electrode of the TFT 110), and in the first contact hole CH1, the contact electrode 160 is connected to the backplane circuit BP. In addition, the second interlayer insulating layer 152 is formed with the second contact hole CH2 that exposes a part of the contact electrode 160, and the pixel electrode PE (second electrode 122 in the present embodiment) is connected to the contact electrode 160, in the second contact hole CH2.

The dielectric layer 153 is provided so as to cover the first electrode 121. The dielectric layer 153 is preferably formed of an inorganic insulating material. The inorganic insulating film obtained by using the inorganic insulating material has already been described above.

The first horizontal alignment film 140 is provided on the second electrode 122 and is in contact with the liquid crystal layer 20. Thus, it can be said that the first electrode 121 and the second electrode 122 are disposed between the second interlayer insulating layer 152 and the first horizontal alignment film 140.

The first horizontal alignment film 140 and a second horizontal alignment film 340 described later are each subjected to an alignment treatment, and define the alignment orientation (also referred to as an alignment direction) of the liquid crystal molecules 21 included in the liquid crystal layer 20. For example, the alignment treatment is preferably performed by optical alignment treatment or rubbing treatment. In the optical alignment treatment, a photo-decomposition type optical alignment film material can be used, and in the rubbing treatment, an alignment film material such as polyimide is preferably used.

Each of the first horizontal alignment film 140 and the second horizontal alignment film 340 is a horizontal alignment film that aligns the liquid crystal molecules 21 in a direction horizontal to the first substrate 10 and the second substrate 30, in a state where no voltage is applied to the liquid crystal layer 20. That is, the liquid crystal molecules 21 are horizontally oriented in a state where no voltage is applied to the liquid crystal layer 20. A pretilt angle is substantially 0°.

The alignment orientation of the liquid crystal molecules 21 defined by the first horizontal alignment film 140 and the alignment orientation of the liquid crystal molecules 21 defined by the second horizontal alignment film 340 are different from each other. Thus, the liquid crystal layer 20 takes a twist alignment when no voltage is applied (see FIG. 2). When a voltage is applied to the liquid crystal layer 20, that is, when a transverse electrical field is generated in the liquid crystal layer 20 by the first electrode 121 and the second electrode 122, an alignment state of the liquid crystal layer 20 is changed by the transverse electrical field (fringe electrical field).

Liquid Crystal Layer

The liquid crystal layer 20 is located between the first substrate 10 and the second substrate 30 and contains a positive-type liquid crystal material or a negative-type liquid crystal material. The positive-type liquid crystal material means a nematic liquid crystal material having a positive anisotropy of dielectric constant $\Delta\varepsilon$, and the negative-type liquid crystal material means a nematic liquid crystal material having a negative anisotropy of dielectric constant $\Delta\varepsilon$. The anisotropy of dielectric constant $\Delta\varepsilon$ is a difference between the dielectric constant $\varepsilon//$ in the long-axis direction and the dielectric constant $\varepsilon\perp$ in the short-axis direction of the liquid crystal molecules 21 (that is, $\varepsilon//-\varepsilon\perp$).

In the case of the positive-type liquid crystal material, a birefringence index $\Delta n$ of the liquid crystal material is preferably, for example, 0.12 or less, and more preferably 0.119 or less. In consideration of a manufacturing viewpoint (yield, and the like), a thickness d of the liquid crystal layer 20 is preferably 2 µm or more, and in this case, $\Delta n$ is suitably 0.119 or less. More preferably, d is 2.5 µm or more, and $\Delta n$ is 0.095 or less. However, from the viewpoint of a response, a cell thickness is suitably smaller. Further, it is preferable that the anisotropy of dielectric constant $\Delta\varepsilon$ of the liquid crystal material be, for example, 10 or more.

In the case of the negative-type liquid crystal material, the birefringence index $\Delta n$ of the liquid crystal material is, for example, preferably 0.123 or less, and more preferably 0.12 or less. In particular, it is suitable that the thickness d of the liquid crystal layer 20 is 2 µm or more and $\Delta n$ is 0.123 or less. More preferably, d is 2.5 µm or more and $\Delta n$ is 0.098 or less. In addition, the anisotropy of dielectric constant $\Delta\varepsilon$ of the liquid crystal material is preferably, for example, −5 or less. As A becomes smaller (or an absolute value of A becomes larger), a VR curve (a threshold value, a reflectance Max value, or the like) shifts to a lower voltage side.

In selecting a positive-type liquid crystal material or a negative-type liquid crystal material, it is preferable to consider an application, a desired performance, and the like. For example, from the viewpoint of realizing flickerlessness (also referred to as flicker-free), it is suitable to use the negative-type liquid crystal material. The reason for this is as follows. In a transverse electrical field mode such as an FFS mode using the positive-type liquid crystal material, due to an influence of a fine slit electrode on an electrode (that is, a fringe electrical field) when a voltage is applied, a flexoelectric polarization spontaneously occurs in the liquid crystal layer. It is considered that the liquid crystal responds according to the flexoelectric polarization, and thus, a luminance changes at the time of a polarity inversion, and therefore flicker is easily recognized. In addition, from the viewpoint of reliability, it is suitable to use the positive-type liquid crystal material.

The liquid crystal layer 20 may further contain a chiral agent, if necessary. The liquid crystal layer 20 can be formed, for example, by a dropping method.

The thickness d (also referred to as a cell gap or a cell thickness) of the liquid crystal layer 20 is preferably 3.6 µm or less. The thickness is more preferably 2.0 µm to 3.4 µm. In addition, from the viewpoint of a response speed, the thickness is preferably 3 µm or less. It is suitable that the cell thickness be small, from the viewpoint of cost reduction, since the number of materials can be reduced. However, if it is too small, a display quality may not be improved due to an unevenness of the cell thickness or a foreign matter, and there occurs a trade-off with an occurrence rate of a display quality defect. From the viewpoint of a yield, the thickness is suitably 2 µm or more, as described above.

The liquid crystal layer 20 may have a multi-domain alignment such as a dual domain alignment. However, from the viewpoint of maximizing liquid crystal mode reflection efficiency and liquid crystal mode transmission efficiency, the liquid crystal layer 20 is suitably a single domain alignment (also referred to as a mono-domain alignment).

Second Substrate

The second substrate 30 is disposed to face the first substrate 10 with the liquid crystal layer 20 interposed therebetween, and includes the second horizontal alignment film 340 in contact with the liquid crystal layer 20. The second substrate 30 preferably further includes a support substrate 300 and a color filter layer 310. For example, as shown in FIG. 2, the second substrate 30 includes the second horizontal alignment film 340, the color filter layer 310, and the support substrate 300, in order from the liquid crystal layer 20 side. The second substrate 30 also preferably includes a plurality of columnar spacers (not illustrated). The first substrate 10 may have a plurality of columnar spacers.

It is preferable that the support substrate 300 be transparent and have an insulating property, and examples of the support substrate 300 include a glass substrate and a plastic substrate. A high-resistance transparent conductive film may be formed on the surface of the support substrate 300 on a side opposite to the liquid crystal layer 20 (for example, the surface of the support substrate 300 on the retardation layer 40 side in FIG. 2) as a countermeasure against static electricity burn-in of a liquid crystal cell. The high-resistance transparent conductive film may have a multilayer structure in consideration of suppression of a decrease in transmittance or suppression of an increase in reflectance.

The color filter layer 310 typically includes a red color filter being provided in a region corresponding to a red pixel and transmitting red light, a green color filter being provided in a region corresponding to a green pixel and transmitting green light, and a blue color filter being provided in a region corresponding to a blue pixel and transmitting blue light. However, the number of types of color filters may be two or less, or four or more. Further, when a color display is not performed, the color filter layer 310 is omitted.

An overcoat layer (also referred to as a flattened layer) may be provided to cover the color filter layer 310 if necessary. Depending on a material forming an electrode (for example, a transparent conductive material), a material forming an interlayer insulating layer or a dielectric layer, and a material forming an alignment film, a white display may be yellowish. In this case, chromaticity adjustment (that is, blue shift) may be performed by forming the overcoat layer with a blue resist to bring the chromaticity of the white display close to the chromaticity of a D65 light source, for example. The D65 light source is a CIE standard light source D65.

Retardation Layer

The retardation layer 40 is located between the second substrate 30 and the polarizer 50, and includes a λ/4 plate 41 and a λ/2 plate 42 (see FIG. 1 and FIG. 2). Regarding the order of arrangement thereof, the λ/4 plate 41 and the λ/2 plate 42 are suitably located in order from the liquid crystal layer 20 (and the second substrate 30) side (see FIG. 1 and FIG. 2).

The λ/4 plate means a retardation plate that imparts an in-plane retardation of a ¼ wavelength to incident light having a wavelength A, and is also referred to as a λ/4 wavelength plate or a quarter-wave plate (QWP). Specifically, the λ/4 plate 41 is capable of converting linearly polarized light into circularly polarized light or circularly polarized light into linearly polarized light. For example, the linearly polarized light incident on the λ/4 plate 41 becomes circularly polarized light when emitted from the λ/4 plate 41.

The λ/2 plate means a retardation plate that imparts an in-plane retardation of a ½ wavelength to incident light having a wavelength A, and is also referred to as a λ/2 wavelength plate, a half-wavelength plate, or a half-wave plate (HWP). Specifically, the λ/2 plate 42 is capable of rotating a vibration direction of an incident light beam by approximately 90°. For example, the circularly polarized light incident on the λ/2 plate 42 becomes circularly polarized light having an opposite turning direction at the time of emission.

As the λ/4 plate 41 and the λ/2 plate 42, general-purpose retardation plates can be used. More specifically, it is suitable to use, for example, a retardation plate that is generally distributed as a circular polarizer of an antireflection film. In the disclosure, an angle formed by the polarization axis of the polarizer and the alignment orientation of the liquid crystal molecules defined by the first horizontal alignment film 140 is preferably controlled within a predetermined range as will be described later, and thus even when a general-purpose retardation plate is used as the λ/4 plate 41 and the λ/2 plate 42 instead of a special retardation plate, a liquid crystal display device is useful as an in-cell type touch panel, which is a transverse electrical field mode liquid crystal display device, capable of improving a contrast ratio and performing display in a reflection mode, whereby it is possible to realize cost reduction. In particular, from the user's point of view, a total cost can be reduced, which is extremely useful. Cost reduction can be realized similarly when the liquid crystal display device of the disclosure is used not only as a built-in type touch panel such as an in-cell type touch panel but also as an external type touch panel.

Specifically, it is preferable to use a uniaxial A plate as the λ/4 plate 41 and the λ/2 plate 42.

Polarizer

The polarizer 50 is located closer to the observation face side than the retardation layer 40 (see FIG. 1 and FIG. 2). The polarizer 50 may be a circular polarizer or a linear polarizer. Here, the linear polarizer means a polarizer having a function of extracting polarized light (linearly polarized light) vibrating only in a specific direction from unpolarized light (natural light), partially polarized light, or polarized light, and is distinguished from a circular polarizer. In particular, the polarizer 50 is preferably the linear polarizer.

The polarizer 50 may also be an absorption-type polarizer or a reflection-type polarizer. The absorption-type polarizer is a polarizer having a function of absorbing light vibrating in a specific direction and transmitting polarized light (linearly polarized light) vibrating in a direction perpendicular to such a specific direction. The reflection-type polarizer is a polarizer having a function of reflecting light vibrating in a specific direction and transmitting polarized light (linearly polarized light) vibrating in a direction perpendicular to such a specific direction. In particular, the polarizer 50 is preferably the absorption-type polarizer. In particular, an absorption-type linear polarizer is suitably used.

Examples of the absorption-type polarizer include a polarizer obtained by dying and adsorbing a polyvinyl alcohol film with an anisotropic material such as an iodine complex (or dye), which is followed by then stretching and orienting the film. In general, when the absorption-type polarizer is put to practical use, in order to ensure mechanical strength and resistance to moisture and heat, a protection film such as a triacetyl cellulose film is layered on both sides of the polyvinyl alcohol film. In addition, examples of the reflection-type polarizer include a film in which a plurality of dielectric thin films are layered, a film in which a plurality of thin films having different refractive index anisotropy are layered, a nanowire grid polarizer, and a polarizer using selective reflection of a Cholesteric LC.

In the liquid crystal display device 1 according to the present embodiment, display is performed in the transverse electrical field mode in which the liquid crystal layer 20 takes a twist alignment when no voltage is applied. Thereby, it is possible to sufficiently improve a contrast ratio of reflective display. A twist angle $\theta_1$ of the liquid crystal layer 20 when no voltage is applied is suitably 70° or more and 85° or less. A more preferable range will be described later.

The twist angle $\theta_1$ of the liquid crystal layer 20 is an angle formed by the alignment orientation of the liquid crystal molecules 21 defined by the first horizontal alignment film 140 and the alignment orientation of the liquid crystal molecules 21 defined by the second horizontal alignment film 340. That is, the angle is formed by the long-axis direction of the liquid crystal molecules 21A in the vicinity of the first horizontal alignment film 140 (also referred to as the liquid crystal molecules 21A on the first substrate 10 side when no voltage is applied) and the long-axis direction of the liquid crystal molecules 21B in the vicinity of the second horizontal alignment film 340 (also referred to as the liquid crystal molecules 21B on the second substrate 30 side when a voltage is applied).

The liquid crystal display device 1 is suitably in a normally black mode from the viewpoint of further increasing a contrast ratio. The normally black mode is a display mode in which a black display is performed in a voltage non-applied state and a white display is performed in a voltage applied state.

In addition to the above-described members, the liquid crystal display device 1 is configured by a plurality of members such as an external circuit such as Tape Carrier Package (TCP) and Printed Wiring Board (PCB); an optical film such as a viewing angle expansion film and a luminance enhancement film; and a bezel (frame), and some of such members may be incorporated into another member. Such members are not particularly limited, and those commonly used in the field of liquid crystal display devices can be used, and thus, the explanation will be omitted.

Preferable Settings and Simulation Verification Results

Hereinafter, preferable settings for a twist angle of the liquid crystal layer 20, a polarization axis of the polarizer 50, an in-plane slow axis of the λ/2 plate 41, an in-plane slow axis of the λ/4 plate 42, a retardation dΔn of the liquid crystal layer 20, and the like in the present embodiment, and verification results that led to the settings will be further described separately for a case where the liquid crystal material constituting the liquid crystal layer 20 is a positive type and a case where the liquid crystal material is a negative type. The absorption-type polarizer is used as the polarizer 50.

(i) When Liquid Crystal Material is a Positive Type
(i-1) Preferable Settings

Figure 4:
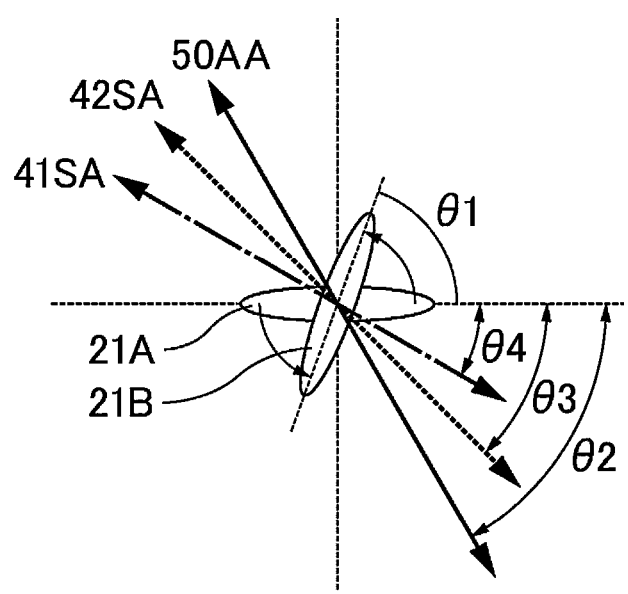
FIG. 4 is a plan view conceptually showing a relationship among a long-axis direction of a liquid crystal molecule 21 included in a liquid crystal layer 20, an in-plane slow axis 41SA of a λ/4 plate 41, an in-plane slow axis 42SA of a λ/2 plate 42, and a polarization axis 50AA of a polarizer 50 when no voltage is applied, in the liquid crystal display device 1 including a first substrate 10, the liquid crystal layer 20, a second substrate 30, the λ/4 plate 41, the λ/2 plate 42, and the polarizer 50, in order from a back face side.

Hereinafter, an example of particularly preferable optical settings from the viewpoint of improving a contrast ratio will be described. FIG. 4 is a plan view conceptually showing a relationship among the long-axis direction of the liquid crystal molecule 21 included in the liquid crystal layer 20, an in-plane slow axis 41SA of the λ/4 plate 41, an in-plane slow axis 42SA of the λ/2 plate 42, and a polarization axis 50AA of the polarizer 50 when no voltage is applied, in the liquid crystal display device 1 including the first substrate 10, the liquid crystal layer 20, the second substrate 30, the λ/4 plate 41, the λ/2 plate 42, and the polarizer 50, in order from the back face side. In FIG. 4, as the liquid crystal molecule 21, a liquid crystal molecule 21A in the vicinity of the first horizontal alignment film 140 and a liquid crystal molecule 21B in the vicinity of the second horizontal alignment film 340 are shown.

In the following description, an angle obtained when a reference azimuthal direction is set to 0° is an angle obtained when a reference azimuthal direction, that is, an alignment orientation of the liquid crystal molecule 21A defined by the first horizontal alignment film 140, is set to be a 0° direction (3 o'clock direction) and a twist direction is set to a positive (counterclockwise) direction when FIG. 4 is regarded as a dial of a timepiece. The twist direction means a direction, when the liquid crystal display device 1 is observed from the observation face side, which is twisted from the alignment orientation of the liquid crystal molecules 21 defined by the first horizontal alignment film 140 to the alignment orientation of the liquid crystal molecules 21 defined by the second horizontal alignment film 340.

The twist angle $\theta_1$ of the liquid crystal layer 20 when no voltage is applied is suitably 70° or more and 85° or less. The twist angle is more preferably 75° or more and 85° or less, still more preferably 80° or more and 85° or less, particularly preferably 81° or more and 84° or less, and most preferably around 83° (approximately 83°).

An angle $\theta_2$ formed by the polarization axis 50AA of the polarizer 50 and the alignment orientation of the liquid crystal molecule 21A defined by the first horizontal alignment film 140 is preferably 63.5° or more and 71.5° or less. The angle is more preferably 64.5° or more and 71.5° or less, and in this case, a contrast ratio of 20 or more can be easily realized. In addition, a range between 63.5° or more and 70.5° or less is also one of preferable ranges. The angle is more preferably 64.5° or more and 70.5° or less, and particularly preferably 66.3° or more and 70° or less. In addition, when a reference azimuthal direction is set to 0° and a twist direction (counterclockwise) is set to be positive, the angle is preferably −71.5° or more and −63.5° or less, more preferably −71.5° or more and −64.5° or less, still more preferably −70.5° or more and −64.5° or less, and particularly preferably −70° or more and −66.3° or less.

An angle $\theta_3$ formed by the in-plane slow axis 42SA of the λ/2 plate 42 and the alignment direction of the liquid crystal molecules 21A defined by the first horizontal alignment film 140 is preferably 47.5° or more and 52.5° or less. The angle is more preferably 48° or more and 52° or less, still more preferably 49° or more and 51° or less, and particularly preferably 49° or more and 50° or less. In addition, when a reference azimuthal direction is set to 0° and a twist direction (counterclockwise) is set to be positive, the angle is preferably −52.5° or more and −47.5° or less, more preferably −52° or more and −48° or less, still more preferably −51° or more and −49° or less, and particularly preferably −50° or more and −49° or less.

An angle $\theta_4$ formed by the in-plane slow axis 41SA of the λ/4 plate 41 and the alignment direction of the liquid crystal molecules 21A defined by the first horizontal alignment film 140 is preferably 20° or more and 30° or less. The angle is more preferably 22° or more and 28° or less, still more preferably 23° or more and 26° or less, and particularly preferably 24° or more and 25.5° or less. In addition, when a reference azimuthal direction is set to 0° and a twist direction (counterclockwise) is set to be positive, the angle is preferably −30° or more and −20° or less, more preferably −28° or more and −22° or less, still more preferably −26° or more and −23° or less, and particularly preferably −25.5° or more and −24° or less.

The retardation of the liquid crystal layer 20, that is, a product (dΔn) of the thickness d of the liquid crystal layer 20 and a birefringence index Δn of the liquid crystal material, is preferably 218 nm or more and 255 nm or less. In particular, from the viewpoint of further improving response performance, the retardation dΔn is suitably 252 nm or less. From the viewpoint of further improving a contrast ratio, the retardation is more preferably 224 nm or more and 252 nm or less, still more preferably 230 nm or more and 250 nm or less, and particularly preferably 236 nm or more and 248 nm or less.

(i-2) Verification Results Through Optical Simulation

The above-described preferable settings have been found by verification using optical simulation by the inventors of the disclosure. The verification results will be described below.

Figure 5A:
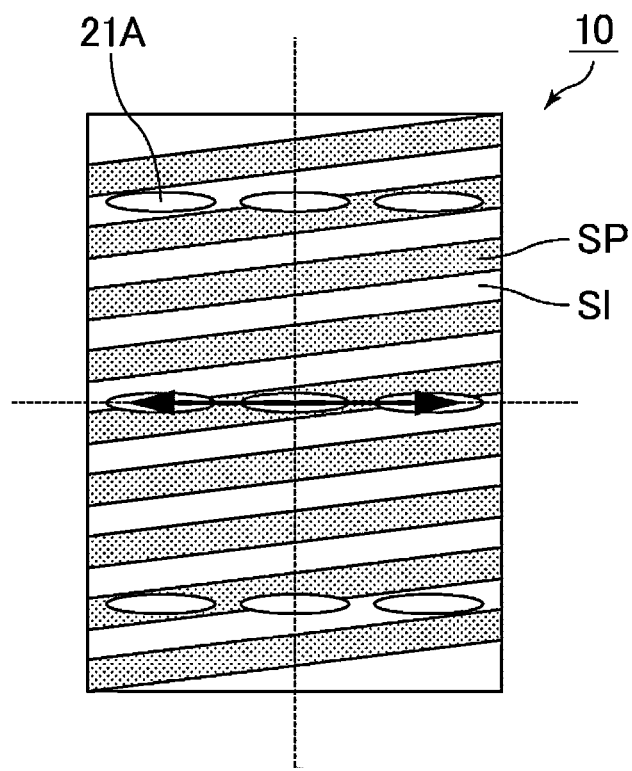
FIG. 5A is a schematic plan view of the first substrate 10 when viewed from a first horizontal alignment film 140 side.
Figure 5B:
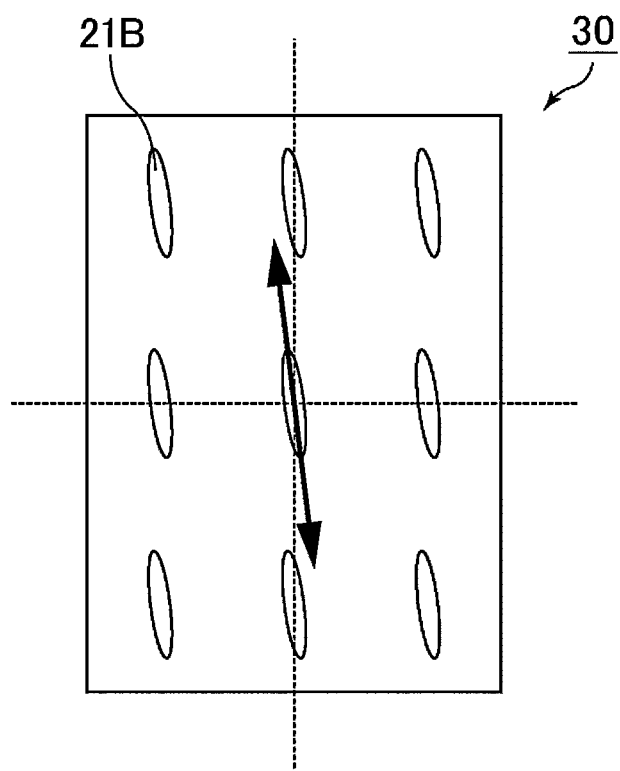
FIG. 5B is a schematic plan view of the second substrate 30 when viewed from a second horizontal alignment film 340 side.
Figure 5C:
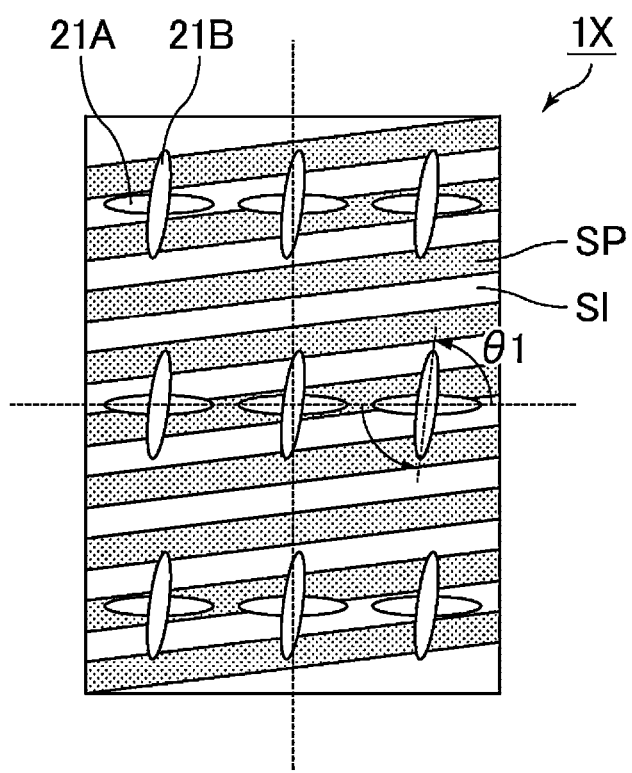
FIG. 5C is a schematic plan view of a liquid crystal panel 1X after the first substrate 10 and the second substrate 30 are bonded to each other, when viewed from the second substrate 30 side.

The liquid crystal display device 1 including the reflective-type liquid crystal panel 1X using the positive-type liquid crystal material, the λ/4 plate 41, the λ/2 plate 42, and the polarizer 50 was assumed. For the optical simulation, a liquid crystal layer (liquid crystal layer for performing normally black display) having a mono-domain structure as shown in FIG. 5A, FIG. 5B and FIG. 5C was assumed. FIG.

5A is a schematic plan view showing the first substrate 10 (TFT substrate) viewed from the first horizontal alignment film 140 side. FIG. 5B is a schematic plan view showing the second substrate 30 (counter substrate) viewed from the second horizontal alignment film 340 side. FIG. 5C is a schematic plan view showing the liquid crystal panel 1X after the first substrate 10 and the second substrate 30 are bonded to each other, when viewed from the second substrate 30 side.

In the following description, a reference azimuthal direction, that is, an alignment orientation of the liquid crystal molecules 21A defined by the first horizontal alignment film 140, is set to be a 0° direction (3 o'clock direction) when each of FIG. 5A, FIG. 5B, and FIG. 5C is regarded as a dial of a timepiece. In FIG. 5A and FIG. 5B, the alignment orientation of the liquid crystal molecules 21 is indicated by an arrow.

The upper layer electrode was set to be a slit electrode (see FIG. 5A and FIG. 5B). With respect to the reference azimuthal direction (0°), a direction in which the plurality of strip portions SP included in the slit electrode extend (which also corresponds to a direction in which the slits SI extend) was set to be a +10° direction. That is, a finger angle was set to 10°. In addition, when seen in a plan view, the width of each strip portion SP was set to 1.6 μm, and an interval between two strip portions SP adjacent to each other was set to 3 μm. The alignment orientation of the liquid crystal molecules 21B defined by the second horizontal alignment film 340 was set to be a +97° direction in FIG. 5B and set to be a +83° direction in FIG. 5C. That is, a twist angle $\theta_1$ was set to +83°.

First, simulation was performed using an LCD Master 1D manufactured by SHINTECH Co., Ltd., and the following parameter conditions were optimized to minimize the reflectance of black display (also referred to as black reflectance).
  Cell thickness d: 3.2 μm to 3.6 μm
  Twist angle $\theta_1$: 70° to 85°
  Axial azimuthal direction of optical film (polarizer 50, λ/2 plate 42, λ/4 plate 41): ±90°

A uniaxial retardation plate having a retardation of 140 nm was used as the λ/4 plate 41, a uniaxial retardation plate having a retardation of 270 nm was used as the λ/2 plate 42, and a wavelength dispersion of each of these retardation plates was set to be flat. The calculation was repeated while changing only one of the above-described parameters and not changing the other parameters.

Figure 6:
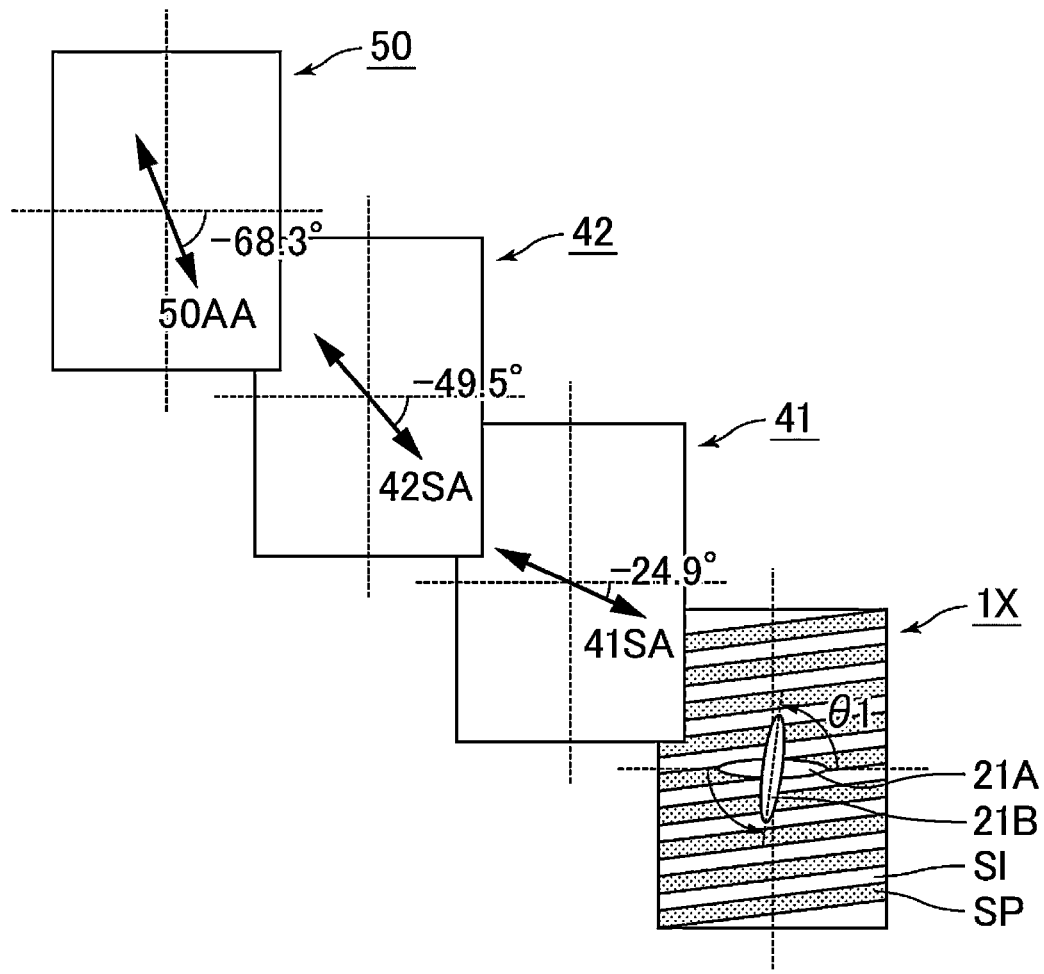
FIG. 6 is a diagram conceptually showing settings of an optical axis for minimizing a black reflectance.

FIG. 6 shows settings of optical axes of the λ/4 plate 41, the λ/2 plate 42, and the polarizer 50 for minimizing a black reflectance. FIG. 6 is a diagram conceptually showing settings of an optical axis for minimizing a black reflectance. As shown in FIG. 6, an optimum setting for the polarization axis 50AA of the polarizer 50 was a −68.3° direction (can also be referred to as a +111.7° direction). In addition, an optimum setting for the slow axis 42SA of the λ/2 plate 42 was a −49.5° direction (can also be referred to as a +130.5° direction), and an optimum setting for the slow axis 41SA of the λ/4 plate 41 was a −24.9° direction (can also be referred to as a +155.1° direction).

Next, simulation was performed using an LCD Master 2D manufactured by SHINTECH Co. Ltd., and a preferable range of optical conditions was examined. At this time, the simulation was performed by changing a value of a parameter of interest (a parameter for which a preferable range was to be obtained) based on the optimum value (reference value) while fixing the other parameters to optimum values.

It was found that, when the retardation dΔn exceeded 252 nm or more, that is, when the birefringence index Δn of the liquid crystal material was 0.07 and the cell thickness d exceeded 3.6 μm, the response performance may not be further improved. It was found that, also when the twist angle $\theta_1$ exceeded 85°, the response performance may not be further improved. In consideration of the response performance, it was found that the optimum setting for the twist angle $\theta_1$ was 83°, the optimum setting for the retardation dΔn was 245 nm, and the optimum settings for the optical axes of the λ/4 plate 41, the λ/2 plate 42, and the polarizer 50 were the settings shown in FIG. 6.

Figure 7:
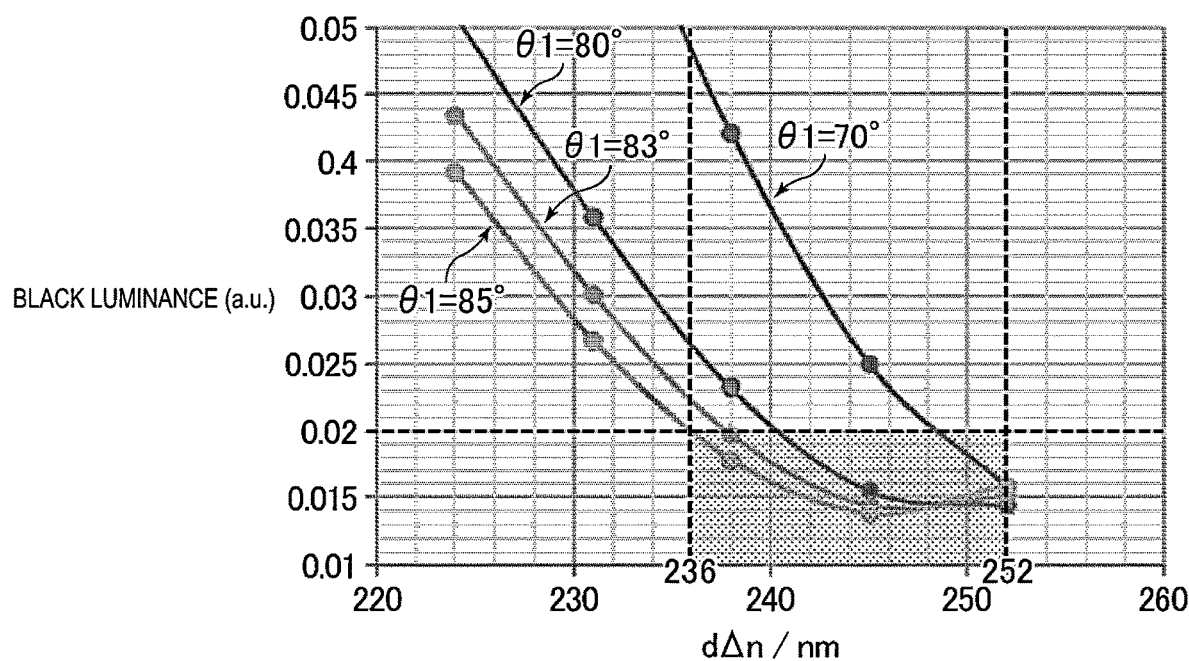
FIG. 7 is a graph showing evaluation results of black luminance.
Figure 8:
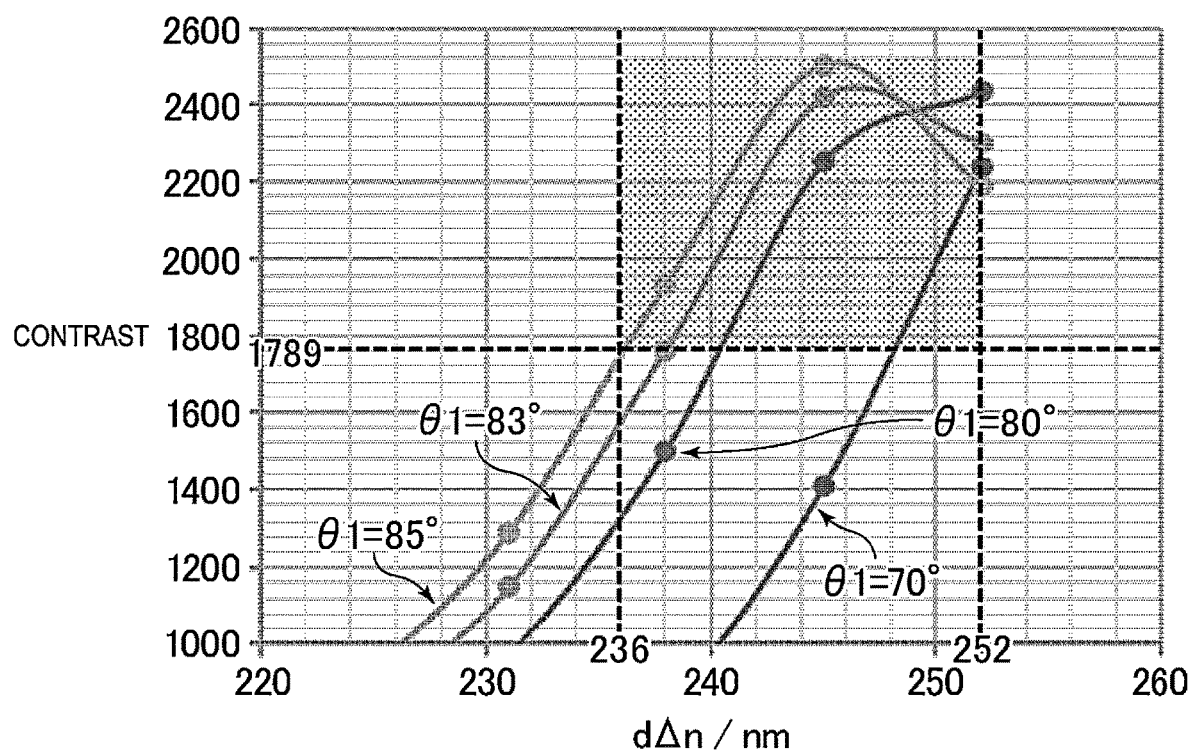
FIG. 8 is a graph showing evaluation results of a contrast.

In order to examine the influence of the retardation dΔn and the twist angle $\theta_1$ on the luminance at the time of black display (also referred to as black luminance) and the contrast, simulation was performed by changing the retardation dΔn in the range of 224 nm to 252 nm and changing the twist angle $\theta_1$ in the range of 70° to 85°. The evaluation results for the black luminance are shown in Table 1 and FIG. 7, and the evaluation results for the contrast are shown in Table 2 and FIG. 8. From these results, it was found that a preferable range of the twist angle $\theta_1$ was 70° or more and 85° or less, and a preferable range of the retardation dΔn was 236 nm or more and 252 nm or less. FIG. 7 is a graph showing evaluation results of the black luminance, and FIG. 8 is a graph showing evaluation results of the contrast.

The black luminance was 0.02 (a.u.) and the contrast was 1789 when the black luminance and the contrast were calculated for a combination of conditions of the liquid crystal layer, that is, a retardation dΔn=217 nm (Δn=0.069928 at a wavelength of 550 nm), a cell thickness=3.11 μm, and a twist angle $\theta_1$=74°, and special retardation plates (a λ/4 plate having a retardation of 110 nm and a λ/2 plate having a retardation of 260 nm).

TABLE 1

| | | Twist angle | | | |
| --- | --- | --- | --- | --- | --- |
| Black luminance (0 V) | | 70° | 80° | 83° | 85° |
| dΔn | 224 | 0.0850 | 0.0508 | 0.0435 | 0.0392 |
| | 231 | 0.0647 | 0.0359 | 0.0301 | 0.0267 |
| | 238 | 0.0421 | 0.0232 | 0.0197 | 0.0178 |
| | 245 | 0.0250 | 0.0155 | 0.0144 | 0.0138 |
| | 252 | 0.0158 | 0.0144 | 0.0151 | 0.0158 |

TABLE 2

| | | Twist angle | | | |
| --- | --- | --- | --- | --- | --- |
| CR | | 70° | 80° | 83° | 85° |
| dΔn | 224 | 414 | 684 | 793 | 875 |
| | 231 | 544 | 971 | 1149 | 1290 |
| | 238 | 838 | 1501 | 1763 | 1935 |
| | 245 | 1408 | 2251 | 2418 | 2504 |
| | 252 | 2236 | 2432 | 2298 | 2189 |

(ii) When Liquid Crystal Material is a Negative Type
(ii-1) Preferable Settings

Figure 9:
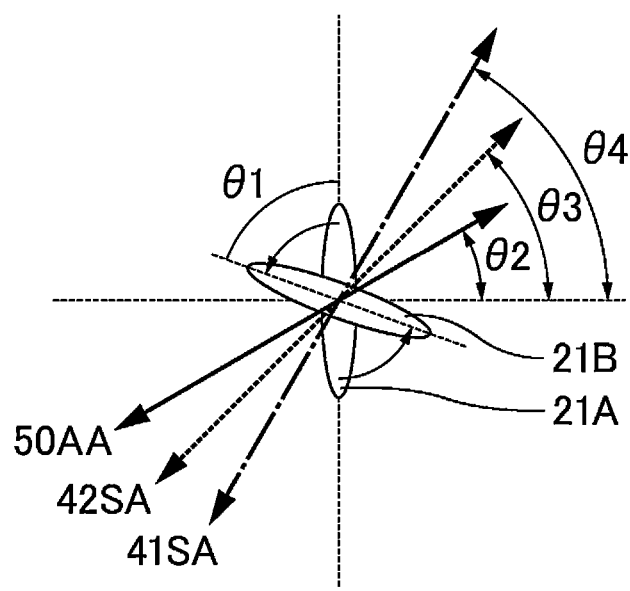
FIG. 9 is a plan view conceptually showing a relationship among a long-axis direction of a liquid crystal molecule 21 included in a liquid crystal layer 20, an in-plane slow axis 41SA of a λ/4 plate 41, an in-plane slow axis 42SA of a λ/2 plate 42, and a polarization axis 50AA of a polarizer 50 when no voltage is applied, in the liquid crystal display device 1 including a first substrate 10, the liquid crystal layer 20, a second substrate 30, the λ/4 plate 41, the λ/2 plate 42, and the polarizer 50, in order from a back face side.

Hereinafter, a particularly preferable optical settings example from the viewpoint of improving a contrast ratio will be described. FIG. 9 is a plan view conceptually showing a relationship among the long-axis direction of the liquid crystal molecule 21 included in the liquid crystal layer 20, the in-plane slow axis 41SA of the λ/4 plate 41, the in-plane slow axis 42SA of the λ/2 plate 42, and the polarization axis 50AA of the polarizer 50 when no voltage is applied, in the liquid crystal display device 1 including the first substrate 10, the liquid crystal layer 20, the second substrate 30, the λ/4 plate 41, the λ/2 plate 42, and the polarizer 50, in order from the back face side. In FIG. 9, as the liquid crystal molecule 21, a liquid crystal molecule 21A in the vicinity of the first horizontal alignment film 140 and a liquid crystal molecule 21B in the vicinity of the second horizontal alignment film 340 are shown.

In the following description, an angle obtained when a reference azimuthal direction is set to 0° is an angle obtained when a reference azimuthal direction, that is, an alignment orientation of the liquid crystal molecule 21A defined by the first horizontal alignment film 140, is set to be a 0° direction (3 o'clock direction) and a twist direction is set to a positive (counterclockwise) direction when FIG. 9 is regarded as a dial of a timepiece.

The twist angle $θ_1$ of the liquid crystal layer 20 when no voltage is applied is suitably 70° or more and 85° or less. The twist angle is more preferably 75° or more and 85° or less, still more preferably 80° or more and 85° or less, particularly preferably 81° or more and 84° or less, and most preferably around 83° (approximately 83°).

An angle $θ_2$ formed by the polarization axis 50AA of the polarizer 50 and the alignment orientation of the liquid crystal molecule 21A defined by the first horizontal alignment film 140 is preferably 64° or more and 69.5° or less. The angle is more preferably 65° or more and 69.3° or less, still more preferably 66° or more and 69° or less, and particularly preferably 67° or more and 68.7° or less. In addition, when a reference azimuthal direction is set to 0° and a twist direction (counterclockwise) is set to be positive, the angle $θ_2$ is also suitably within each of the above-described ranges (they are all positive values).

An angle $θ_3$ formed by the in-plane slow axis 42SA of the λ/2 plate 42 and the alignment direction of the liquid crystal molecules 21A defined by the first horizontal alignment film 140 is preferably 47.5° or more and 51.5° or less. The angle is more preferably 48° or more and 51° or less, still more preferably 40° or more and 41.5° or less, and particularly preferably 48.5° or more and 50.0° or less. In addition, when a reference azimuthal direction is set to 0° and a twist direction (counterclockwise) is set to be positive, the angle $θ_3$ is also suitably within each of the above-described ranges (they are all positive values).

An angle $θ_4$ formed by the in-plane slow axis 41SA of the λ/4 plate 41 and the alignment direction of the liquid crystal molecules 21A defined by the first horizontal alignment film 140 is preferably 15° or more and 35° or less. The angle is more preferably 17° or more and 32° or less, still more preferably 20° or more and 30° or less, and particularly preferably 24° or more and 28° or less. In addition, when a reference azimuthal direction is set to 0° and a twist direction (counterclockwise) is set to be positive, the angle $θ_4$ is also suitably within each of the above-described ranges (they are all positive values).

The retardation of the liquid crystal layer 20, that is, a product (dΔn) of the thickness d of the liquid crystal layer 20 and a birefringence index Δn of the liquid crystal material, is preferably 230 nm or more and 260 nm or less. From the viewpoint of further improving a contrast ratio, the retardation is more preferably 232 nm or more and 250 nm or less, still more preferably 235 nm or more and 246 nm or less, and particularly preferably 236 nm or more and 245 nm or less.

(ii-2) Verification Results Through Optical Simulation

The above-described preferable settings have been found by verification using optical simulation by the inventors of the disclosure. The verification results will be described below.

Figure 10A:
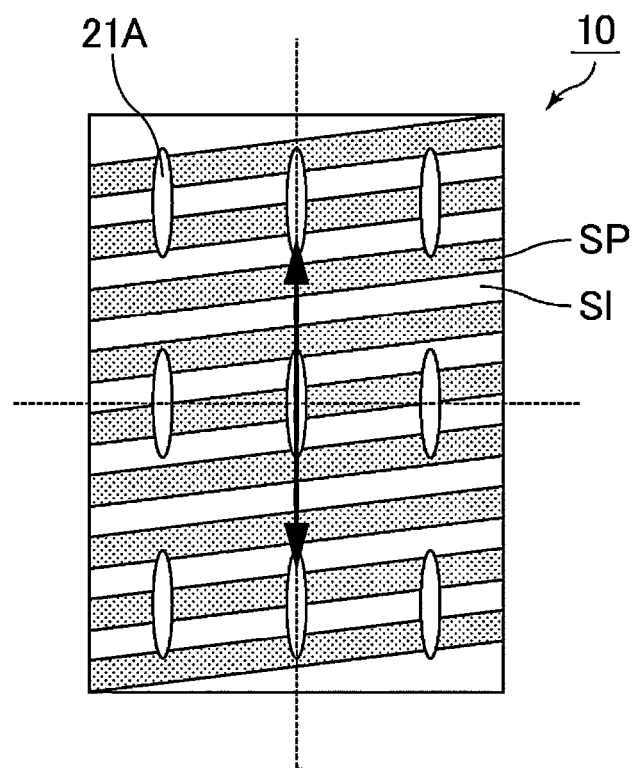
FIG. 10A is a schematic plan view of the first substrate 10 when viewed from a first horizontal alignment film 140 side.
Figure 10B:
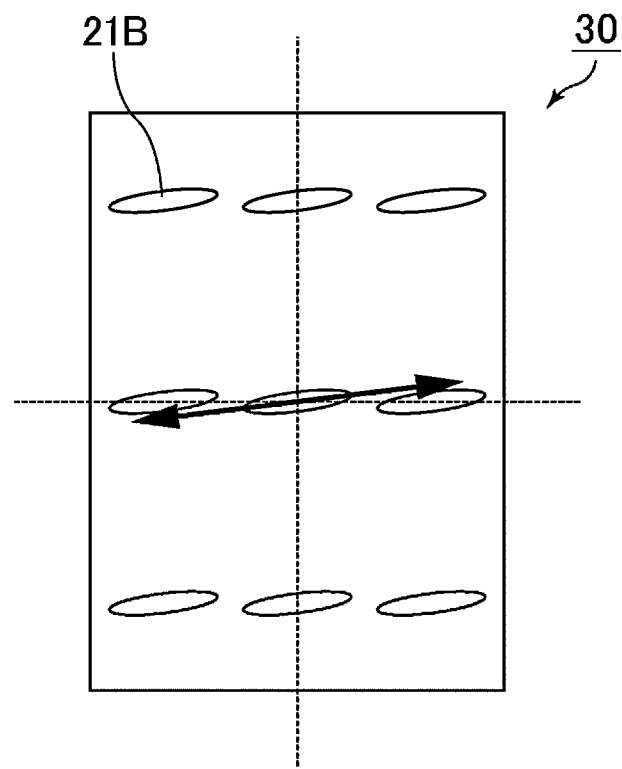
FIG. 10B is a schematic plan view of the second substrate 30 when viewed from a second horizontal alignment film 340 side.
Figure 10C:
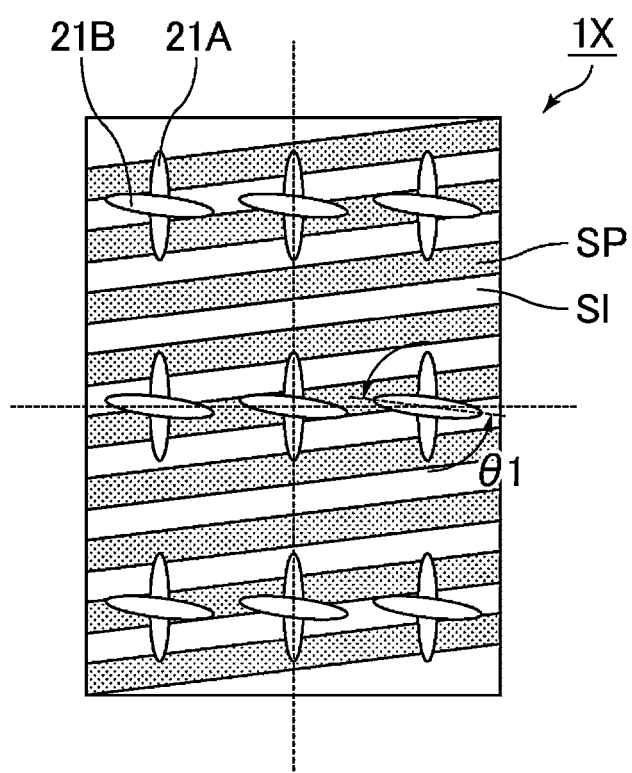
FIG. 10C is a schematic plan view of a liquid crystal panel 1X after the first substrate 10 and the second substrate 30 are bonded to each other, when viewed from the second substrate 30 side.

The liquid crystal display device 1 including the reflective-type liquid crystal panel 1X using the negative-type liquid crystal material, the λ/4 plate 41, the λ/2 plate 42, and the polarizer 50 was assumed. For the optical simulation, a liquid crystal layer (liquid crystal layer for performing normally black display) having a mono-domain structure as shown in FIG. 10A, FIG. 10B, and FIG. 10C was assumed. FIG. 10A is a schematic plan view showing the first substrate 10 (TFT substrate) viewed from the first horizontal alignment film 140 side. FIG. 10B is a schematic plan view showing the second substrate 30 (counter substrate) viewed from the second horizontal alignment film 340 side. FIG. 10C is a schematic plan view showing the liquid crystal panel 1X after the first substrate 10 and the second substrate 30 are bonded to each other, when viewed from the second substrate 30 side.

In the following description, a 3 o'clock direction is set to be a 0° direction, a clockwise direction is set to be negative, and a counterclockwise direction is set to be positive when each of FIG. 10A, FIG. 10B, and FIG. 10C is regarded as a dial of a timepiece. In FIG. 10A and FIG. 10B, the alignment orientation of the liquid crystal molecules 21 is indicated by an arrow.

In this example, the upper layer electrode was set to be a slit electrode (see FIG. 10A and FIG. 10B). The alignment orientation of the liquid crystal molecule 21A defined by the first horizontal alignment film 140 was set to be a 90° direction (12 o'clock direction), and a direction in which the plurality of strip portions SP included in the upper layer electrode (slit electrode) extend (which also corresponds to a direction in which the slits SI extend) was set to be a +10° direction. That is, a finger angle was set to 10°. In addition, when seen in a plan view, the width of each strip portion SP was set to 1.6 μm, and an interval between two strip portions SP adjacent to each other was set to 3 μm. The alignment orientation of the liquid crystal molecules 21B defined by the second horizontal alignment film 340 was set to be a +7° direction in FIG. 10B and set to be a +83° direction in FIG. 10C. That is, a twist angle $θ_1$ was set to +83°.

Conditions for a cell thickness d, an angle of the polarization axis 50AA of the polarizer 50, and an angle and a retardation of the slow axis 42SA of the λ/2 plate 42, and conditions for an angle and a retardation of the slow axis 41SA of the λ/4 plate 41 for minimizing a black reflectance were obtained by fixing the twist angle $θ_1$ to 83° using LCD Master 1D manufactured by SHINTECH Co., Ltd. The calculation was repeated while changing only one of the above-described parameters and not changing the other parameters.

Figure 11:
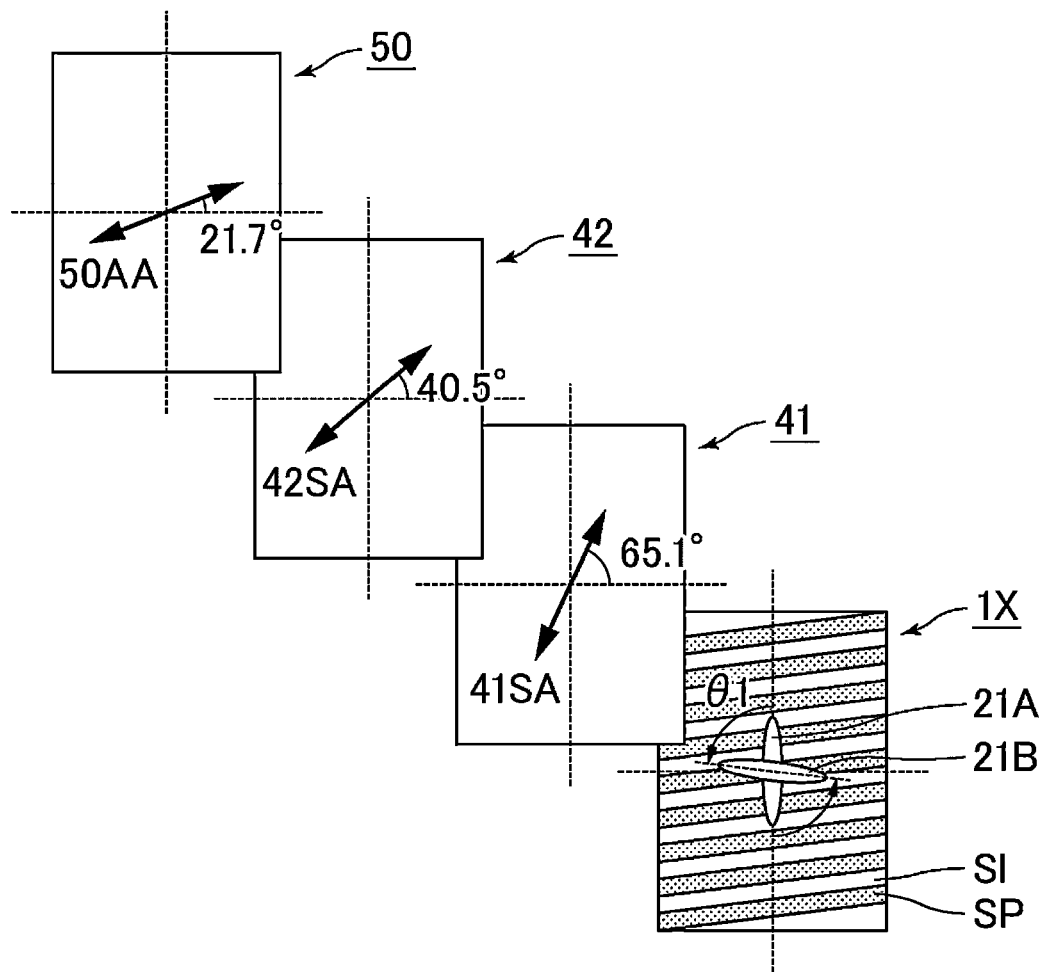
FIG. 11 is a diagram conceptually showing settings of an optical axis for minimizing a black reflectance.

FIG. 11 shows settings of optical axes of the λ/4 plate 41, the λ/2 plate 42, and the polarizer 50 for minimizing a black reflectance. FIG. 11 is a diagram conceptually showing settings of an optical axis for minimizing a black reflectance. As shown in FIG. 11, an optimum setting for the polarization axis 50AA of the polarizer 50 was a +21.7° direction (can also be referred to as a −158.3° direction). In addition, an optimum setting for the slow axis 42SA of the λ/2 plate 42 was a +40.5° direction (can also be referred to as a −139.5° direction), and an optimum setting for the slow axis 41SA of the λ/4 plate 41 was a +65.1° direction (can also be referred to as a −114.9° direction).

APPLICATION EXAMPLE

The liquid crystal display device 1 according to the present embodiment is suitably used for various purposes. In particular, the liquid crystal display device 1 can be preferably applied to a touch panel. Even when applying the liquid crystal display device 1 to either an external type touch panel or a built-in type touch panel, the contrast ratio can be improved at a lower cost than a known touch panel, hence being useful. In particular, the liquid crystal display device 1 can be suitably applied to the built-in type touch panel, and can be particularly suitably applied to an in-cell type touch panel. In this manner, when the liquid crystal display device 1 according to the present embodiment is used, it is possible to suitably realize an in-cell type touch panel capable of performing display in a reflection mode, which had not been possible until now.

When the in-cell type touch panel capable of performing display in a reflection mode can be realized, for example, a frame wiring line region required for an external type touch panel can be eliminated, and thus, it is possible to achieve frame narrowing, and a touch panel function can be mounted without a cover glass, and thus, it is possible to contribute to thickness reduction and weight reduction. In addition, the touch function and the display function are driven in a time division manner, and thus, the touch panel is not affected by Liquid Crystal Display (LCD) noise which may be the largest noise source. That is, a killer pattern is not generated, and thus, tuning (adjustment) of the touch signal is easy. Further, a loss of reflected light is sufficiently small, a pen writing is more natural, and a display without a sense of incongruity is obtained. Compared with the external type touch panel, a total cost can be reduced from the user's point of view. Input by a finger and a pen input by an electromagnetic induction method (EMR) can be combined, and a highly accurate pen writing can be realized.

Figure 12:
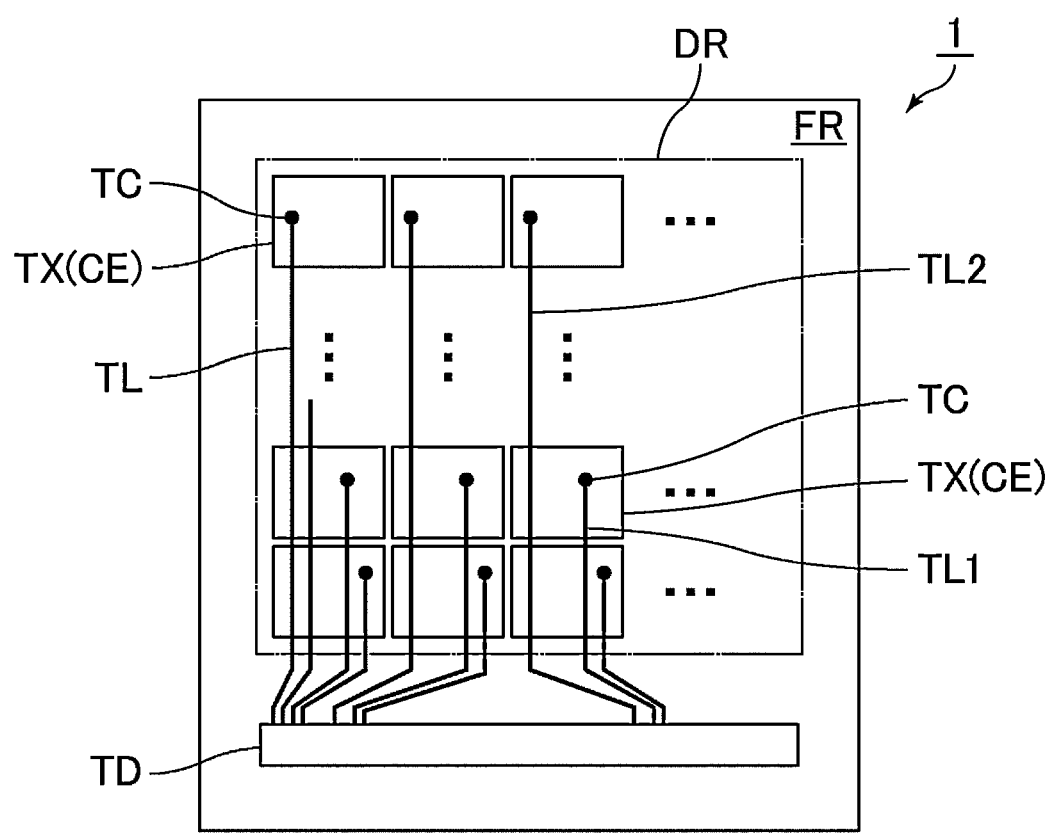
FIG. 12 is a schematic plan view showing an arrangement relationship between a touch sensor electrode TX and a touch wiring line TL included in the liquid crystal display device 1.

An example in which the liquid crystal display device 1 is used as the in-cell type touch panel will be further described. FIG. 12 is a schematic plan view showing an arrangement relationship between a touch sensor electrode TX and a touch wiring line TL included in the liquid crystal display device 1. As shown in FIG. 12, the liquid crystal display device 1 includes a display region DR and a non-display region FR. The display region DR is defined by a plurality of pixels P (see, for example, FIG. 3) arrayed in a matrix shape. The non-display region FR is located around the display region DR, and is also referred to as a peripheral region or a frame region.

Within the display region DR, the common electrode CE is divided into a plurality of segments TX. Each segment (common electrode portion) TX functions as a touch sensor electrode. In the example shown in FIG. 12, each touch sensor electrode TX is provided corresponding to two or more pixels P.

The liquid crystal display device 1 (more specifically, the first substrate 10) includes a plurality of touch wiring lines TL. Each touch sensor electrode TX is electrically connected to a corresponding touch wiring line TL. A connection portion TC between the touch sensor electrode TX and the touch wiring line TL is also referred to as a touch wiring line contact portion TC.

The touch wiring line TL is connected to a touch drive unit TD provided in the non-display region FR. The touch drive unit TD is configured to switch, for example, between a display mode in which the plurality of touch sensor electrodes TX function as the common electrode CE, and a touch detection mode in which the plurality of touch sensor electrodes TX function as the touch sensor electrode TX, in a time division manner. The touch drive unit TD, for example, applies a common signal to the touch sensor electrode TX (common electrode CE) through the touch wiring line TL in the display mode. On the other hand, in the touch detection mode, the touch drive unit TD applies a touch drive signal to the touch sensor electrode TX through the touch wiring line TL.

In FIG. 12, the plurality of touch wiring lines TL extend in a column direction (the same direction as the source wiring line SL). Some touch wiring lines TL extend across one or a plurality of other touch sensor electrodes TX to the corresponding touch sensor electrodes TX.

When attention is paid to one touch sensor electrode TX, a first touch wiring line TL1 for supplying a signal to the one touch sensor electrode TX extends to the touch wiring line contact portion TC, and a second touch wiring line TL2 for supplying a signal to another touch sensor electrode TX extends across the one touch sensor electrode TX. The second touch wiring line TL2 and a touch sensor electrode TX overlap each other with an insulating layer interposed therebetween. Depending on a position of the touch sensor electrode TX, two or more touch wiring lines TL may be arranged so as to extend across the touch sensor electrode TX, or no touch wiring line TL crossing the touch sensor electrode TX may be arranged.

In the non-display region FR, in addition to the touch drive unit TD, a peripheral circuit including drive circuits such as a gate driver that supplies a gate signal to the gate bus line (gate wiring line) GL, a source driver that supplies a source signal to the source bus line (source wiring line) SL, and the like is provided (not illustrated). These drive circuits may, for example, be mounted on the first substrate (TFT substrate) 10, or formed as an integral (monolithic) part. A semiconductor chip including some or all of the drive circuits may be mounted on the non-display region FR.

In the in-cell type touch panel, it is particularly preferable to use an In—Ga—Zn—O-based semiconductor for the TFT 110. In addition, from the viewpoint of realizing flickerlessness (also referred to as flicker-free), it is particularly suitable to use a negative-type liquid crystal material. The reason for this is as follows. In a transverse electrical field mode such as an FFS mode using the positive-type liquid crystal material, due to an influence of a fine slit electrode on an electrode (that is, a fringe electrical field) when a voltage is applied, a flexoelectric polarization spontaneously occurs in the liquid crystal layer. It is considered that the liquid crystal responds according to the flexoelectric polarization, and thus, a luminance changes at the time of a polarity inversion, and therefore flicker is easily recognized.

First Modification Example of First Embodiment

In the first embodiment, the configuration in which the first electrode 121 serving as a lower layer electrode is the common electrode CE and the second electrode 122 serving as an upper layer electrode is the pixel electrode PE has been described. However, conversely, the second electrode 122 may be the common electrode CE and the first electrode 121 may be the pixel electrode PE. In the present example, the second electrode 122 (upper layer electrode) is the common electrode CE, and the first electrode 121 (lower layer electrode) is the pixel electrode PE (see FIG. 13).

Figure 13:
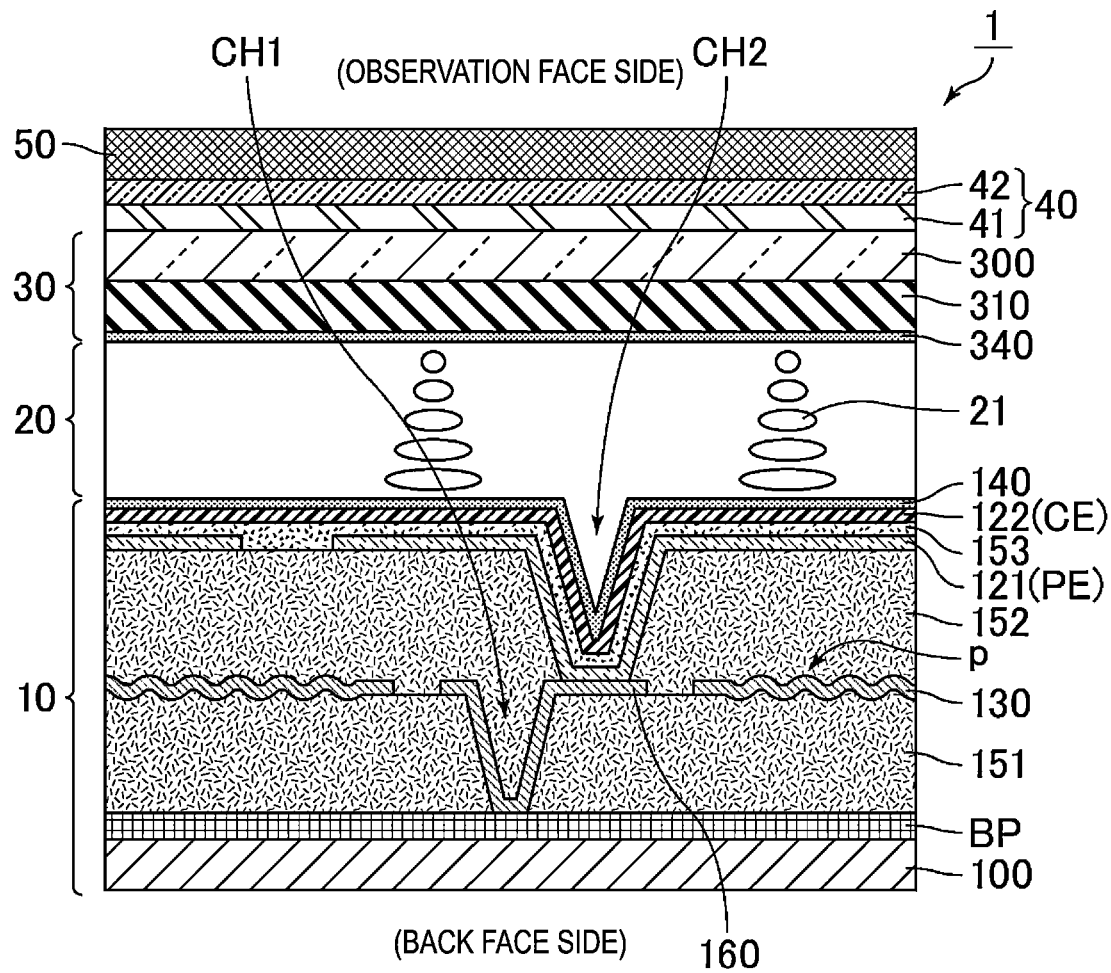
FIG. 13 is a schematic cross-sectional view more specifically showing the liquid crystal display device 1 according to a first modification example of the first embodiment.

FIG. 13 is a schematic cross-sectional view showing more specifically the liquid crystal display device 1 according to the present example. Also in the present example, it is preferable that from the viewpoint of easily generating a transverse electrical field, at least the upper layer electrode (common electrode CE in the present example) be a slit electrode. The lower layer electrode (pixel electrode PE in the present example) may be a planar electrode, that is, a so-called solid electrode, or may be a slit electrode. The liquid crystal display device 1 according to the present modification example is particularly suitable as a liquid crystal display device having a relatively high-definition as described above, that is, a liquid crystal display device in which the pixel P area is relatively small.

Second Modification Example of First Embodiment

In the first embodiment, an FFS mode liquid crystal display device has been described. However, an IPS mode liquid crystal display device may also be possible (note that the liquid crystal layer 20 takes a twist alignment when no voltage is applied). The present modification example is an IPS mode liquid crystal display device. In the present modification example, it is preferable that the first electrode 121 and the second electrode 122 be provided in the same layer, and each of both the first electrode 121 and the second electrode 122 be a slit electrode.

Second Embodiment

In the present embodiment, features unique to the present embodiment will be mainly described, and a description of contents overlapping the above-described first embodiment will be omitted. The present embodiment is substantially the same as the first embodiment except that a retardation layer 40 further includes a positive C plate 43.

Figure 14:
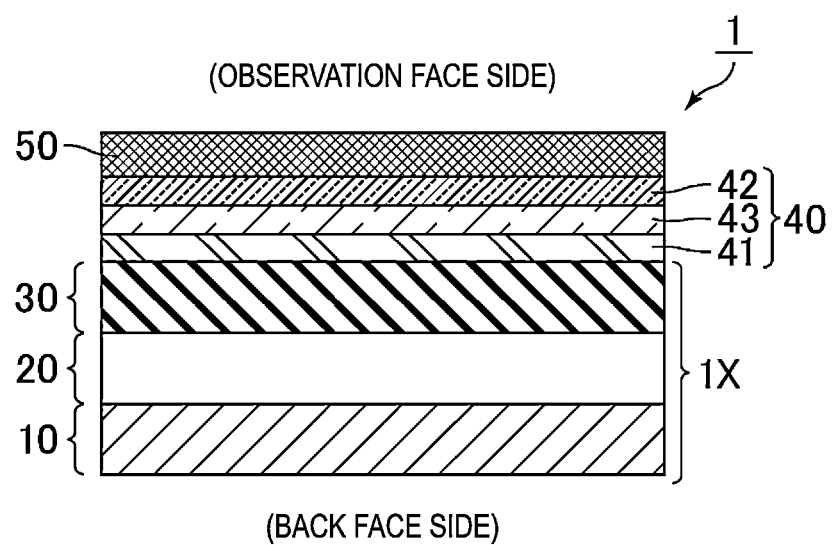
FIG. 14 is a schematic cross-sectional view of a liquid crystal display device 1 according to an example of a second embodiment.

FIG. 14 is a schematic cross-sectional view of a liquid crystal display device 1 according to an example of the present embodiment. As shown in FIG. 14, the liquid crystal display device 1 includes a first substrate 10, a liquid crystal layer 20, a second substrate 30, the retardation layer 40, and a polarizer 50, in order from the back face side. The retardation layer 40 includes the positive C plate 43 in addition to a λ/4 plate 41 and a λ/2 plate 42. The positive C plate 43 may be constituted by a single film or may be a layered body of two or more retardation films.

When the retardation layer 40 further includes the positive C plate 43, it is possible to achieve both an improvement in a viewing angle and an improvement in a contrast ratio at a higher level as a synergistic effect with the configuration described above in the first embodiment, which is extremely useful. In particular, in the liquid crystal display device 1 according to the present embodiment, luminance floating at the time of black display (also referred to as black floating) is sufficiently suppressed as compared with the liquid crystal display device according to the first embodiment, and a viewing angle at the time of black display is sufficiently enlarged. From the viewpoint of further exhibiting such an effect, the positive C plate 43 is suitably located between the λ/4 plate 41 and the λ/2 plate 42 (see FIG. 14).

From the viewpoint of further exhibiting a viewing angle improvement effect, a thickness direction retardation Rth of the positive C plate 43 is preferably 150 nm to 270 nm. The thickness direction retardation is more preferably 160 nm to 250 nm, and still more preferably 170 nm to 240 nm.

The thickness of the positive C plate 43 is preferably, for example, 0.1 μm to 100 μm. Within this range, more excellent mechanical strength and display uniformity can be obtained. The thickness is more preferably 0.1 μm to 80 μm, and still more preferably 0.1 μm to 50 μm. When the positive C plate 43 has a layered structure, it is preferable that the total thickness of the positive C plate 43 be set to be in the above-described range, and the thicknesses of the retardation films may be the same or different from each other.

As the positive C plate 43 (and 44), for example, it is preferable to use, for example, a plate obtained by performing longitudinal and lateral biaxial stretching processing on a film containing a material having a negative intrinsic birefringence as a component or use a plate coated with a liquid crystalline material such as nematic liquid crystal, or the like. Examples of the material having a negative intrinsic birefringence include a resin composition containing an acrylic resin and a styrene resin, polystyrene, polyvinyl naphthalene, polyvinyl biphenyl, polyvinyl pyridine, polymethyl methacrylate, polymethyl acrylate, an N-substituted maleimide copolymer, polycarbonate having a fluorene skeleton, and triacetyl cellulose (particularly those having a low degree of acetylation).

Specific examples of the positive C plate 43 (and 44) include a positive C plate manufactured by ENEOS CORPORATION or HAYASHI TELEMPU CORPORATION, a Positive-C retardation film manufactured by Nippon Kayaku Co., Ltd., and the like.

Effects and the like obtained by including the positive C plate 43 have been found by verification using optical simulation by the inventors of the disclosure. Verification results will be described below separately for a case where the liquid crystal material constituting the liquid crystal layer 20 is a positive type and a case where the liquid crystal material constituting the liquid crystal layer 20 is a negative type. The absorption-type polarizer is used as the polarizer 50.

(i) When Liquid Crystal Material is a Positive Type

In the liquid crystal display device 1 including a reflective-type liquid crystal panel 1X using a positive-type liquid crystal material, the retardation layer 40, and the polarizer 50, a triple-layer structure of the λ/4 plate 41, the λ/2 plate 42, and the positive C plate 43 or a negative C plate 43R was assumed as the retardation layer 40, and the influence on a viewing angle due to the addition of the C plate was examined by changing the position of the C plate. LCD Master 1D manufactured by SHINTECH Co., Ltd. was used as simulation software. A uniaxial retardation plate having a retardation of 140 nm was used as the λ/4 plate 41, a uniaxial retardation plate having a retardation of 270 nm was used as the λ/2 plate 42, and a wavelength dispersion of each of these retardation plates was set to be flat. The other settings were the optimum settings obtained in the first embodiment when the liquid crystal material was a positive type. The results are shown in FIGS. 15A to 15B.

Figure 15A:
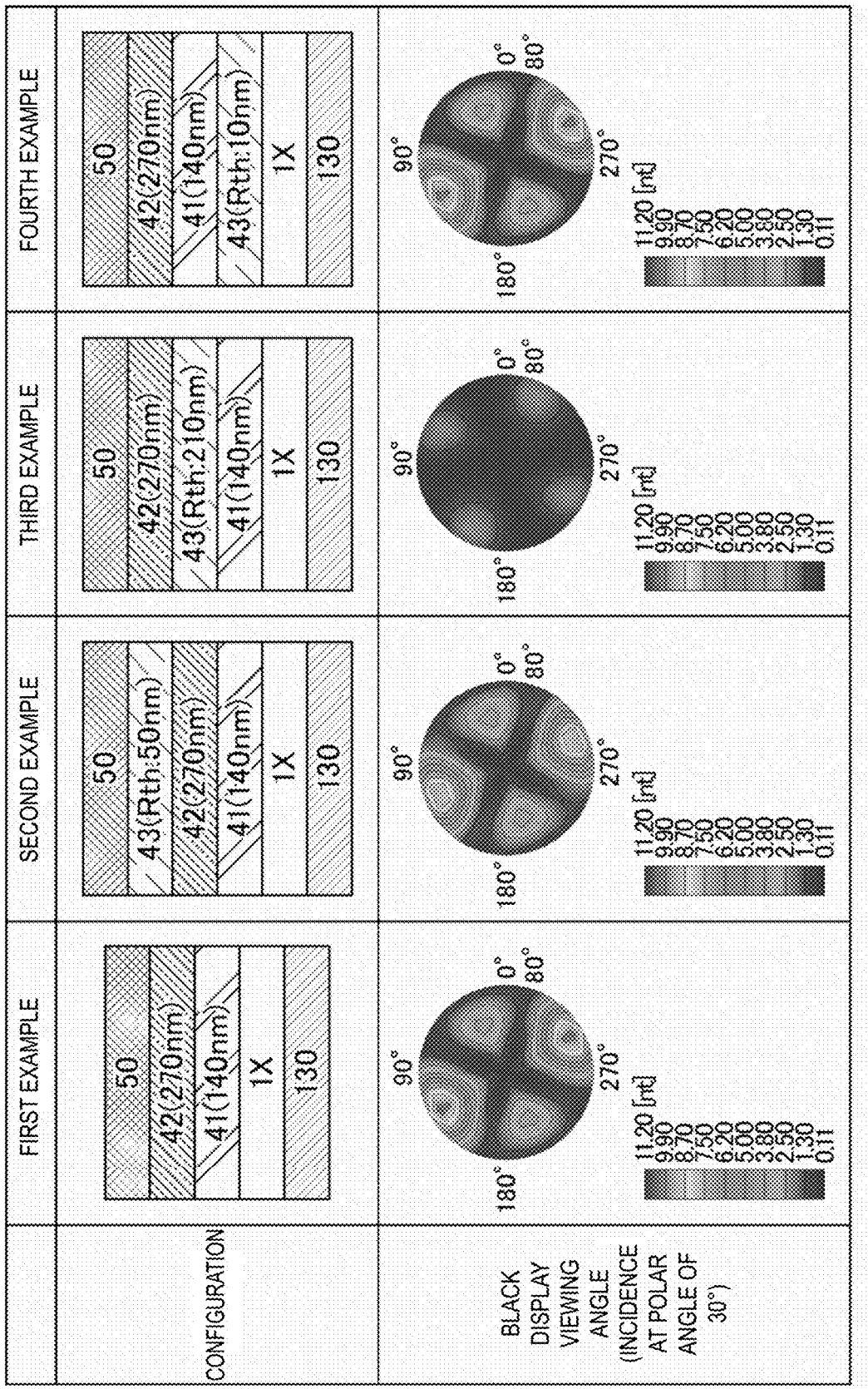
FIG. 15A is a diagram showing simulation results for a case where a liquid crystal material is a positive type in the second embodiment.
Figure 15B:
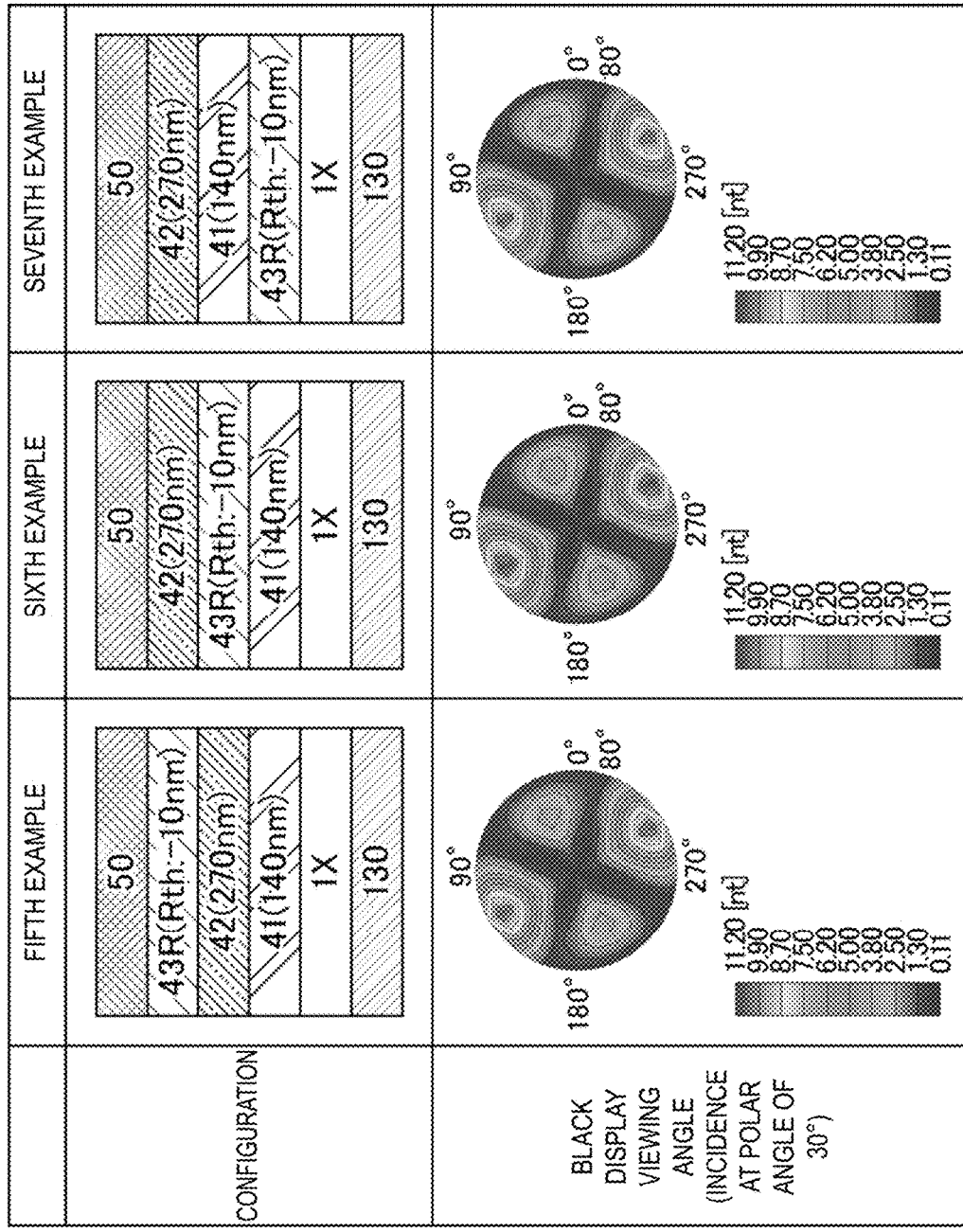
FIG. 15B is a diagram showing simulation results for a case where a liquid crystal material is a positive type in the second embodiment.

FIGS. 15A and 15B are diagrams showing simulation results for a case where a liquid crystal material is a positive type in the present embodiment. An example in which the C plate is not included is shown as a first example. Upper parts of FIGS. 15A and 15B show schematic cross-sectional views of the liquid crystal display device 1 in each example (only a reflective layer 130 is shown separately from the liquid crystal panel 1X), and lower parts thereof show a viewing angle in black display (0 V) (when light is incident at a polar angle of 30°). The thickness direction retardation Rth of the C plate used in each example is described in parentheses after reference numeral 43 or 43R representing the C plate (the same applies to other similar drawings).

Figure 16:
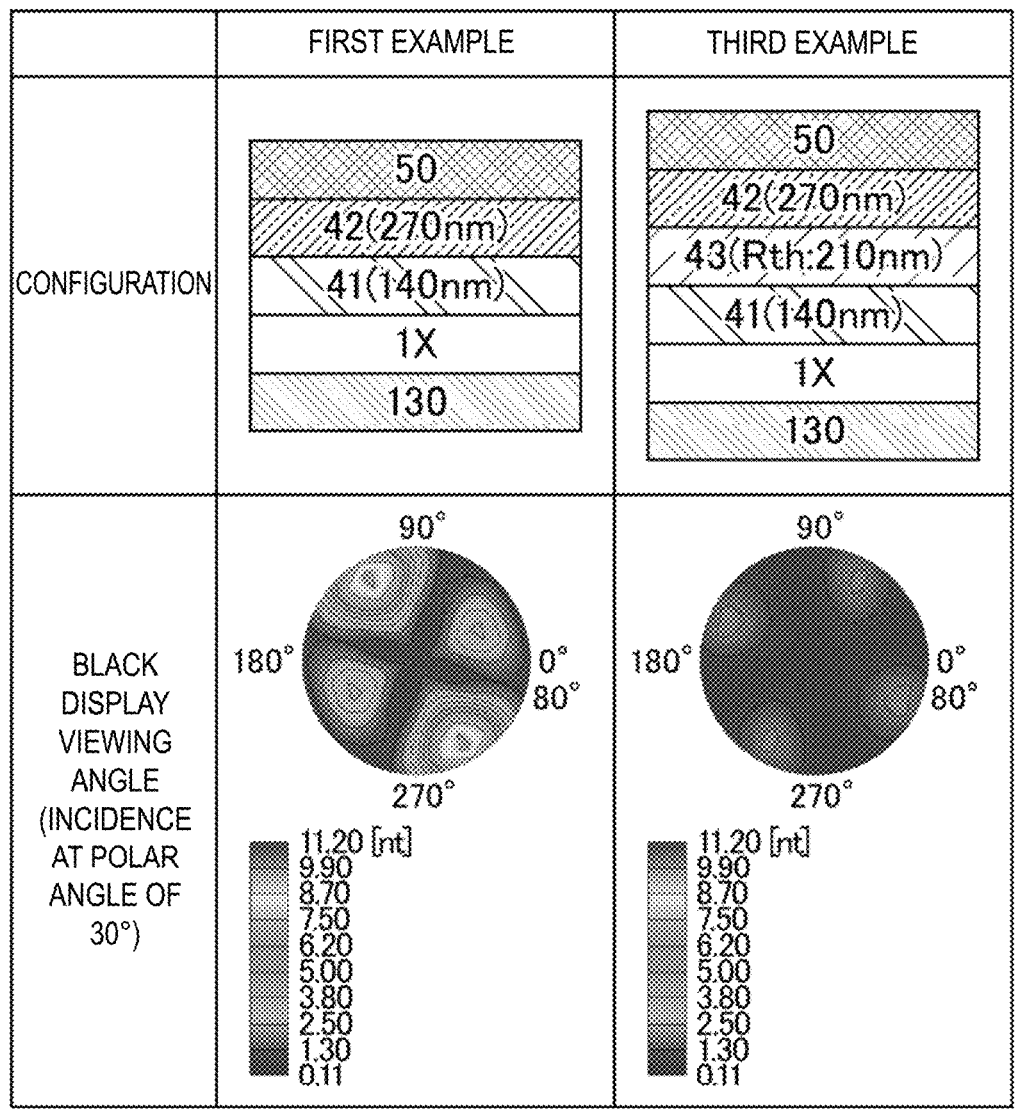
FIG. 16 is a diagram showing simulation results for a first example and a third example.

From FIG. 15A and FIG. 15B, it was found that a viewing angle improvement effect is more excellent in the examples (a second example, a third example, and a fourth example) in which the retardation layer 40 includes the positive C plate 43 than in the examples (a fifth example, a sixth example, and a seventh example) in which the retardation layer 40 includes the negative C plate 43R. Among them, in the example (third example) in which the positive C plate 43 is located between the λ/4 plate 41 and the λ/2 plate 42, black floating is significantly improved, and a viewing angle improvement effect can be remarkably confirmed. In addition, when a test cell having the same arrangement as that in the third example was manufactured and verified using an actual positive C plate (Rth: 200 nm), it was confirmed that a viewing angle improving effect was also obtained by visual observation. For easy comparison, FIG. 16 shows schematic cross-sectional views of the liquid crystal display devices 1 in the first and third examples and a viewing angle in black display (0 V) (when light is incident at a polar angle of 30°). FIG. 16 is a diagram showing simulation results for the first and third examples.

Figure 17:
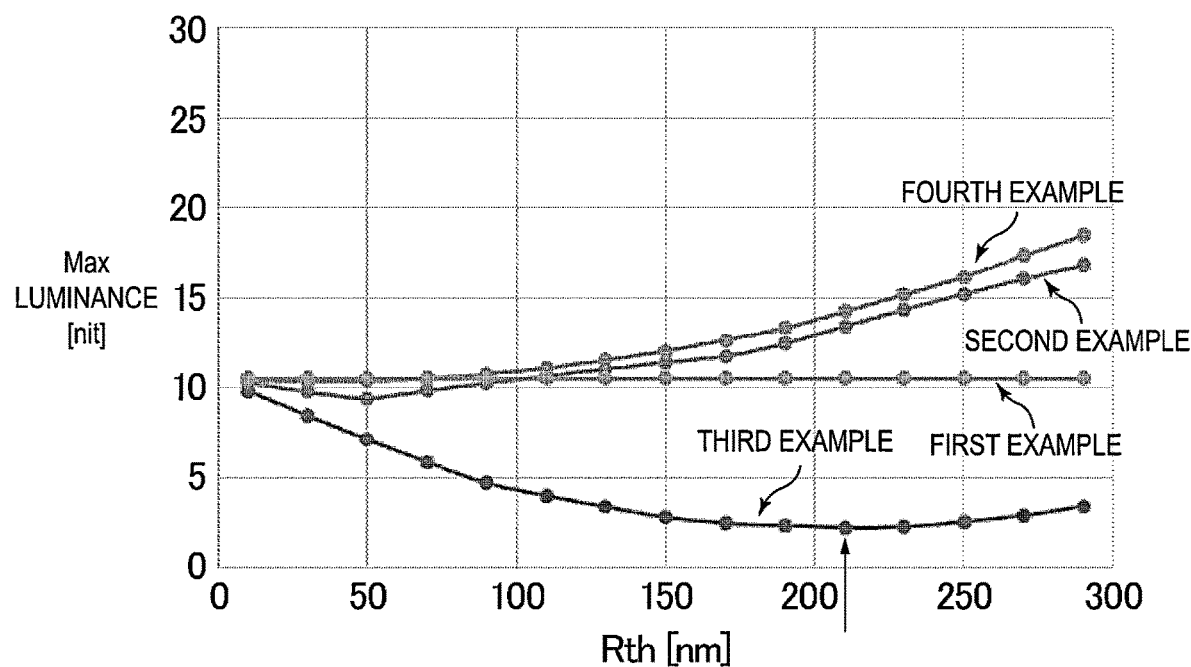
FIG. 17 is a graph showing a distribution of maximum values of black luminance for the first to fourth examples.

In addition, with respect to an aspect in which the retardation layer 40 includes the positive C plate 43 in addition to the λ/4 plate 41 and the λ/2 plate 42, optimization of optical conditions for minimizing black floating was performed. That is, for the configuration examples in the first to fourth examples, a luminance distribution at an azimuth angle of 0° to 360° (15° step) and a polar angle of 0° to 80° (10° step) was analyzed as incident light at a polar angle of 30° in a black display (0 V) state. The results are shown in FIG. 17. FIG. 17 is a graph showing a distribution of maximum values of black luminance for the first to fourth examples. In FIG. 17, the horizontal axis represents Rth (nm) of the positive C plate 43, and the vertical axis represents a maximum value of black luminance.

From FIG. 17, it is apparent that the maximum value of black luminance is the lowest in the third example among the first to fourth examples. Further, in a distribution curve of the third example, it is understood that the vertical axis (maximum value of black luminance) represents a value of within 30% based on a minimum value (indicated by an arrow) thereof when Rth of the positive C plate 43 is 150 nm or more and 270 nm or less, the vertical axis represents a value of within 15% when Rth is 160 nm or more and 250 nm or less, and the vertical axis represents a value of within 10% when Rth is 170 nm or more and 240 nm or less. Based on this result, it is found that a preferable range of the thickness direction retardation Rth is as described above.

(ii) When Liquid Crystal Material is a Negative Type

In the liquid crystal display device 1 including a reflective-type liquid crystal panel 1X using a negative-type liquid crystal material, the retardation layer 40, and the polarizer 50, a triple-layer structure of the λ/4 plate 41, the λ/2 plate 42, and the positive C plate 43 or the negative C plate 43R was assumed as the retardation layer 40, and the influence on a viewing angle due to the addition of the C plate was examined by changing the position of the C plate. LCD Master 1D manufactured by SHINTECH Co., Ltd. was used as simulation software. A uniaxial retardation plate having a retardation of 140 nm was used as the λ/4 plate 41, a uniaxial retardation plate having a retardation of 270 nm was used as the λ/2 plate 42, and a wavelength dispersion of each of these retardation plates was set to be flat. The other settings were the optimum settings obtained in the first embodiment when the liquid crystal material was a negative type.

Figure 18:
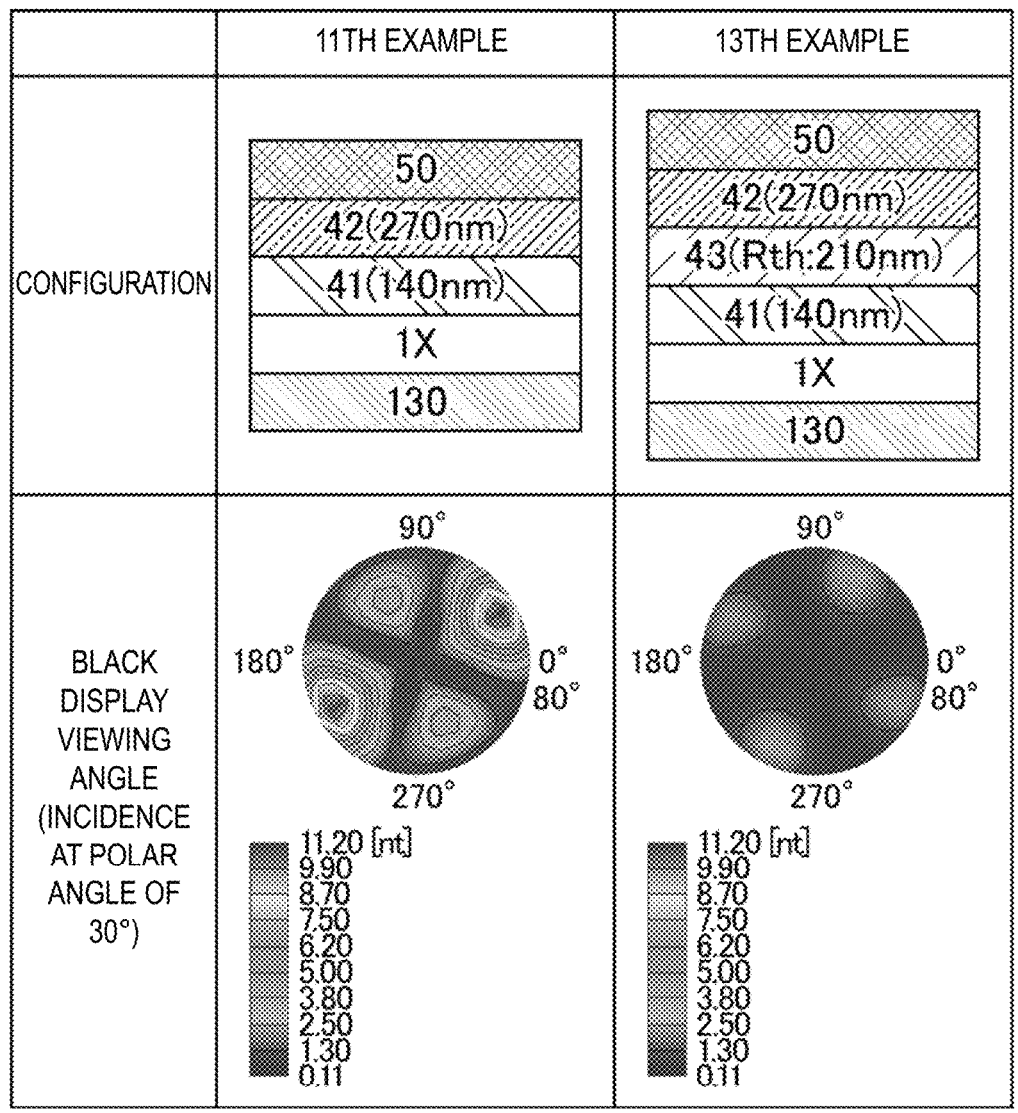
FIG. 18 is a diagram showing simulation results for a case where a liquid crystal material is a negative type in the second embodiment.

As a result, substantially the same tendency as that when the liquid crystal material is a positive type (see FIGS. 15A and 15B) was obtained, and thus, FIG. 18 shows only selected simulation results of an example (13th example) in which the positive C plate 43 is located between the λ/4 plate 41 and the λ/2 plate 42 and an example (11th example) in which the C plate is not included. FIG. 18 is a diagram showing simulation results for a case where a liquid crystal material is a negative type in the present embodiment. An upper part of FIG. 18 shows a schematic cross-sectional view of the liquid crystal display device 1 in each example (only a reflective layer 130 is shown separately from the liquid crystal panel 1X), and a lower part thereof shows a viewing angle in black display (0 V) (when light is incident at a polar angle of 30°).

Figure 19:
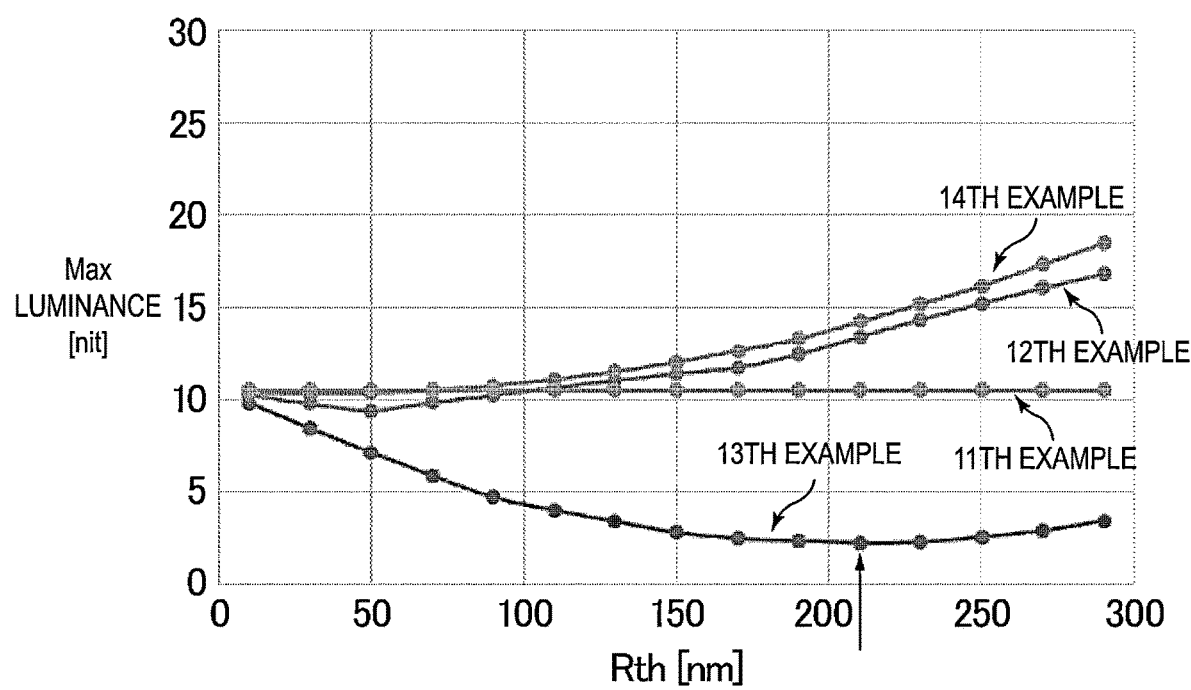
FIG. 19 is a graph showing a distribution of maximum values of black luminance for the 11th to 14th examples.

In addition, with respect to an aspect in which the retardation layer 40 includes the positive C plate 43 in addition to the λ/4 plate 41 and the λ/2 plate 42, optimization of optical conditions for minimizing black floating was performed. That is, for the following configuration examples in the 11th to 14th examples, a luminance distribution at an azimuth angle of 0° to 360° (15° step) and a polar angle of 0° to 80° (10° step) was analyzed as incident light at a polar angle of 30° in a black display (0 V) state. The results are shown in FIG. 19. FIG. 19 is a graph showing a distribution of maximum values of black luminance for the 11th to 14th examples. In FIG. 19, the horizontal axis represents Rth (nm) of the positive C plate 43, and the vertical axis represents a maximum value of black luminance.

11th example: Example in which C plate is not included.
12th example: Example in which positive C plate 43 (thickness direction retardation Rth: 50 nm), λ/2 plate 42, and λ/4 plate 41 are disposed in this order from observation face side for arrangement of retardation plates.
13th example: Example in which λ/2 plate 42, positive C plate 43 (thickness direction retardation Rth: 210 nm), and λ/4 plate 41 are disposed in this order from observation face side for arrangement of retardation plates.
14th example: Example in which λ/2 plate 42, λ/4 plate 41, and positive C plate 43 (thickness direction retardation Rth: 10 nm) are disposed in this order from observation face side for arrangement of retardation plates.

From FIG. 19, it is apparent that the maximum value of black luminance is the lowest in the 13th example among the 11th to 14th examples. Further, in a distribution curve of the 13th example, it was found that the vertical axis (maximum value of black luminance) represents a value of within 30% based on a minimum value (indicated by an arrow) thereof when Rth of the positive C plate 43 is 150 nm or more and 270 nm or less, the vertical axis represents a value of within 15% when Rth is 160 nm or more and 250 nm or less, and the vertical axis represents a value of within 10% when Rth is 170 nm or more and 240 nm or less. That is, the same tendency as that when the liquid crystal material was a positive type (see FIG. 17) was obtained. Based on this result, it was found that a preferable range of the thickness direction retardation Rth was as described above.

Third Embodiment

In the present embodiment, features unique to the present embodiment will be mainly described, and a description of contents overlapping the above-described first embodiment will be omitted. The present embodiment is substantially the same as the second embodiment except that a retardation layer 40 includes another positive C plate 44 in addition to a positive C plate 43. For convenience, the positive C plate 43 described above in the second embodiment is also referred to as a first positive C plate 43, and the positive C plate 44 added in the present embodiment is also referred to as a second positive C plate 44.

Figure 20:
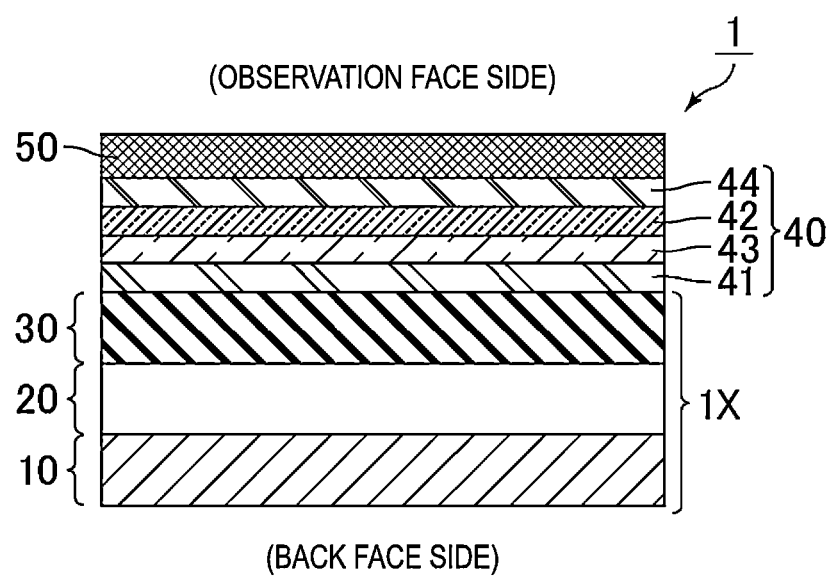
FIG. 20 is a schematic cross-sectional view of a liquid crystal display device 1 according to an example of a third embodiment.

FIG. 20 is a schematic cross-sectional view of a liquid crystal display device 1 according to an example of the present embodiment. As shown in FIG. 20, the liquid crystal display device 1 includes a first substrate 10, a liquid crystal layer 20, a second substrate 30, the retardation layer 40, and a polarizer 50, in order from the back face side. The retardation layer 40 includes the first positive C plate 43 and the second positive C plate 44 in addition to a λ/4 plate 41 and a λ/2 plate 42. The positive C plate 44 may be constituted by a single film or may be a layered body of two or more retardation films.

When the retardation layer 40 includes the first positive C plate 43 and the second positive C plate 44, it is possible to achieve both further improvements in a viewing angle and a contrast ratio. In particular, black floating is further suppressed as compared with the second embodiment. From the viewpoint of further exhibiting such an effect, the second positive C plate 44 is preferably located between the λ/2 plate 42 and the polarizer 50. That is, in the retardation layer 40, it is suitable that the λ/4 plate 41, the first positive C plate 43, the λ/2 plate 42, and the second positive C plate 44 are located in order from the liquid crystal layer 20 (and the second substrate 30) side (see FIG. 20).

As long as the second positive C plate 44 is a retardation plate satisfying "nz>nx≈ny", the second positive C plate 44 may be the same as the first positive C plate 43 (may have the same physical properties, the same thickness, and the like) or may be different from the first positive C plate 43. However, from the viewpoint of further exhibiting a viewing angle improvement effect, a thickness direction retardation Rth (absolute value) of the second positive C plate 44 is preferably 50 nm to 130 nm. The thickness direction retardation is more preferably 70 nm to 120 nm, and still more preferably 80 nm to 115 nm.

The thickness of the second positive C plate 44 is preferably, for example, 0.1 μm to 100 μm. Within this range, more excellent mechanical strength and display uniformity can be obtained. The thickness is more preferably 0.1 μm to 80 μm, and still more preferably 0.1 μm to 50 μm. When the positive C plate 44 has a layered structure, it is preferable that the total thickness of the positive C plate 44 be set to be in the above-described range, and the thicknesses of the retardation films may be the same or different from each other.

Effects and the like obtained by including the first positive C plate 43 and the second positive C plate 44 have been found by verification using optical simulation by the inventors of the disclosure. Verification results will be described below separately for a case where the liquid crystal material constituting the liquid crystal layer 20 is a positive type and a case where the liquid crystal material constituting the liquid crystal layer 20 is a negative type. The absorption-type polarizer is used as the polarizer 50.

(i) When Liquid Crystal Material is a Positive Type

In the liquid crystal display device 1 including a reflective-type liquid crystal panel 1X using a positive-type liquid crystal material, the retardation layer 40, and the polarizer 50, a four-layer structure in which the λ/2 plate 42, the first positive C plate 43 (thickness direction retardation Rth: 210 nm), the λ/4 plate 41, and the second positive C plate 44 (thickness direction retardation Rth: 110 nm) are disposed in this order from the observation face side was assumed as the retardation layer 40, and the influence on a viewing angle due to the addition of the second positive C plate 44 was examined (23rd example). LCD Master 1D manufactured by SHINTECH Co., Ltd. was used as simulation software. A uniaxial retardation plate having a retardation of 140 nm was used as the λ/4 plate 41, a uniaxial retardation plate having a retardation of 270 nm was used as the λ/2 plate 42, and a wavelength dispersion of each of these retardation plates was set to be flat. The other settings were the optimum settings obtained in the first embodiment when the liquid crystal material was a positive type. The results are shown in FIG. 21.

Figure 21:
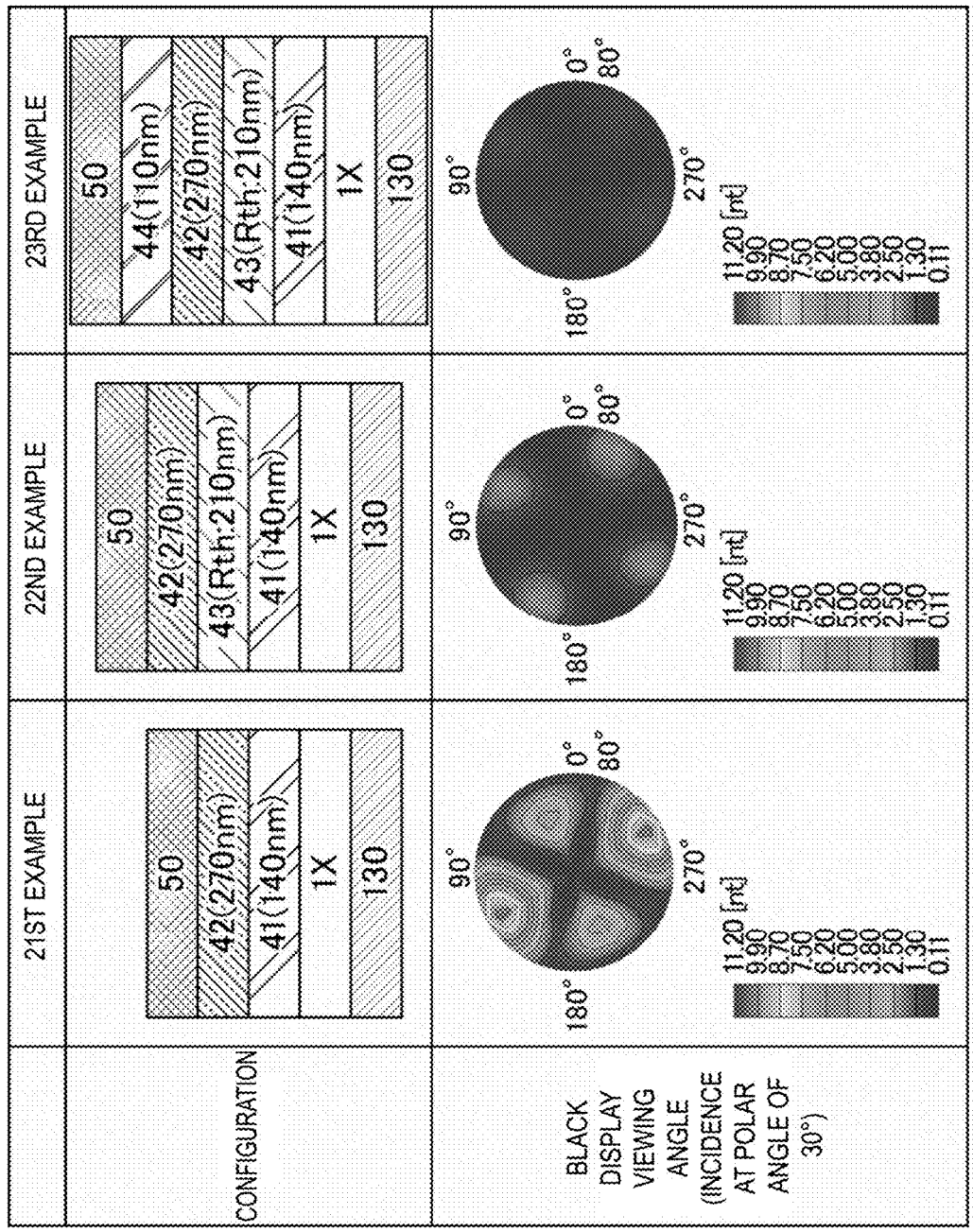
FIG. 21 is a diagram showing simulation results for a case where a liquid crystal material is a positive type in the third embodiment.

FIG. 21 is a diagram showing simulation results for a case where a liquid crystal material is a positive type in the present embodiment. An example in which the C plate is not included is defined as a 21st example, and an example in which the first positive C plate 43 is included but the second positive C plate 44 is not included is defined as a 22nd example. An upper part of FIG. 21 shows a schematic cross-sectional view of the liquid crystal display device 1 in each example (only a reflective layer 130 is shown separately from the liquid crystal panel 1X), and a lower part thereof shows a viewing angle in black display (0 V) (when light is incident at a polar angle of 30°).

Figure 22:
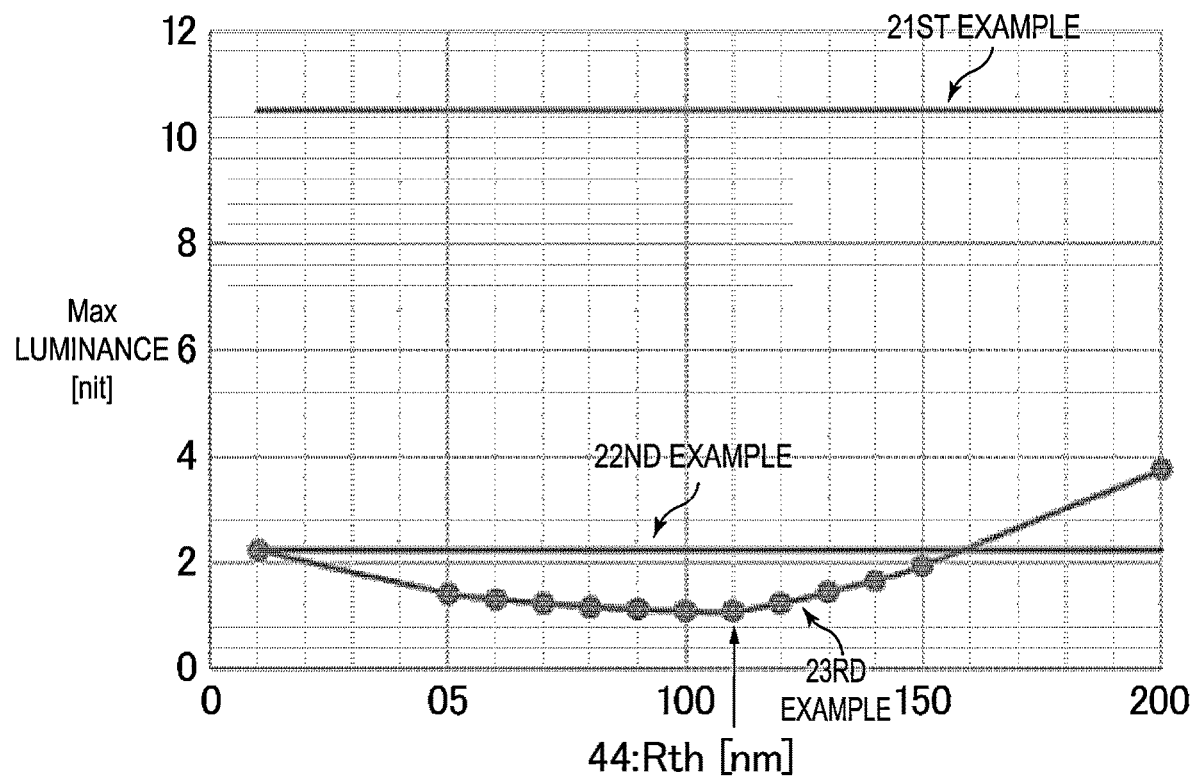
FIG. 22 is a graph showing a distribution of maximum values of black luminance for the 21st to 23rd examples.

In addition, for the 21st to 23rd examples, a luminance distribution at an azimuth angle of 0° to 360° (15° step) and a polar angle of 0° to 80° (10° step) was analyzed as incident light at a polar angle of 30° in a black display (0 V) state. The results are shown in FIG. 22. FIG. 22 is a graph showing a distribution of maximum values of black luminance for the 21st to 23rd examples. In FIG. 22, the horizontal axis represents Rth (nm) of the second positive C plate 44, and the vertical axis represents a maximum value of black luminance.

From FIG. 22, in a distribution curve of the 22nd example, it was found that the vertical axis (maximum value of black luminance) represents a value of within 30% based on a minimum value (indicated by an arrow) thereof when Rth of the second positive C plate 44 is 50 nm or more and 130 nm or less, the vertical axis represents a value of within 15% when Rth is 70 nm or more and 120 nm or less, and the vertical axis represents a value of within 10% when Rth is 80 nm or more and 115 nm or less. Based on this result, it is found that a preferable range of the thickness direction retardation Rth of the second positive C plate 44 is as described above.

(ii) When Liquid Crystal Material is a Negative Type

In the liquid crystal display device 1 including a reflective-type liquid crystal panel 1X using a negative-type liquid crystal material, the retardation layer 40, and the polarizer 50, a four-layer structure in which the λ/2 plate 42, the first positive C plate 43 (thickness direction retardation Rth: 210 nm), the λ/4 plate 41, and the second positive C plate 44 (thickness direction retardation Rth: 110 nm) are disposed in this order from the observation face side was assumed as the retardation layer 40, and the influence on a viewing angle due to the addition of the second positive C plate 44 was examined (33rd example). LCD Master 1D manufactured by SHINTECH Co., Ltd. was used as simulation software. A uniaxial retardation plate having a retardation of 140 nm was used as the λ/4 plate 41, a uniaxial retardation plate having a retardation of 270 nm was used as the λ/2 plate 42, and a wavelength dispersion of each of these retardation plates was set to be flat. The other settings were the optimum settings obtained in the first embodiment when the liquid crystal material was a positive type. The results are shown in FIG. 23.

Figure 23:
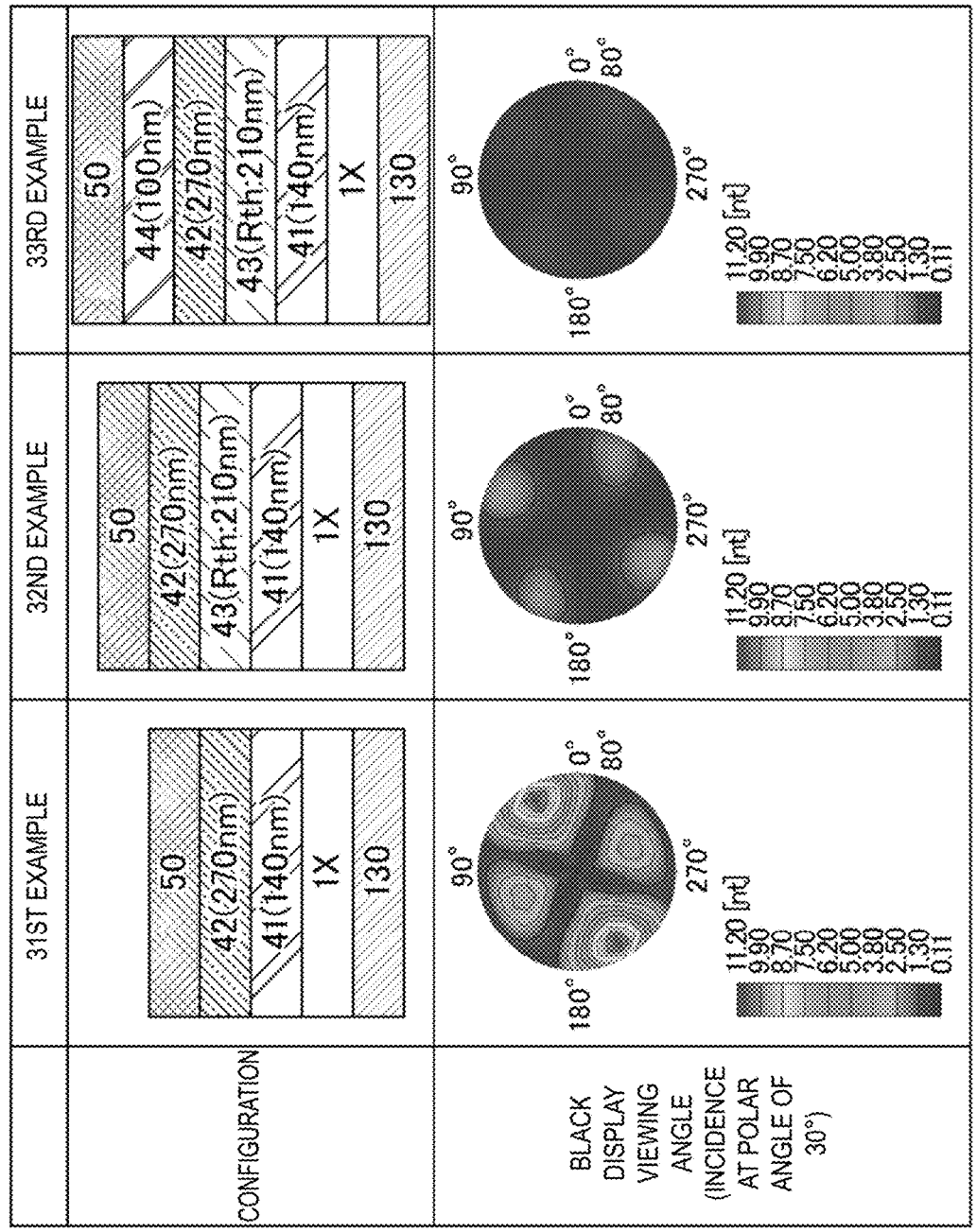
FIG. 23 is a diagram showing simulation results for a case where a liquid crystal material is a negative type in the third embodiment.

FIG. 23 is a diagram showing simulation results for a case where a liquid crystal material is a negative type in the present embodiment. An example in which the C plate is not included is defined as a 31st example, and an example in which the first positive C plate 43 is included but the second positive C plate 44 is not included is defined as a 32nd example. An upper part of FIG. 23 shows a schematic cross-sectional view of the liquid crystal display device 1 in each example (only a reflective layer 130 is shown separately from the liquid crystal panel 1X), and a lower part thereof shows a viewing angle in black display (0 V) (when light is incident at a polar angle of 30°).

Figure 24:
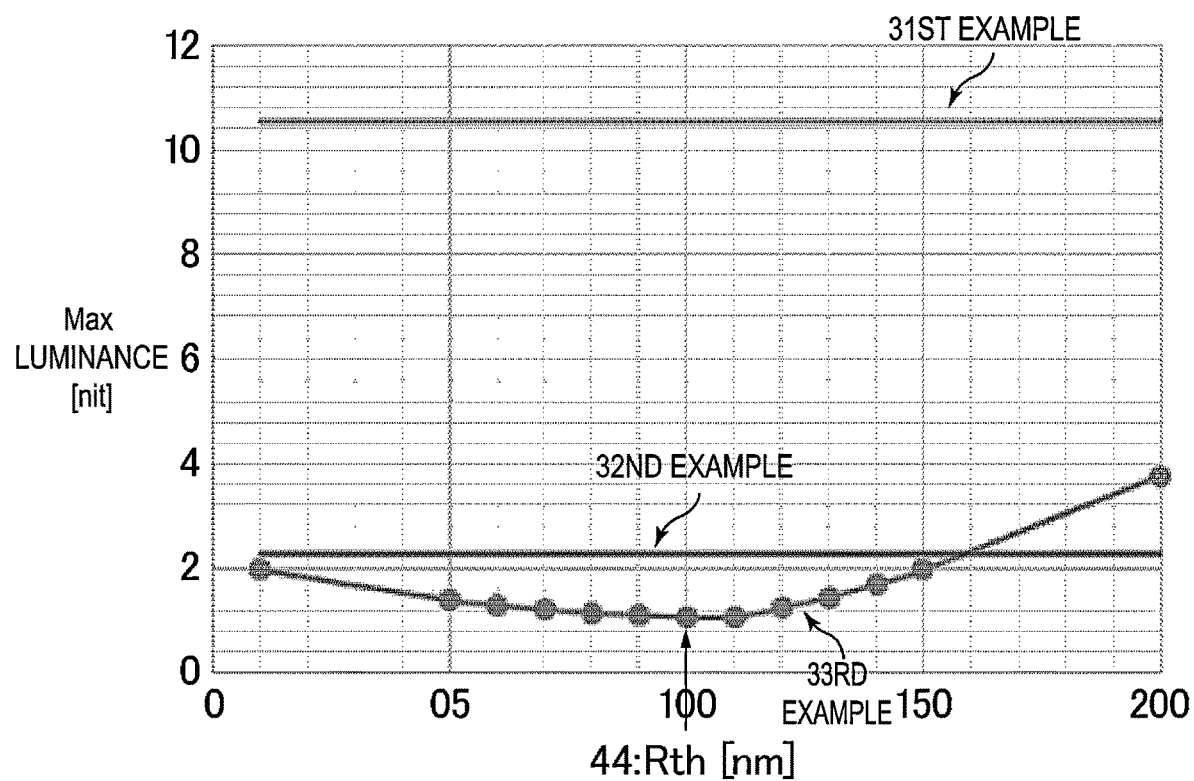
FIG. 24 is a graph showing a distribution of maximum values of black luminance for the 31st to 33rd examples.

In addition, for the 31st to 33rd examples, a luminance distribution at an azimuth angle of 0° to 360° (15° step) and a polar angle of 0° to 80° (10° step) was analyzed as incident light at a polar angle of 30° in a black display (0 V) state. The results are shown in FIG. 24. FIG. 24 is a graph showing a distribution of maximum values of black luminance for the 31st to 33rd examples. In FIG. 24, the horizontal axis represents Rth (nm) of the second positive C plate 44, and the vertical axis represents a maximum value of black luminance.

From FIG. 24, in a distribution curve of the 32nd example, it was found that the vertical axis (maximum value of black luminance) represents a value of within 30% based on a minimum value (indicated by an arrow) thereof when Rth of the second positive C plate 44 is 50 nm or more and 130 nm or less, the vertical axis represents a value of within 15% when Rth is 70 nm or more and 120 nm or less, and the vertical axis represents a value of within 10% when Rth is 80 nm or more and 115 nm or less. That is, the same tendency as that when the liquid crystal material was a positive type (see FIG. 22) was obtained. Based on this result, it is found that a preferable range of the thickness direction retardation Rth of the second positive C plate 44 is as described above.

Fourth Embodiment

In the present embodiment, features unique to the present embodiment will be mainly described, and a description of contents overlapping the above-described first embodiment will be omitted. Although the reflective liquid crystal display device has been described as an example in the first embodiment, a transflective liquid crystal display device will be described in the present embodiment. A liquid crystal display device according to the present embodiment is different from the liquid crystal display device according to the first embodiment mainly in that a light source is provided closer to a back face side than a liquid crystal layer 20.

Figure 25:
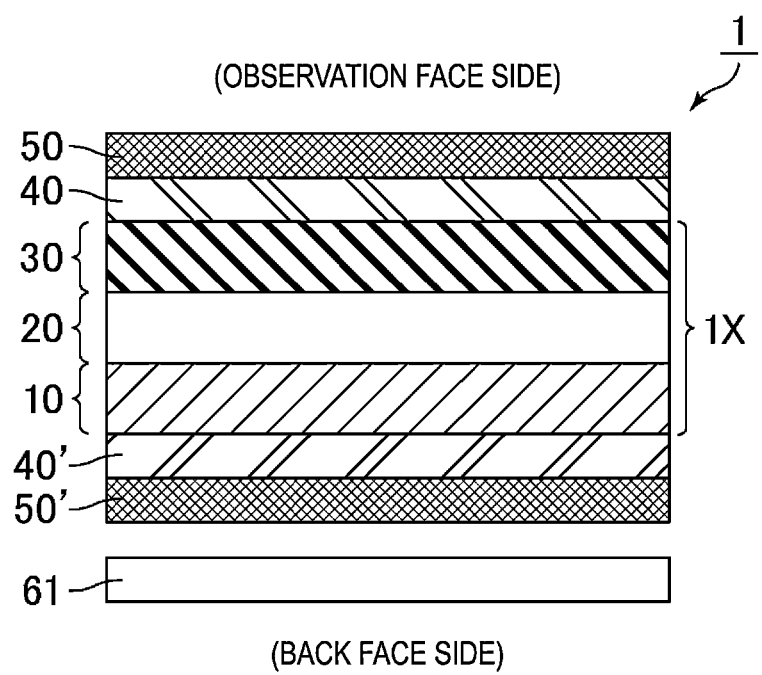
FIG. 25 is a schematic cross-sectional view of a liquid crystal display device according to an example of a fourth embodiment.

FIG. 25 is a schematic cross-sectional view of a liquid crystal display device 1 according to an example of the present embodiment. The liquid crystal display device 1 further includes a light source 61 (also referred to as a backlight) closer to the back face side than the liquid crystal layer 20. In addition, it is preferable to further include a polarizer 50' and a retardation layer 40'. More preferably, as shown in FIG. 25, the liquid crystal display device 1 includes the light source 61, the polarizer 50', the retardation layer 40', a first substrate 10, the liquid crystal layer 20, a second substrate 30, a retardation layer 40, and a polarizer 50, in order from the back face side. Also in the present embodiment, the TFT substrate is suitable as the first substrate 10.

The light source 61 (backlight) is not particularly limited as long as the light source 61 emits light, and may be a direct type, an edge type, or any other type. Specifically, for example, the light source 61 preferably has a light source such as a light emitting diode (LED), a light guide plate, and a reflective sheet, and may further include a diffuser sheet or a prism sheet.

The polarizer 50' is disposed on the back face side of the liquid crystal layer 20. More specifically, the polarizer 50' is disposed closer to the back face side than the first substrate 10. The polarizer 50' may be a circular polarizer or a linear polarizer, but is preferably a linear polarizer. In addition, the polarizer 50' may be an absorption-type polarizer or a reflection-type polarizer, but is preferably an absorption-type polarizer. In particular, an absorption-type linear polarizer is suitably used.

The polarization axis of the polarizer 50' may be disposed to be substantially orthogonal to the polarization axis of the polarizer 50 or to be substantially parallel thereto. That is, the polarizer 50' may be disposed in crossed nicols or in parallel nicols with the polarizer 50. In particular, a crossed-nicols arrangement is suitable.

The retardation layer 40' is disposed between the polarizer 50' and the liquid crystal layer 20. More specifically, the retardation layer 40' is disposed between the polarizer 50' and the first substrate 10. The retardation layer 40' may include, for example, a λ/4 plate and a λ/2 plate. When such members are arranged, for example, the λ/2 plate and the λ/4 plate are suitably arranged in order from the back face side.

Figure 26:
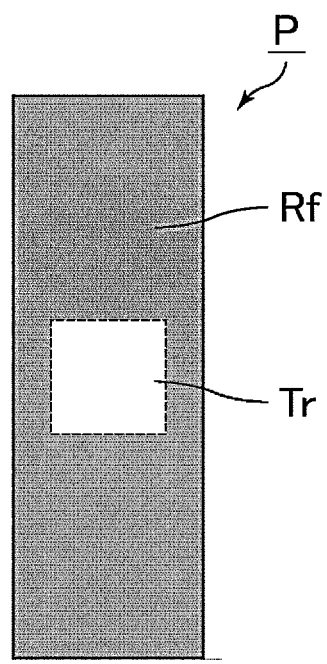
FIG. 26 is a schematic plan view conceptually showing each pixel P having a reflective region Rf and a transmissive region Tr in the liquid crystal display device 1 according to the fourth embodiment.

In the liquid crystal display device 1 according to the present embodiment, each pixel P has a reflective region Rf for display in a reflection mode and a transmissive region Tr for display in a transmission mode (see FIG. 26). FIG. 26 is a schematic plan view conceptually showing that each pixel P has the reflective region Rf and the transmissive region Tr in the liquid crystal display device 1 according to the present embodiment. The reflective layer 130 (see, for example, FIG. 2) is disposed in the reflective region Rf, but the reflective layer 130 is not disposed in the transmissive region Tr. A proportion of an area occupied by the transmissive region Tr in each pixel P can be set as appropriate depending on each application, but is preferably 20% or more and 90% or less, for example. In addition, the position and the shape of the transmissive region Tr within the pixel P may also be appropriately set depending on the application or the like.

In the liquid crystal display device according to the present embodiment, that is, a transflective liquid crystal display device, similarly to the reflective liquid crystal display device, by performing display in the transverse electrical field mode in which the liquid crystal layer 20 takes the twist alignment when no voltage is applied, it is possible to sufficiently improve the contrast ratio of the reflective display. Thus, the liquid crystal display device 1 according to the present embodiment is also capable of improving the contrast ratio at a low cost and is useful as the in-cell type touch panel capable of performing display in the reflection mode.

Fifth Embodiment

In the present embodiment, features unique to the present embodiment will be mainly described, and a description of contents overlapping the above-described first embodiment will be omitted. The liquid crystal display device according to the present embodiment is different from the liquid crystal display device according to the first embodiment mainly in that the light source is provided closer to the observation face side than the liquid crystal layer 20. The liquid crystal display device according to the present embodiment is the reflective liquid crystal display device.

Figure 27:
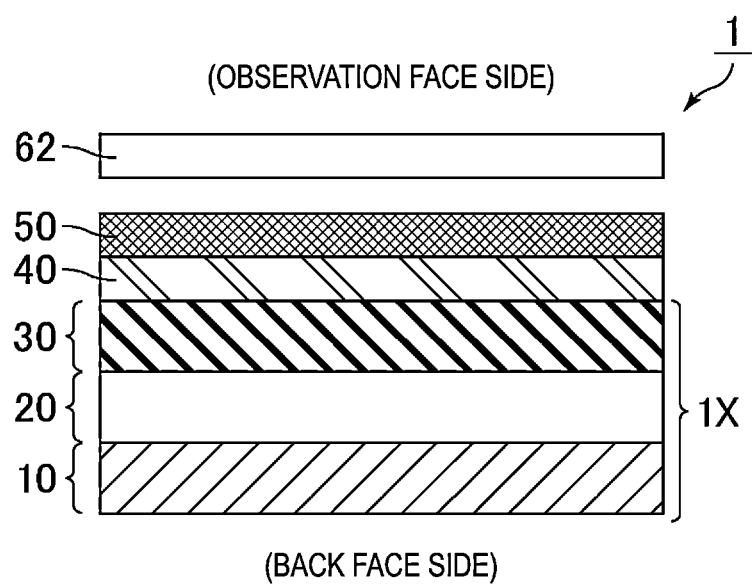
FIG. 27 is a schematic cross-sectional view of a liquid crystal display device according to an example of a fifth embodiment.

FIG. 27 is a schematic cross-sectional view of a liquid crystal display device 1 according to an example of the present embodiment. The liquid crystal display device 1 according to the present embodiment further includes a light source 62 (also referred to as a front light) closer to the observation face side than the liquid crystal layer 20. More preferably, as shown in FIG. 27, the liquid crystal display device 1 according to the present embodiment includes the first substrate 10, the liquid crystal layer 20, the second substrate 30, the retardation layer 40, the polarizer 50, and the light source 62, in order from the back face side. Also in the present embodiment, the TFT substrate is suitable as the first substrate 10.

The light source 62 (front light) is not particularly limited as long as the light source 62 emits light. Specifically, for example, the light source 62 preferably includes a light source such as a light-emitting diode (LED) and a light guide plate. Since the reflective liquid crystal display device 1 further includes the light source 62, a bright reflective display can be performed even in an environment where sufficient ambient light is not available.

Although the embodiments of the disclosure have been described above, all the individual matters described can be applied to the disclosure in general.

The disclosure will be described in more detail with reference to Examples and the like below, but the disclosure is not limited to such Examples. In the following description, the absorption-type polarizer is used as the polarizer 50.

Examples 1 and 2

Figure 28A:
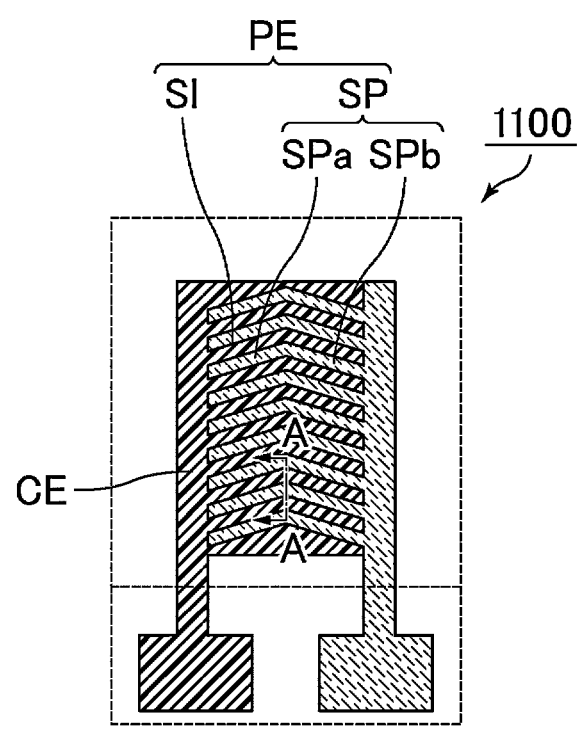
FIG. 28A is a schematic plan view showing the structure of a liquid crystal cell 1100 when viewed from the front.
Figure 28B:
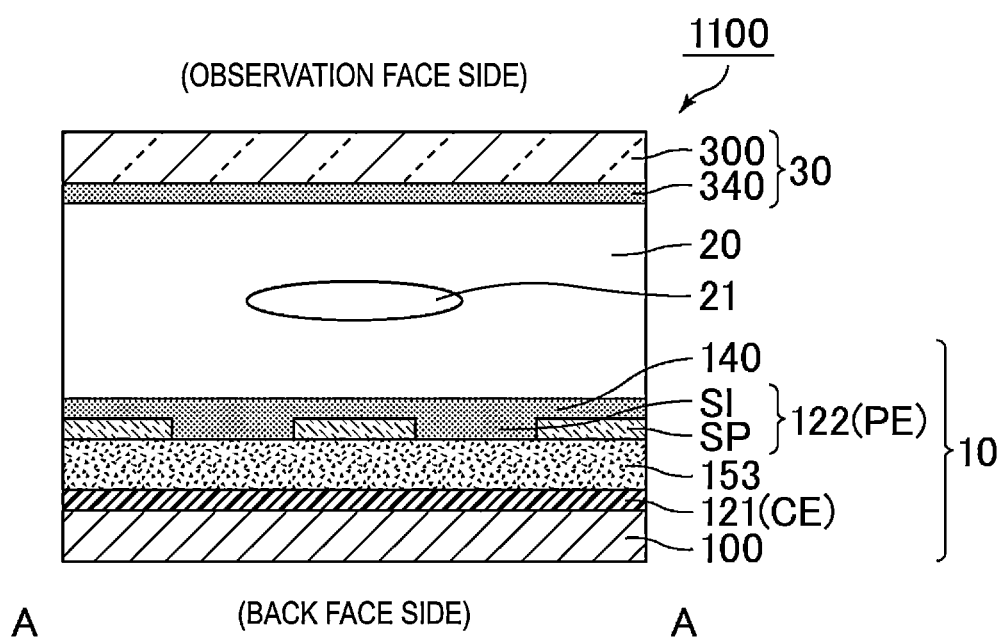
FIG. 28B is a schematic cross-sectional view taken along line A-A' in FIG. 28A (A-A' line cross-sectional view).

As shown in FIG. 28B, a liquid crystal cell 1100 for obtaining a test cell 1000 included a first substrate 10, a second substrate 30, and a liquid crystal layer 20 provided between these substrates. FIG. 28A is a schematic plan view showing the structure of the liquid crystal cell 1100 when viewed from the front. FIG. 28B is a schematic cross-sectional view taken along line A-A' in FIG. 28A (A-A' line cross-sectional view).

As shown in FIG. 28B, the first substrate 10 included a glass substrate 100, and included, on the glass substrate, a common electrode CE as a first electrode 121, a dielectric layer 153, a pixel electrode PE as a second electrode 122, and a first horizontal alignment film 140 in this order. The common electrode CE was formed of ITO, and the thickness of the common electrode CE is 100 nm. The dielectric layer 153 was formed of silicon nitride (SiNx), and the thickness of the dielectric layer 153 was 300 nm. The pixel electrode PE was formed of ITO, and the thickness of the pixel electrode PE was 100 nm. The pixel electrode PE included a plurality of strip portions SP and a plurality of slits S1. The width of each strip portion SP was 3 μm, and the width of each slit S1 (an interval between two strip portions SP adjacent to each other) was 5 μm. Each strip portion SP was bent in a dogleg shape. That is, each strip portion SP included a first portion SPa extending in a certain direction (first direction) and a second portion SPb extending in a direction (second direction) different from the first direction. A bending angle (an angle between each of the first portion SPa and the second portion SPb of the strip portion SP and the left-right direction in FIG. 28A) was 7°.

As shown in FIG. 28B, the second substrate 30 includes a glass substrate 300 and a second horizontal alignment film 340 provided on the glass substrate 300.

The thickness (cell gap) of the liquid crystal layer 20 is defined by plastic beads (not shown).

Alignment treatment for the first horizontal alignment film 140 and the second horizontal alignment film 340 was performed by optical alignment treatment or rubbing treatment.

When the optical alignment treatment was used, a photo-decomposition type optical alignment film material was used. The optical alignment film material was applied by a spin coating method, and the thickness of the alignment film was 1000 Å (that is, 100 nm). Unpolarized UV light emitted from a UV lamp unit was converted into polarized UV light by a wire grid polarizer, and the alignment film was irradiated with the polarized UV light, thereby performing the optical alignment treatment. An extinction ratio by the wire grid polarizer was 100:1. The wavelength of UV light effective for optical alignment was 220 nm to 260 nm, and the irradiation energy was 300 mJ/cm². The alignment orientation of liquid crystal molecules is a direction (particularly preferably a 90° direction) substantially orthogonal to a transmission axis direction of the polarized UV light.

When the rubbing treatment was used, the alignment treatment was performed by forming a horizontal alignment film and rubbing the formed horizontal alignment film with a rubbing roller (for example, a roller wrapped with cloth). Thereby, the uniaxial alignment orientation of the liquid crystal molecules was obtained. As an alignment film material suitable for operating the liquid crystal molecules in a transverse electrical field, a polyimide-based material is suitable. In addition, a material that does not generate a pretilt by rubbing treatment is suitable, and the material is commercially available. The liquid crystal molecules are aligned in parallel to a rubbing direction.

For the liquid crystal cell 1100 having the above-described structure, the retardation of the liquid crystal layer 20 was first measured using a polarimeter ("AxoScan" manufactured by Axometrics Inc.). Subsequently, a cell thickness was measured using a cell gap inspection device ("RetQC" manufactured by Otsuka Electronics Co., Ltd.).

Figure 29:
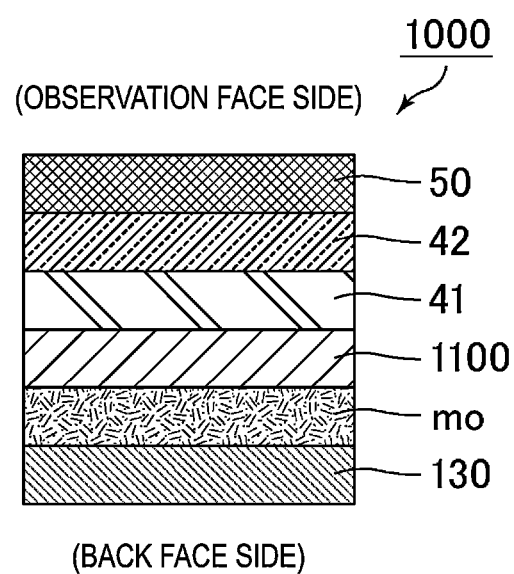
FIG. 29 is a schematic cross-sectional view of a test cell 1000.

Next, as shown in FIG. 29, the λ/4 plate 41, the λ/2 plate 42, and the polarizer 50 were bonded to the second substrate 30 side of the liquid crystal cell 1100 in this order (adhesive layer is not shown). "NPF-CRT1794KDUHC3" manufactured by Nitto Denko Corporation was used as the polarizer 50. As the λ/4 plate 41, "NZF-UF01A" (retardation: 140 nm) manufactured by Nitto Denko Corporation was used in Examples 1 and 3, and "NZF-UF01A" (retardation: 110 nm) manufactured by Nitto Denko Corporation was used in Examples 2 and 4. As the λ/2 plate 42, "NZF-UF01A" (retardation: 270 nm) manufactured by Nitto Denko Corporation was used in Examples 1 and 3, and "NZF-UF01A" (retardation: 260 nm) manufactured by Nitto Denko Corporation was used in Examples 2 and 4.

Thereafter, one drop of matching oil mo for reducing a loss due to interfacial reflection was dropped on a reflecting plate 130 having an uneven surface structure (MRS), and the liquid crystal cell 1100 was placed on the reflecting plate 130 with the first substrate 10 side facing downward. In this manner, the test cell 1000 was manufactured. Further, in this state, a voltage applied between the pixel electrode PE and the common electrode CE was changed to measure a reflectance. The voltage was applied to the pixel electrode PE and the common electrode CE using a function generator ("AFG1022" manufactured by TEKTRONIX Inc.) capable of applying a voltage of 0 V to 10 V with a rectangular wave of 30 Hz. The reflectance was measured using a spectrophotometer ("CM-2600d" manufactured by MINOLTA Co., Ltd.). FIG. 29 is a schematic cross-sectional view of the test cell 1000.

In Examples 1 and 2, the following examinations (a) to (d) were performed using the test cell 1000. In Examples 1 and 2, a liquid crystal material was a positive type, and a display mode was a TW-FFS mode. Optical axis settings (initial settings) and specifications of Example 1 are shown in Table 3 and FIG. 6, and optical axis settings (initial settings) and specifications of Example 2 are shown in Table 3. FIG. 6 is also a diagram conceptually showing optical axis settings of Example 1.

TABLE 3

|  | Unit | Example 1 | Example 2 |
|---|---|---|---|
| Liquid crystal material | — | Positive type | Positive type |
| Birefringence index (550 nm) of liquid crystal material | — | 0.069928 | 0.069928 |
| Display mode | — | TW-FFS | TW-FFS |
| Alignment orientation by first horizontal alignment film | Degree | 0 | 0 |
| Alignment orientation by second horizontal alignment film | Degree | 83 | 74 |
| Twist angle | Degree | 83 | 74 |
| Polarization axis angle of polarizer | Degree | −68.3 | 122.5 |
| Slow axis angle of λ/2 plate | Degree | −49.5 | 137 |
| Slow axis angle of λ/4 plate | Degree | −24.9 | 153.5 |
| Width of strip portion of pixel electrode | μm | 3 | 3 |
| Width of slit of pixel electrode | μm | 5 | 5 |
| Bending angle of strip portion | Degree | 7 | 7 |

Comparative Example 1

Figure 30A:
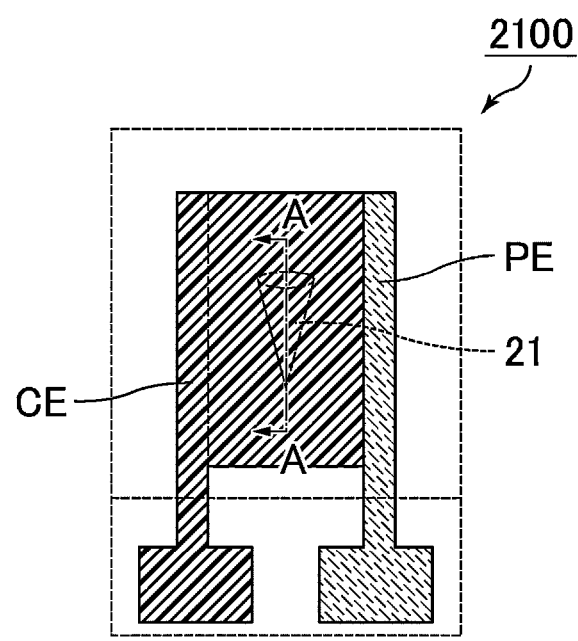
FIG. 30A is a schematic plan view showing the structure of a test cell 2000 (and a liquid crystal cell 2100) when viewed from the front.
Figure 30B:
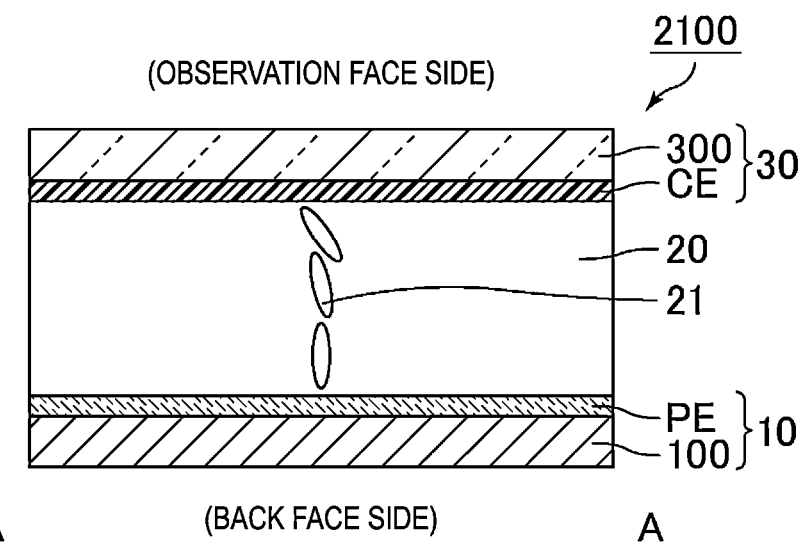
FIG. 30B is a schematic cross-sectional view taken along line A-A' in FIG. 30A (A-A' line cross-sectional view).

As shown in FIG. 30B, a liquid crystal cell 2100 for obtaining a test cell 2000 included a first substrate 10, a second substrate 30, and a liquid crystal layer 20 provided between these substrates. FIG. 30A is a schematic plan view showing the structure of the test cell 2000 (and the liquid crystal cell 2100) when viewed from the front. FIG. 30B is a schematic cross-sectional view taken along line A-A' in FIG. 30A (A-A' line cross-sectional view).

The first substrate 10 included a glass substrate 100, and a pixel electrode PE and a first vertical alignment film (not shown) were disposed in this order on the glass substrate 100. The second substrate 30 included a glass substrate 300, and a common electrode CE and a second vertical alignment film (not shown) were disposed in this order on the glass substrate 300. Among the vertical alignment films, only the second vertical alignment film disposed on the observation face side was subjected to optical alignment treatment. An alignment orientation of liquid crystal molecules 21 defined by the first vertical alignment film was a 90° direction (a pretilt angle is 88.4°).

Figure 31:
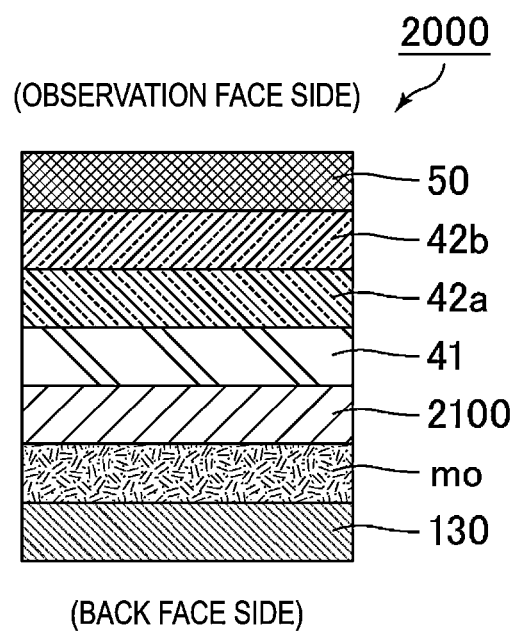
FIG. 31 is a schematic cross-sectional view of the test cell 2000.

As shown in FIG. 31, a λ/4 plate 41, a first λ/2 plate 42*a*, a second λ/2 plate 42*b*, and a polarizer 50 were bonded in this order (an adhesive layer is not shown) on the second substrate 30 side of the liquid crystal cell 2100. "NPF-CRT1794KDUHC3" manufactured by Nitto Denko Corporation was used as the polarizer 50, "NZF-UF01A" (retardation: 110 nm) manufactured by Nitto Denko Corporation was used as the λ/4 plate 41, and "NZF-UF01A" (retardation: 260 nm) manufactured by Nitto Denko Corporation was used as the λ/2 plates 42*a* and 42*b*. Then, one drop of matching oil mo was dropped on a reflecting plate 130 having an MRS, and the liquid crystal cell 2100 was placed on the reflecting plate 130 with the first substrate 10 side facing downward. In this manner, the test cell 2000 was manufactured. FIG. 31 is a schematic cross-sectional view of the test cell 2000.

Figure 32:
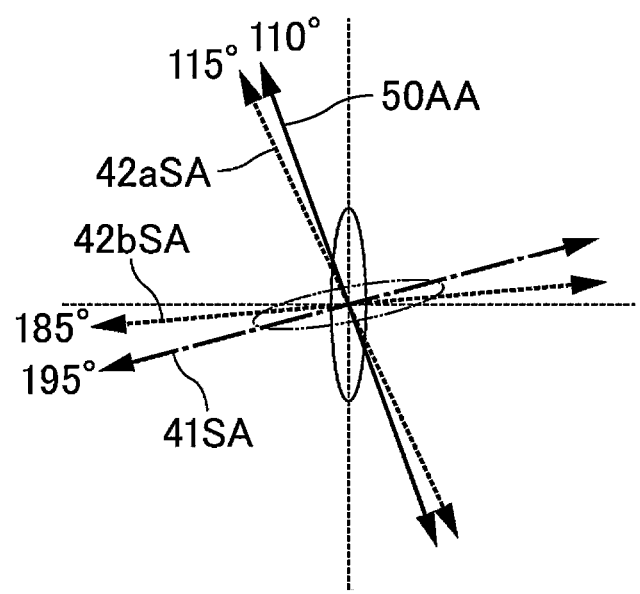
FIG. 32 is a diagram schematically showing settings of an optical axis according to Comparative Example 1.

In Comparative Example 1, the following examinations (a) to (d) were performed using the test cell 2000. In Comparative Example 1, a liquid crystal material was a negative type with negative dielectric anisotropy, and a display mode was a VA mode. Optical axis settings (initial settings) and specifications of Comparative Example 1 are shown in Table 4 and FIG. 32.

TABLE 4

|  | Unit | Comparative Example 1 |
|---|---|---|
| Liquid crystal material | — | Negative type |
| Birefringence index (589 nm) of liquid crystal material | — | 0.093839 |
| Δε of liquid crystal material | — | −4.2 |
| Display mode | — | VA |
| Alignment orientation by first vertical alignment film | Degree | 0 |
| Alignment orientation by second vertical alignment film | Degree | 90 |
| Polarization axis angle of polarizer | Degree | 110 |
| Slow axis angle of λ/2 plate 42b | Degree | 185 |
| Slow axis angle of λ/2 plate 42a | Degree | 115 |
| Slow axis angle of λ/4 plate | Degree | 195 |

(a) Relationship Between Twist Angle and VR Curve

Figure 33:
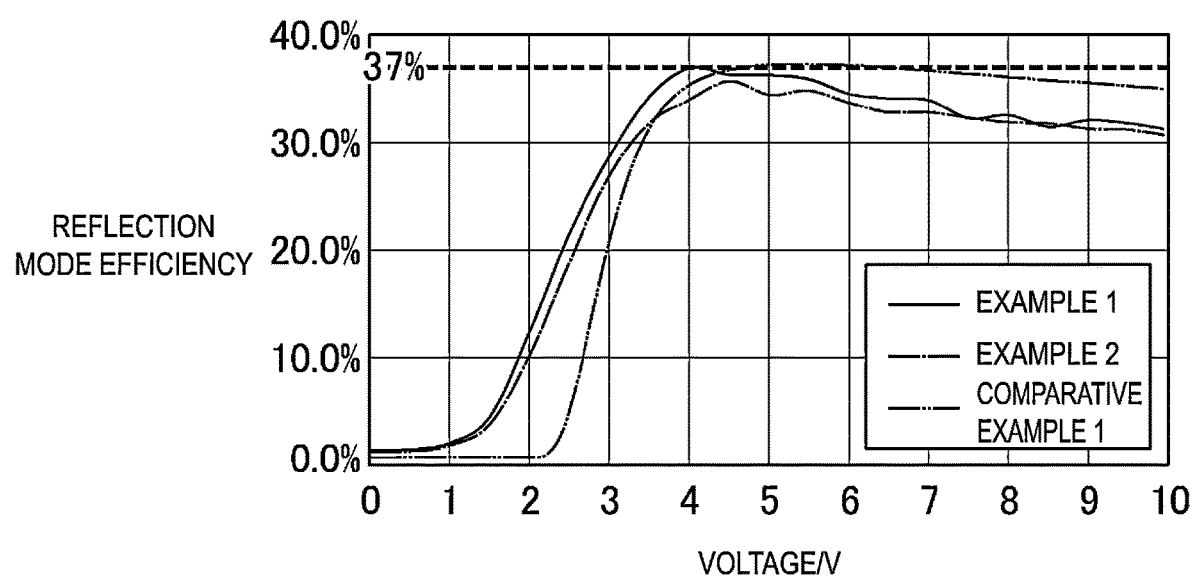
FIG. 33 is a graph showing results of Examples 1 and 2 and Comparative Example 1.

A relationship between a twist angle and a VR curve was examined. The results are shown in FIG. 33. FIG. 33 is a graph showing the results of Examples 1 and 2 and Comparative Example 1. In FIG. 33, the horizontal axis represents a voltage (V) applied to the liquid crystal layer 20, and the vertical axis represents a reflection mode efficiency (%). A resulting curve is referred to as a VR curve.

From FIG. 33, it was found that a maximum reflectance was higher in Example 1 (twist angle: 83°) than in Example 2 (twist angle: 74°). The maximum reflectance in Example 1 was substantially the same as that in Comparative Example 1 (VA mode).

Figure 34:
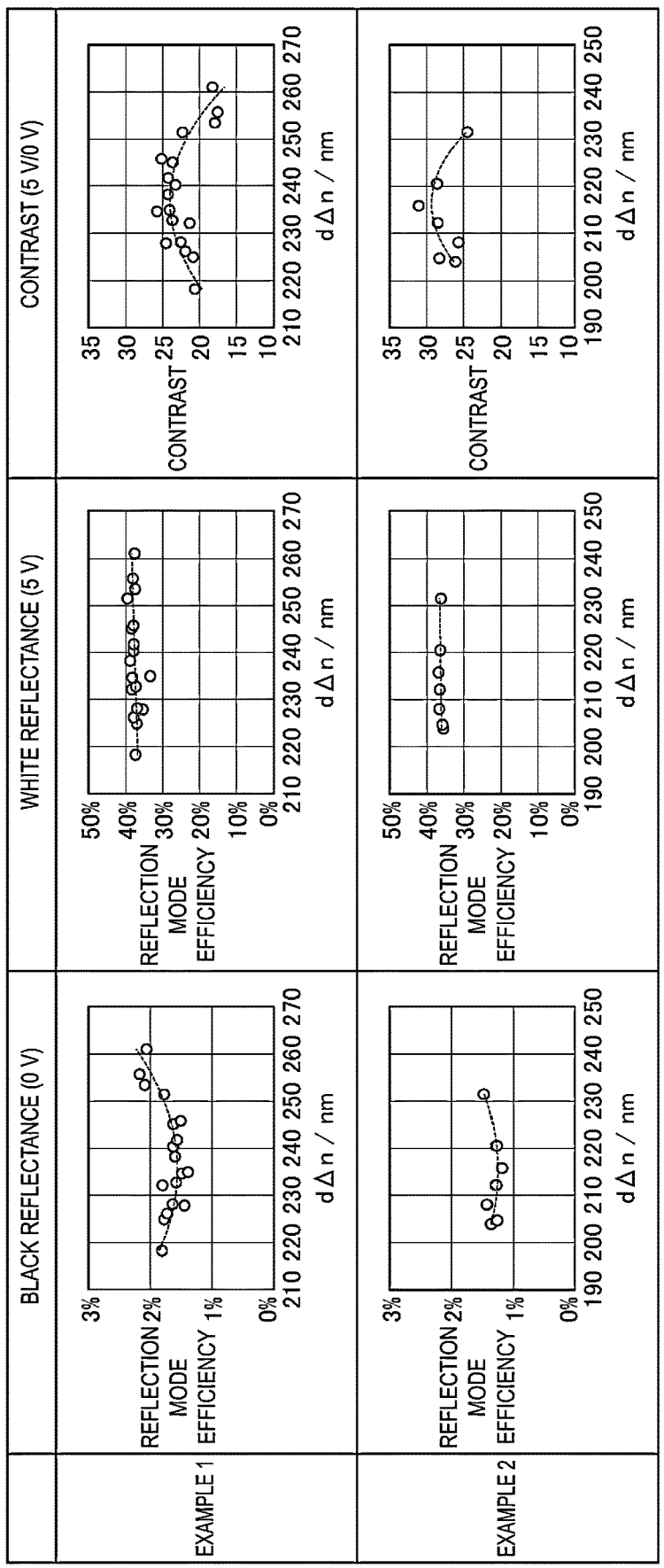
FIG. 34 is a graph showing results of Examples 1 and 2.

(b) Relationship Between Retardation and Reflection Mode Efficiency and Contrast A relationship between a retardation (that is, dΔn) and each of a reflection mode efficiency and a contrast ratio was investigated. The results are shown in FIG. 34. FIG. 34 is a graph showing the results of Examples 1 and 2.

In FIG. 34, a black reflectance column shows a graph obtained by measuring a reflection mode efficiency in black display (applied voltage: 0 V) while changing a retardation. The horizontal axis represents a retardation (nm), and the vertical axis represents a reflection mode efficiency in black display. In a white reflectance column, a graph obtained by measuring a reflection mode efficiency in white display (applied voltage: 5 V) while changing a retardation is shown. The horizontal axis represents a retardation (nm), and the vertical axis represents a reflection mode efficiency in white display. In a contrast ratio column, a graph obtained by measuring a contrast ratio while changing a retardation is shown. The contrast ratio is a ratio of a contrast at 5 V to a contrast at 0 V (5 V/0 V) (the same applies hereinafter). The horizontal axis represents a retardation (nm), and the vertical axis represents a contrast ratio. An approximate curve is also shown in each of the graphs.

From FIG. 34, it was found that a reflectance of black display was higher in Example 1 (twist angle: 83°) than in Example 2 (twist angle: 74°). In addition, when a twist angle was 83° (Example 1), a contrast ratio was 20 or more when a retardation dΔn was 218 nm or more and 255 nm or less, and a contrast ratio was a maximum value (approximately 24) when a retardation dΔn was 238 nm (that is, a cell thickness d: 3.41 μm). A reflection mode efficiency of white display was substantially constant.

(c) Relationship Between Axis Setting of Optical Film and Contrast Ratio

Figure 35:
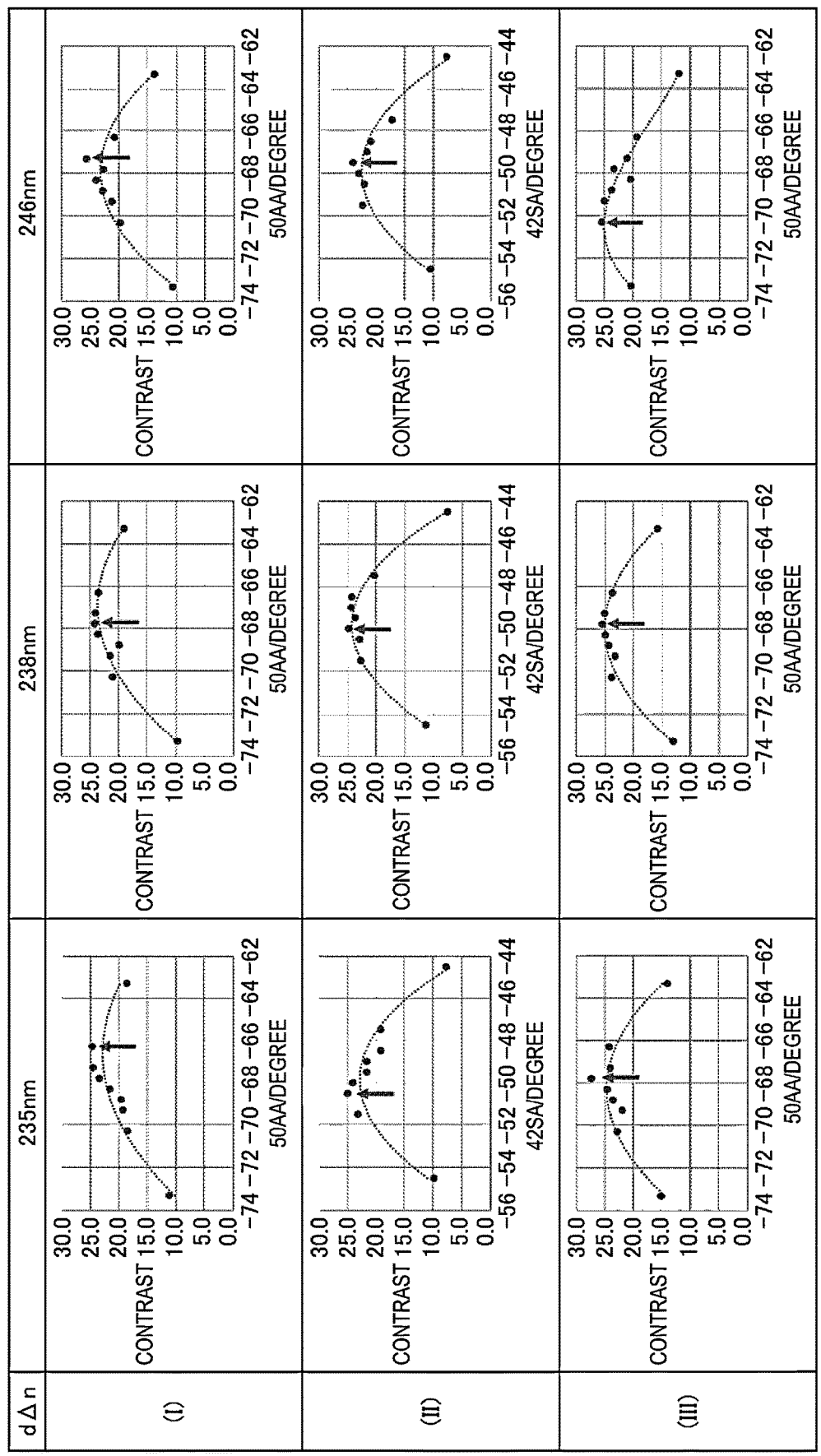
FIG. 35 is a graph showing results of Example 1.

For the test cell 1000 in Example 1, a relationship between an axis setting of an optical film (that is, a polarizer and a retardation plate) and a contrast ratio was examined. Cases where a retardation (dΔn) was 235 nm, 238 nm, and 246 nm were examined. The results are shown in FIG. 35. FIG. 35 is a graph showing the results of Example 1.

In FIG. 35, each graph in a column (I) is a graph obtained by measuring a contrast ratio while rotating only the polarizer 50 (the retardation plate is fixed to the initial setting). The horizontal axis represents an angle of the polarizer 50 in the direction of the polarization axis 50AA, and the vertical axis represents a contrast ratio. Each graph in a column (II) is a graph obtained by measuring a contrast ratio while rotating only the retardation plate (that is, the λ/2 plate 42 and the λ/4 plate 41) (the polarizer is fixed to the initial setting). An angle formed by a slow axis 42SA of the λ/2 plate 42 and a slow axis 41SA of the λ/4 plate 41 was fixed. The horizontal axis represents an angle of the λ/2 plate 42 in the direction of the slow axis 42SA, and the vertical axis represents a contrast ratio. Each graph in a column (III) is a graph obtained by measuring a contrast ratio while rotating the polarizer 50, the λ/2 plate 42, and the λ/4 plate 41 at the same angle. That is, an angle formed by the polarizer 50 and the λ/2 plate 42, an angle formed by the polarizer 50 and the λ/4 plate 41, and an angle formed by the λ/2 plate 42 and the λ/4 plate 41 were all fixed, and the polarizer 50, the λ/2 plate 42, and the λ/4 plate 41 were rotated as a set. The horizontal axis represents an angle of the polarizer 50 in the direction of the polarization axis 50AA, and the vertical axis represents a contrast ratio.

An approximate curve is also shown in each of the graphs.

From FIG. 35, when a retardation dΔn was 238 nm, a contrast ratio was a maximum value (approximately 25) around the initial setting (see FIG. 6). In this case, a margin for an axial misalignment was maximized. That is, a variation in contrast was minimized for a misalignment of the film axes of the three optical films (that is, the polarizer and the retardation plate). Further, it was also found that the contrast ratio was approximately 10% lower than the maximum value when the angle of the polarizer 50 in the direction of the polarization axis 50AA was within ±2° around the angle at which the contrast ratio was the maximum value. Further, it was also found that the contrast ratio was 20 or more when the angle of the polarizer 50 in the direction of the polarization axis 50AA was −71.5° or more and −63.5° or less (see the column (I)), when the slow axis 42SA of the λ/2 plate 42 was −52.5° or more and −47.5° or less (see the column (II)), and when the angle of the polarizer 50 in the direction of the polarization axis 50AA was −71.5° or more and −64.5° or less (see the column (III)).

(d) Relationship Between Axis Setting of Optical Film and Chromaticity

Figure 36:
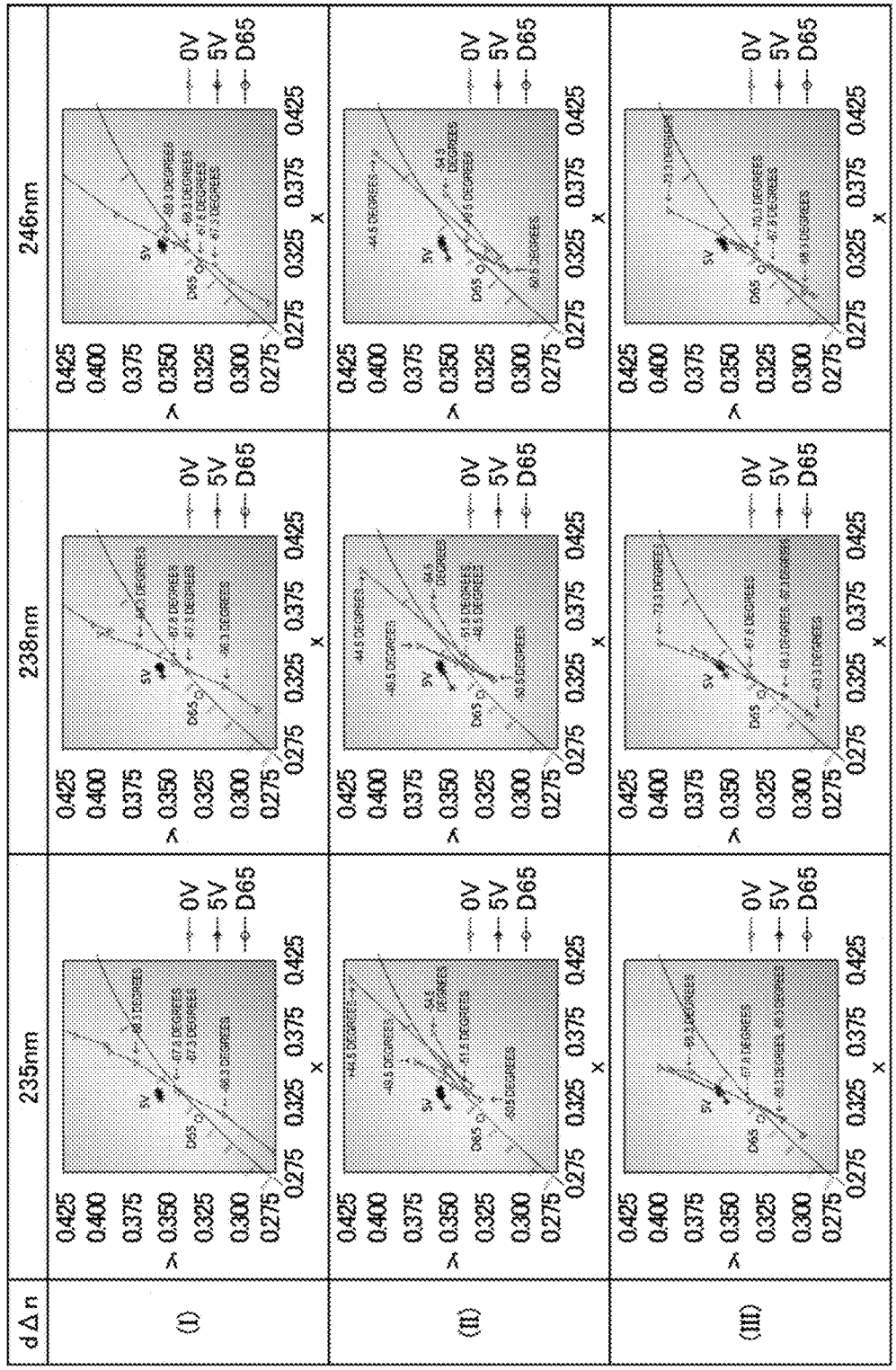
FIG. 36 is a graph showing results of Example 1.

For the test cell 1000 in Example 1, a relationship between an axial setting of an optical film (that is, a polarizer and a retardation plate) and chromaticity in each of white display (applied voltage: 5 V) and black display (applied voltage: 0 V) was examined. Cases where a retardation (dΔn) was 235 nm, 238 nm, and 246 nm were examined. The results are shown in FIG. 36. The chromaticity was evaluated by an xy chromaticity diagram. For reference, the chromaticity of a D65 light source is plotted in each drawing. FIG. 36 is a graph showing the results of Example 1.

In FIG. 36, each graph in a column (I) is a graph obtained by analyzing the chromaticity of white display while rotating only the polarizer 50 (the retardation plate is fixed to the initial setting). Each graph in a column (II) is a graph in which only the retardation plate (that is, the λ/2 plate 42 and the λ/4 plate 41) is rotated and the chromaticity of white display is analyzed (the polarizer is fixed to the initial setting). An angle formed by the slow axis 42SA of the λ/2 plate 42 and the slow axis 41SA of the λ/4 plate 41 was fixed. Each graph in a column (III) is a graph obtained by analyzing the chromaticity of white display while rotating the polarizer 50, the λ/2 plate 42, and the λ/4 plate 41 at the same angle. That is, an angle formed by the polarizer 50 and the λ/2 plate 42, an angle formed by the polarizer 50 and the λ/4 plate 41, and an angle formed by the λ/2 plate 42 and the λ/4 plate 41 were all fixed, and the polarizer 50, the λ/2 plate 42, and the λ/4 plate 41 were rotated as a set.

From FIG. 36, it was found that the chromaticity of white display (0 V) was less affected by a cell thickness and an axis setting. In addition, the chromaticity of black display (5 V) can be adjusted by either the rotation of only the polarizer 50 (see the column (I)) or the rotation of a set of optical films (polarizer and retardation plate) (see the column (III)). When the chromaticity of black display is adjusted to the vicinity of the chromaticity of the D65 light source, it is suitable that only the polarizer 50 is rotated and the angle of the polarizer 50 in the direction of the polarization axis 50AA is set to −67.3° or more and −66.3° or less. In this range, a contrast ratio is not reduced.

Examples 3 and 4

In Examples 3 and 4, the following examinations (a) to (d) were performed using the test cell 1000. In Examples 3 and 4, a liquid crystal material was a negative type, and a display mode was a TW-FFS mode. Optical axis settings (initial settings) and specifications of Example 3 are shown in Table 5 and FIG. 11, and optical axis settings (initial settings) and specifications of Example 4 are shown in Table 5. FIG. 11 is also a diagram conceptually showing optical axis settings of Example 3.

TABLE 5

|  | Unit | Example 3 | Example 4 |
| --- | --- | --- | --- |
| Liquid crystal material | — | Negative type | Negative type |
| Birefringence index (550 nm) of liquid crystal material | — | 0.079224 | 0.079224 |
| Display mode | — | TW-FFS | TW-FFS |
| Alignment orientation by first horizontal alignment film | Degree | 90 | 90 |
| Alignment orientation by second horizontal alignment film | Degree | 173 | 164 |
| Twist angle | Degree | 83 | 74 |
| Polarization axis angle of polarizer | Degree | 21.7 | 32.5 |
| Slow axis angle of λ/2 plate | Degree | 40.5 | 47 |
| Slow axis angle of λ/4 plate | Degree | 65.1 | 63.5 |
| Width of strip portion of pixel electrode | μm | 3 | 3 |
| Width of slit of pixel electrode | μm | 5 | 5 |
| Bending angle of strip portion | Degree | 7 | 7 |

(a) Relationship Between Twist Angle and VR Curve

Figure 37:
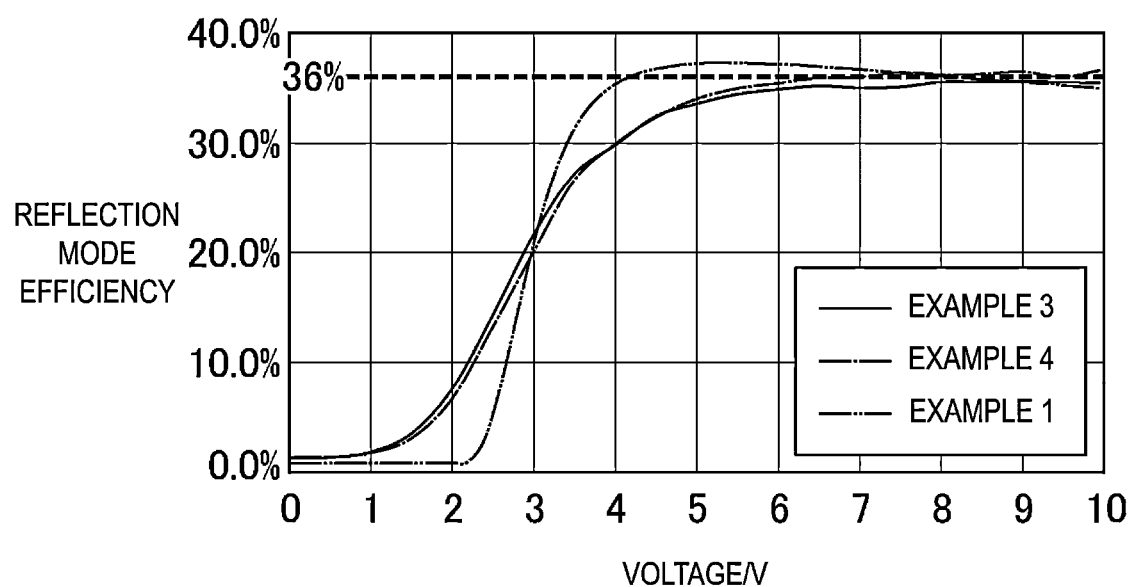
FIG. 37 is a graph showing results of Examples 3 and 4 and Comparative Example 1.

A relationship between a twist angle and a VR curve was examined. The results are shown in FIG. 37. In FIG. 37, the horizontal axis represents a voltage (V) applied to the liquid crystal layer 20, and the vertical axis represents a reflection mode efficiency (%). A resulting curve is referred to as a VR curve. FIG. 37 is a graph showing the results of Examples 3 and 4 and Comparative Example 1.

From FIG. 37, it was found that the VR curves in Example 3 (twist angle: 83°) and Example 4 (twist angle: 74°) were substantially the same, unlike the tendency in the positive type (Examples 1 and 2).

Figure 38:
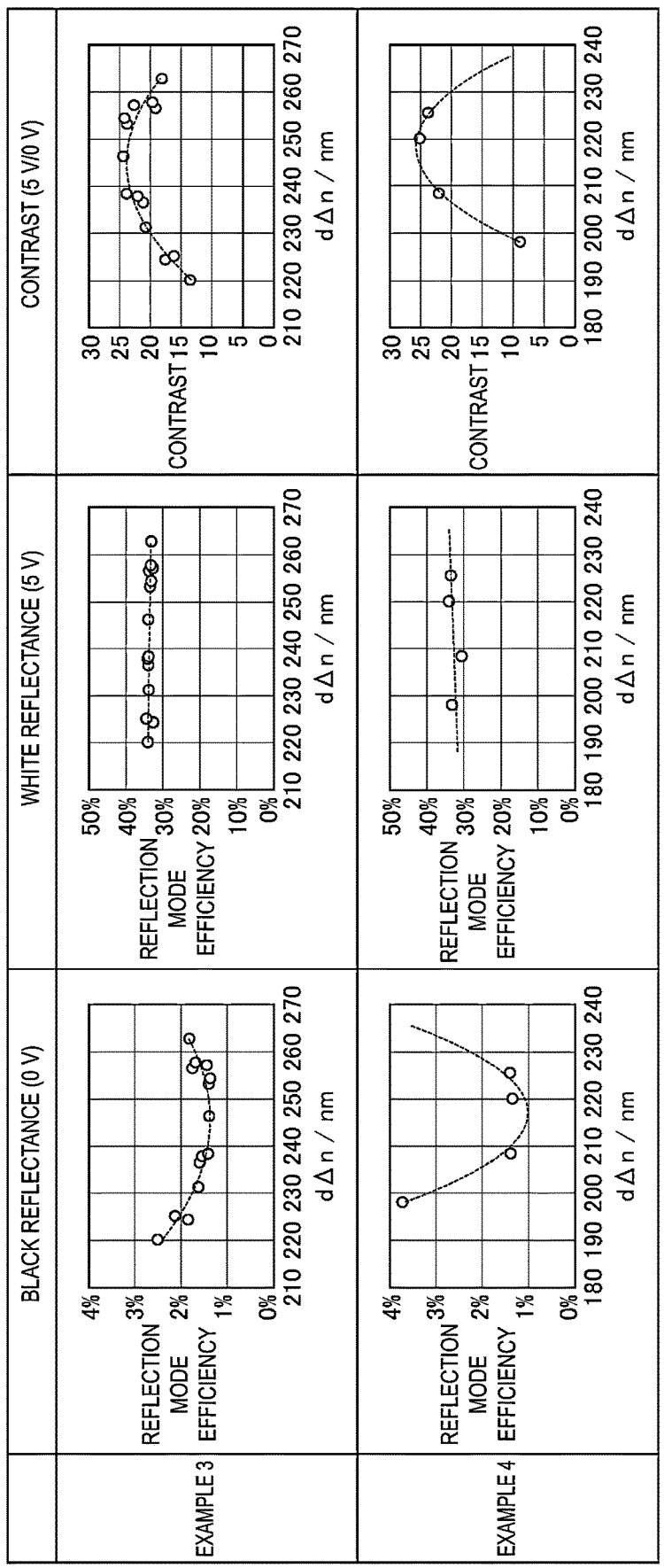
FIG. 38 is a graph showing results of Examples 3 and 4.

(b) Relationship Between Retardation and Reflection Mode Efficiency and Contrast A relationship between a retardation (that is, dΔn) and a reflection mode efficiency and a relationship between a retardation and a contrast ratio were examined. The results are shown in FIG. 38. FIG. 38 is a graph showing the results of Examples 3 and 4.

In FIG. 38, a black reflectance column shows a graph obtained by measuring a reflection mode efficiency in black display (applied voltage: 0 V) while changing a retardation. The horizontal axis represents a retardation (nm), and the vertical axis represents a reflection mode efficiency in black display. In a white reflectance column, a graph obtained by measuring a reflection mode efficiency in white display (applied voltage: 5 V) while changing a retardation is shown. The horizontal axis represents a retardation (nm), and the vertical axis represents a reflection mode efficiency in white display. In a contrast ratio column, a graph obtained by measuring a contrast ratio while changing a retardation is shown. The contrast ratio is a ratio of a contrast at 5 V to a contrast at 0 V (5 V/0 V) (the same applies hereinafter). The horizontal axis represents a retardation (nm), and the vertical axis represents a contrast ratio. An approximate curve is also shown in each of the graphs.

From FIG. 38, it was found that a reflectance of black display was higher in Example 4 (twist angle: 83°) than in Example 3 (twist angle: 74°). In addition, when a twist angle was 83° (Example 3), a contrast ratio was 20 or more when a retardation dΔn was 230 nm or more and 260 nm or less, and a contrast ratio was a maximum value (approximately 24) when a cell thickness d was 3.1 μm (that is, a retardation dΔn was approximately 245 nm). The cell thickness d at which the contrast ratio became the maximum value matched an optical simulation result. A reflection mode efficiency of white display was substantially constant. On the other hand, it was found that the contrast ratio was 20 or more when the twist angle was 74° (Example 4) and the retardation dΔn was 207 nm or more and 230 nm or less.

(c) Relationship Between Axis Setting of Optical Film and Contrast Ratio

Figure 39:
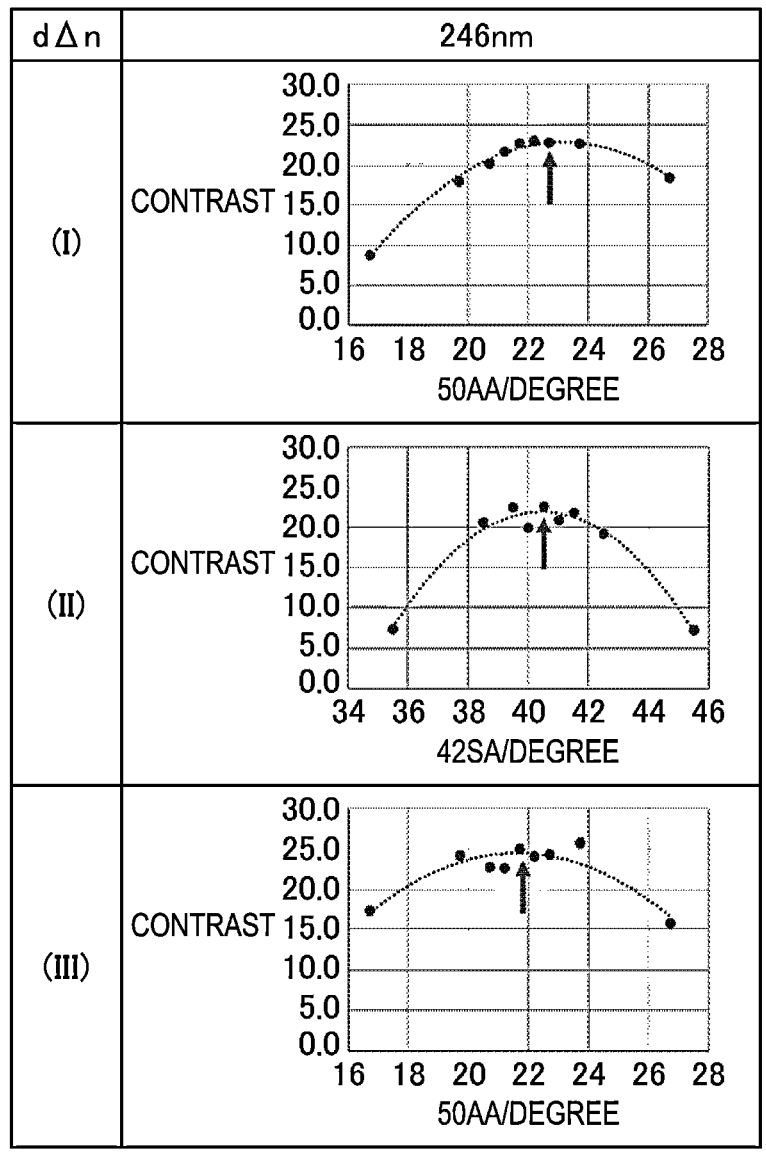
FIG. 39 is a graph showing results of Example 3.

For the test cell 1000 in Example 3, a relationship between an axis setting of an optical film (that is, a polarizer and a retardation plate) and a contrast ratio was examined. The retardation was 246 nm. The results are shown in FIG. 39. FIG. 39 is a graph showing the results of Example 3.

In FIG. 39, each graph in a column (I) is a graph obtained by measuring a contrast ratio while rotating only the polarizer 50 (the retardation plate is fixed to the initial setting). The horizontal axis represents an angle of the polarizer 50 in the direction of the polarization axis 50AA, and the vertical axis represents a contrast ratio. Each graph in a column (II) is a graph obtained by measuring a contrast ratio while rotating only the retardation plate (that is, the λ/2 plate 42 and the λ/4 plate 41) (the polarizer is fixed to the initial setting). An angle formed by a slow axis 42SA of the λ/2 plate 42 and a slow axis 41SA of the λ/4 plate 41 was fixed. The horizontal axis represents an angle of the λ/2 plate 42 in the direction of the slow axis 42SA, and the vertical axis represents a contrast ratio. Each graph in a column (III) is a graph obtained by measuring a contrast ratio while rotating the polarizer 50, the λ/2 plate 42, and the λ/4 plate 41 at the same angle. That is, an angle formed by the polarizer 50 and the λ/2 plate 42, an angle formed by the polarizer 50 and the λ/4 plate 41, and an angle formed by the λ/2 plate 42 and the λ/4 plate 41 were all fixed, and the polarizer 50, the λ/2 plate 42, and the λ/4 plate 41 were rotated as a set. The horizontal axis represents an angle of the polarizer 50 in the direction of the polarization axis 50AA, and the vertical axis represents a contrast ratio. An approximate curve is also shown in each of the graphs.

From FIG. 39, when a retardation dΔn was 246 nm, a contrast ratio was a maximum value (approximately 23) around the initial setting (see FIG. 11). In this case, a margin for an axial misalignment was maximized. That is, there was little variation in the angle (x-axis direction) of an arrow position of a maximum value. Further, it was also found that the contrast ratio was approximately 10% lower than the maximum value when the angle of the polarizer 50 in the direction of the polarization axis 50AA was within ±2° around the angle at which the contrast ratio was the maximum value. Further, it was also found that the contrast ratio was 20 or more when the angle of the polarizer 50 in the direction of the polarization axis 50AA was 20.5° or more and 26.0° or less (see the column (I)), when the slow axis 42SA of the λ/2 plate 42 was 38.5° or more and 42.5° or less (see the column (II)), and when the angle of the polarizer 50 in the direction of the polarization axis 50AA was 18.0° or more and 25.5° or less (see the column (III)).

(d) Relationship Between Axis Setting of Optical Film and Chromaticity

Figure 40:
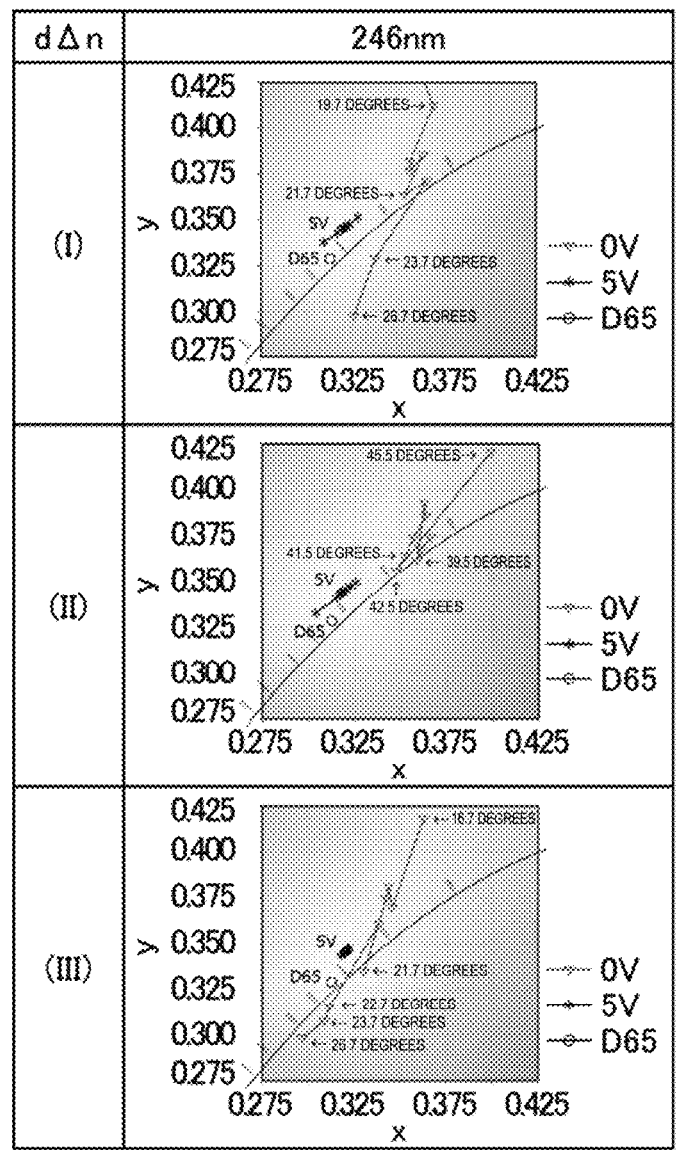
FIG. 40 is a graph showing results of Example 3.

For the test cell 1000 in Example 3, a relationship between an axial setting of an optical film (that is, a polarizer and a retardation plate) and chromaticity in each of white display (applied voltage: 5 V) and black display (applied voltage: 0 V) was examined. The results are shown in FIG. 40. The chromaticity was evaluated by an xy chromaticity diagram. For reference, the chromaticity of a D65 light source is plotted in each drawing. FIG. 40 is a graph showing the results of Example 3.

In FIG. 40, each graph in a column (I) is a graph obtained by analyzing the chromaticity of white display while rotating only the polarizer 50 (the retardation plate is fixed to the initial setting). Each graph in a middle part of a column (II) is a graph in which only the retardation plate (that is, the λ/2 plate 42 and the λ/4 plate 41) is rotated and the chromaticity of white display is analyzed (the polarizer is fixed to the initial setting). An angle formed by the slow axis 42SA of the λ/2 plate 42 and the slow axis 41SA of the λ/4 plate 41 was fixed. Each graph in a lower part of a column (III) is a graph obtained by analyzing the chromaticity of white display while rotating the polarizer 50, the λ/2 plate 42, and the λ/4 plate 41 at the same angle. That is, an angle formed by the polarizer 50 and the λ/2 plate 42, an angle formed by the polarizer 50 and the λ/4 plate 41, and an angle formed by the λ/2 plate 42 and the λ/4 plate 41 were all fixed, and the polarizer 50, the λ/2 plate 42, and the λ/4 plate 41 were rotated as a set.

From FIG. 40, it was found that the chromaticity of white display (5 V) was less affected by a cell thickness and an axis setting. In addition, the chromaticity of black display (0 V) can be adjusted by either the rotation of only the polarizer 50 (see the column (I)) or the rotation of a set of optical films (see the column (III)). When the chromaticity of black display is adjusted to the vicinity of the chromaticity of the D65 light source, it is suitable that only the polarizer 50 is rotated and the angle of the polarizer 50 in the direction of the polarization axis 50AA is set to 21.7° or more and 22.7° or less.

For reference, the measurement results of the reflectance mode efficiency in Comparative Example 1 (negative-type liquid crystal material, VA mode) are shown in Table 7 (see also FIG. 37). As can be seen from this table, a sufficiently high contrast ratio was obtained in Comparative Example 1. However, as described above, since a vertical electrical field mode is used as the VA mode, it is difficult to adopt it for an in-cell type touch panel.

TABLE 6

|  |  | Comparative Example 1 |
| --- | --- | --- |
| Reflection mode efficiency | 0 V | 0.8% |
|  | 5 V | 37.2% |
| Contrast ratio (5 V/0 V) |  | 48 |

Example 5

Figure 41A:
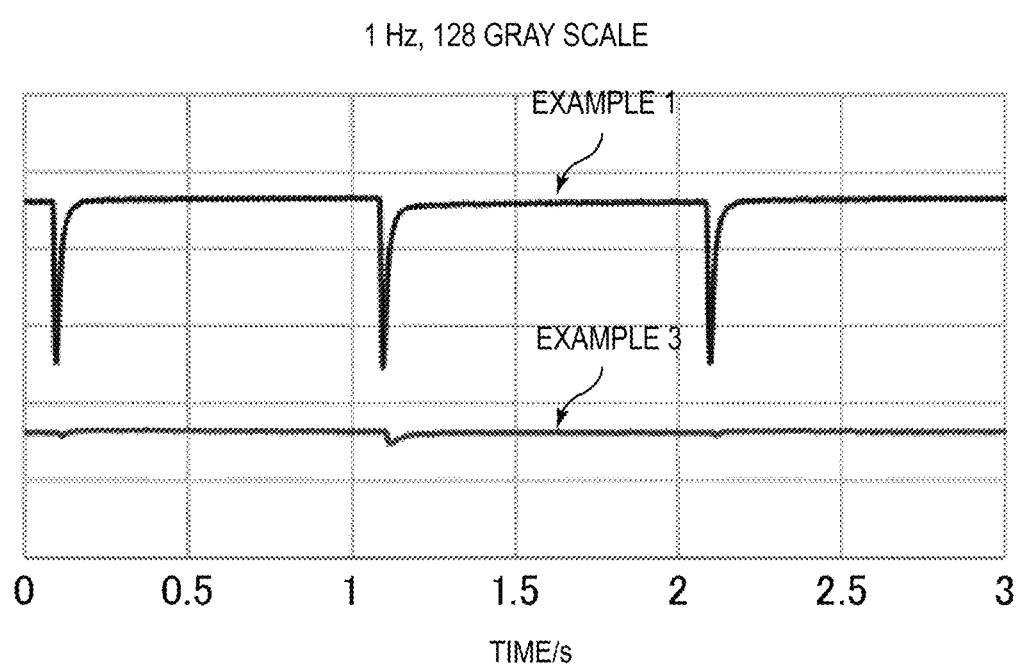
FIG. 41A is a graph showing waveforms in Examples 1 and 3.
Figure 41B:
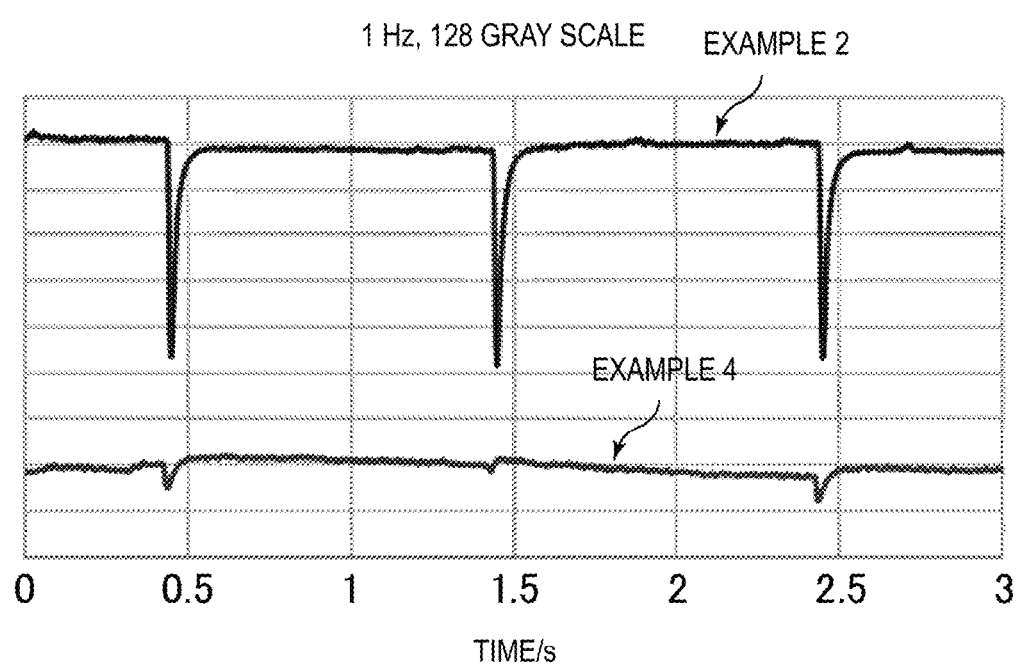
FIG. 41B is a graph showing waveforms in Examples 2 and 4.

For the test cells used in Example 1 (twist angle is 83° and liquid crystal material was a positive type), Example 2 (twist angle is 74° and liquid crystal material is a positive type), Example 3 (twist angle is 83° and liquid crystal material is a negative type), and Example 4 (twist angle is 74° and liquid crystal material was a negative type), the visibility of flicker in front view was evaluated. The results are shown in FIG. 41A, FIG. 41B, and Tables 7 to 10. In Tables 7 to 10, ○ means that flicker was visually recognized, and X means that flicker was not visually recognized. FIG. 41A is a graph showing waveforms in Examples 1 and 3, and FIG. 41B is a graph showing waveforms in Examples 2 and 4.

TABLE 7

|  |  | Gray scale | | | | | | | |
| --- | --- | --- | --- | --- | --- | --- | --- | --- | --- |
| Example 1 |  | 32 | 64 | 96 | 128 | 160 | 192 | 224 | 255 |
| Drive frequency | 1 | ○ | X | X | X | X | X | ○ | ○ |
|  | 10 | X | X | X | X | X | X | X | X |
|  | 30 | ○ | ○ | ○ | ○ | ○ | ○ | ○ | X |
|  | 60 | ○ | ○ | ○ | ○ | ○ | ○ | ○ | ○ |

TABLE 8

|  |  | Gray scale | | | | | | | |
| --- | --- | --- | --- | --- | --- | --- | --- | --- | --- |
| Example 2 |  | 32 | 64 | 96 | 128 | 160 | 192 | 224 | 255 |
| Drive frequency | 1 | ○ | ○ | X | X | X | X | X | X |
|  | 10 | ○ | X | X | X | X | X | X | X |
|  | 30 | ○ | ○ | ○ | ○ | ○ | ○ | ○ | ○ |
|  | 60 | ○ | ○ | ○ | ○ | ○ | ○ | ○ | ○ |

TABLE 9

|  |  | Gray scale | | | | | | | |
| --- | --- | --- | --- | --- | --- | --- | --- | --- | --- |
| Example 3 |  | 32 | 64 | 96 | 128 | 160 | 192 | 224 | 255 |
| Drive frequency | 1 | ○ | ○ | ○ | ○ | ○ | ○ | ○ | ○ |
|  | 10 | ○ | ○ | ○ | ○ | ○ | ○ | ○ | ○ |
|  | 30 | ○ | ○ | ○ | ○ | ○ | ○ | ○ | ○ |
|  | 60 | ○ | ○ | ○ | ○ | ○ | ○ | ○ | ○ |

TABLE 10

|  |  | Gray scale | | | | | | | |
| --- | --- | --- | --- | --- | --- | --- | --- | --- | --- |
| Example 4 |  | 32 | 64 | 96 | 128 | 160 | 192 | 224 | 255 |
| Drive frequency | 1 | ○ | ○ | ○ | ○ | ○ | ○ | ○ | ○ |
|  | 10 | ○ | ○ | ○ | ○ | ○ | ○ | ○ | ○ |
|  | 30 | ○ | ○ | ○ | ○ | ○ | ○ | ○ | ○ |
|  | 60 | ○ | ○ | ○ | ○ | ○ | ○ | ○ | ○ |

From FIG. 41A, FIG. 41B, Table 7, and Table 8, when the liquid crystal material was a positive type (Examples 1 and 2), flicker was visually recognized at 10 Hz or less in front view. The range of visual recognition was the same at the twist angles of 83° and 74°. In addition, from FIG. 41A, FIG. 41B, Table 10, and Table 11, when the liquid crystal material was a negative type (Examples 3 and 4), flicker was not visually recognized in all gray scales in front view. That is, flicker-free was realized.

Examples 6 to 9

In the test cell 1000 used in Examples 1 to 5, when the second substrate 30 was manufactured, a substrate obtained by coating the surface of a glass substrate with a high-resistance ITO was used as the glass substrate 300 (in order to improve a black reflectance). However, when a test cell 3000 was manufactured, a high resistance ITO was not coated. The test cell 3000 was manufactured in the same manner as in the manufacturing method of the test cell 1000 except for the above.

In addition, a test cell 4000 was manufactured in the same manner as in the manufacturing method of the test cell 3000 except that a step of bonding an optical film to a liquid crystal cell 3100 was changed to a step of bonding the λ/4 plate 41, the positive C plate 43, the λ/2 plate 42, and the polarizer 50 to the second substrate 30 side of the liquid crystal cell 3100 in the manufacturing step of the test cell 3000.

As the λ/4 plate 41, "NZF-UF01A" (retardation: 140 nm) manufactured by Nitto Denko Corporation was used in Examples 7 and 8, and "NZF-UF01A" (retardation: 110 nm) manufactured by Nitto Denko Corporation was used in Examples 6 and 9. As the λ/2 plate 42, "NZF-UF01A" (retardation: 270 nm) manufactured by Nitto Denko Corporation was used in Examples 7 and 8, and "mNZF-UF01A" (retardation: 260 nm) manufactured by Nitto Denko Corporation was used in Examples 6 and 9. As the positive C plate 43, one having Rth of 200 nm was used.

The following examinations (e) and (f) were performed using the test cell 3000 in Examples 6, 7, and 9 and using the test cell 4000 in Example 8. In Examples 6 to 8, a liquid crystal material was a positive type, and a display mode was a TW-FFS mode. In Example 9, a liquid crystal material was a negative type, and a display mode was a TW-FFS mode. Optical axis settings (initial settings) and specifications of Examples 6 to 9 are shown in Table 11.

TABLE 11

|  | Unit | Example 6 | Example 7 | Example 8 | Example 9 |
|---|---|---|---|---|---|
| Liquid crystal material | — | Positive type | Positive type | Positive type | Negative type |
| Birefringence index (550 nm) of liquid crystal material | — | 0.069928 | 0.069928 | 0.069928 | 0.079224 |
| Display mode | — | TW-FFS | TW-FFS | TW-FFS | TW-FFS |
| Alignment orientation by first horizontal alignment film | Degree | 0 | 0 | 0 | 90 |
| Alignment orientation by second horizontal alignment film | Degree | 74 | 83 | 83 | 164 |
| Twist angle | Degree | 74 | 83 | 83 | 74 |
| Polarization axis angle of polarizer | Degree | 122.5 | −68.3 | −68.3 | 32.5 |
| Slow axis angle of λ/2 plate | Degree | 137 | −49.5 | −49.5 | 47 |
| Slow axis angle of λ/4 plate | Degree | 153.5 | −24.9 | −24.9 | 63.5 |
| Width of strip portion of pixel electrode | μm | 3 | 3 | 3 | 3 |
| Width of slit of pixel electrode | μm | 5 | 5 | 5 | 5 |
| Bending angle of strip portion | Degree | 7 | 7 | 7 | 7 |

Comparative Example 2

In the test cell 2000 used in Comparative Example 1, when the second substrate 30 was manufactured, a substrate obtained by coating the surface of a glass substrate with a high-resistance ITO was used as the glass substrate 300. However, in a test cell 5000 used in this example, a high-resistance ITO was not coated. The test cell 5000 was manufactured in the same manner as in the manufacturing method of the test cell 2000 except for the above.

In Comparative Example 2, the following examinations (e) and (f) were performed using the test cell 5000. In Comparative Example 2, a liquid crystal material was a negative type, and a display mode was a VA mode. Optical axis settings (initial settings) and specifications of Comparative Example 2 are shown in Table 12.

TABLE 12

|  | Unit | Comparative Example 2 |
|---|---|---|
| Liquid crystal material | — | Negative type |
| Birefringence index (589 nm) of liquid crystal material | — | 0.093839 |
| Display mode | — | VA |
| Alignment orientation by first vertical alignment film | Degree | 0 |
| Alignment orientation by second vertical alignment film | Degree | 90 |
| Polarization axis angle of polarizer | Degree | 110 |
| Slow axis angle of λ/2 plate 42b | Degree | 185 |
| Slow axis angle of λ/2 plate 42a | Degree | 115 |
| Slow axis angle of λ/4 plate | Degree | 195 |

In the following examination, a normalized reflectance was obtained by the following equation.

$$\text{Normalized reflectance (\%)} = \frac{(n \text{ gray scale reflectance} - 0 \text{ gray scale reflectance})}{(255 \text{ gray scale reflectance} - 0 \text{ gray scale reflectance})} \times 100.$$

(e) Oblique γ Characteristics Evaluation

Figure 42A:
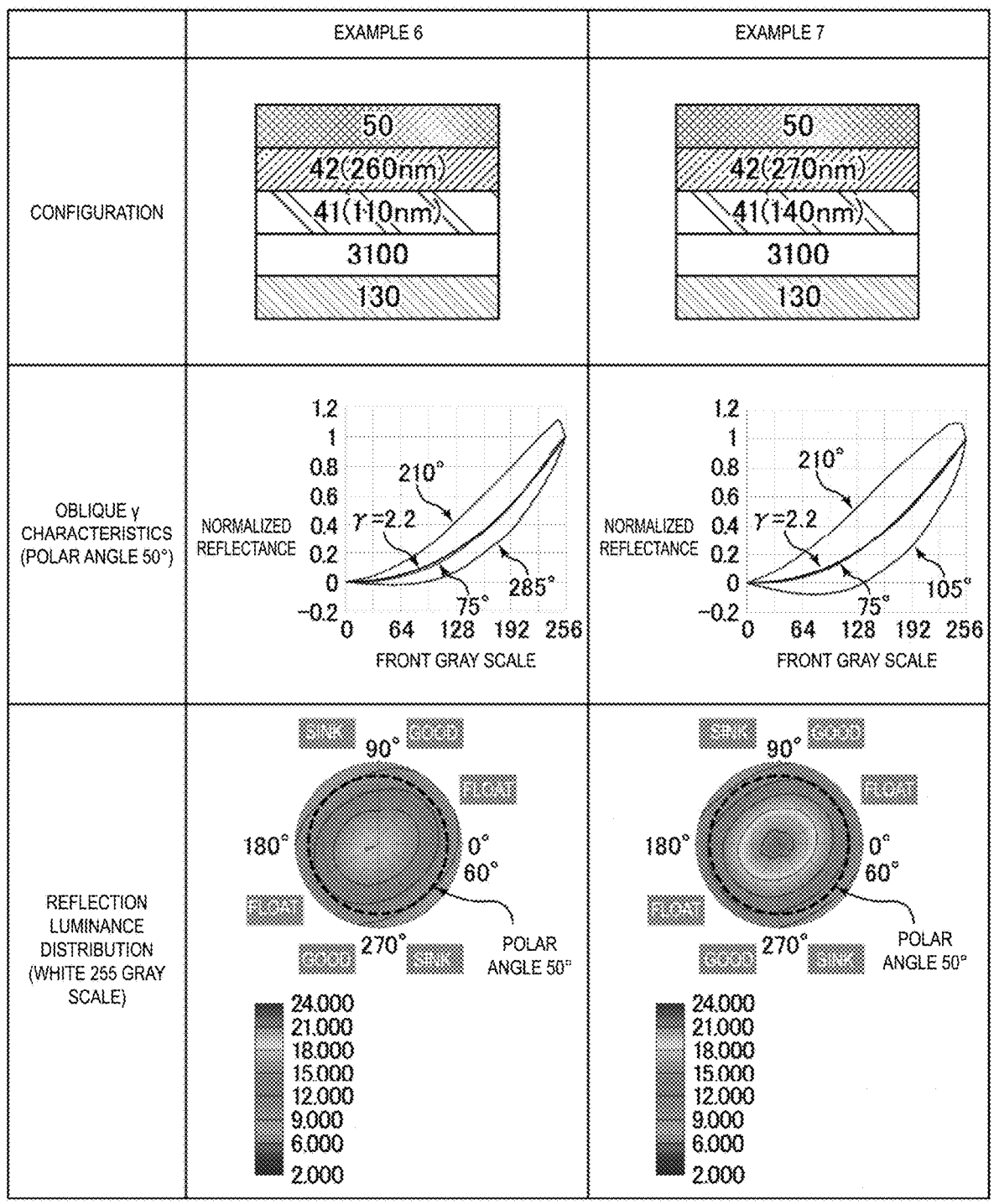
FIG. 42A is a diagram showing results in Examples 6 and 7.
Figure 42B:
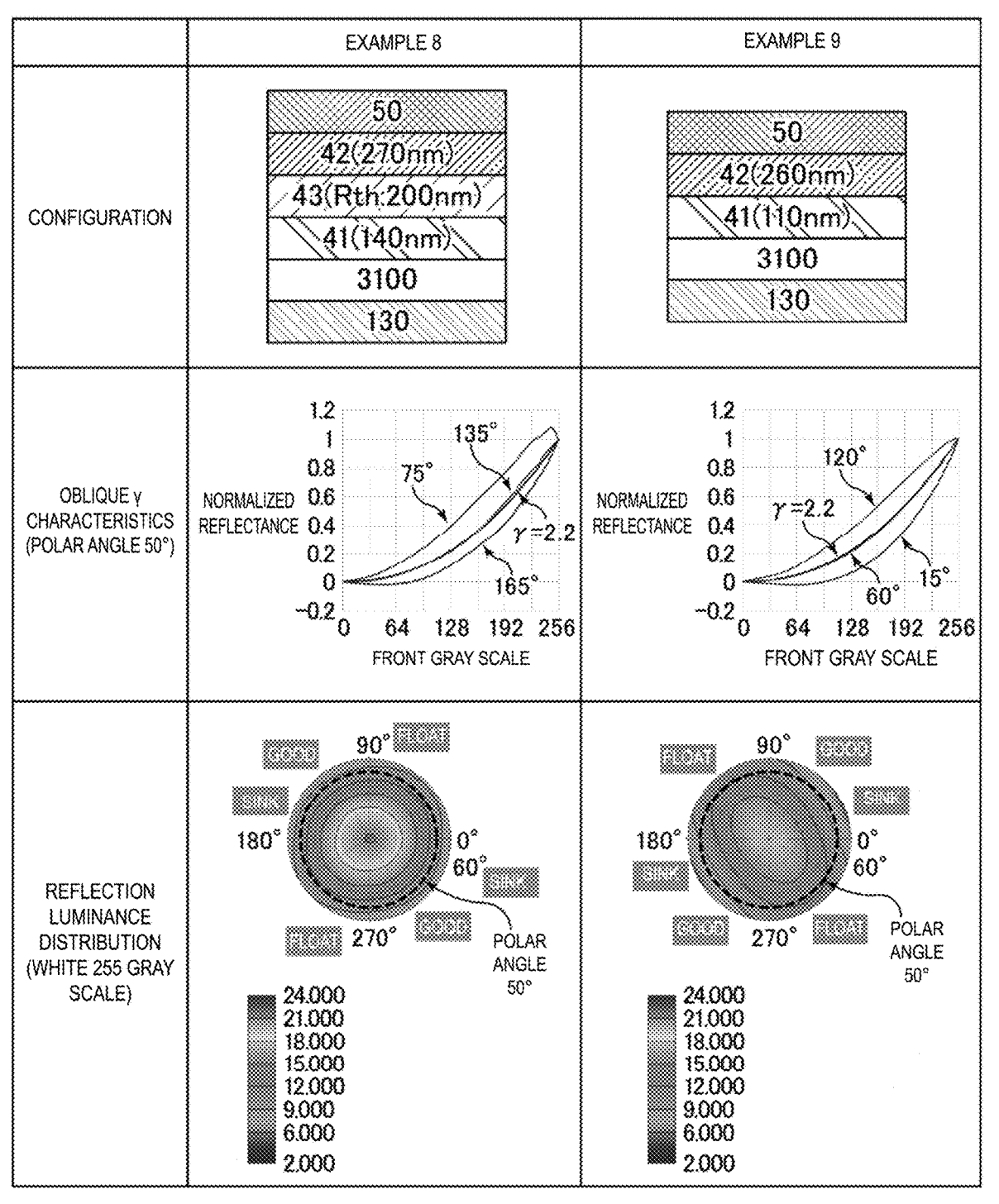
Figure 42C:
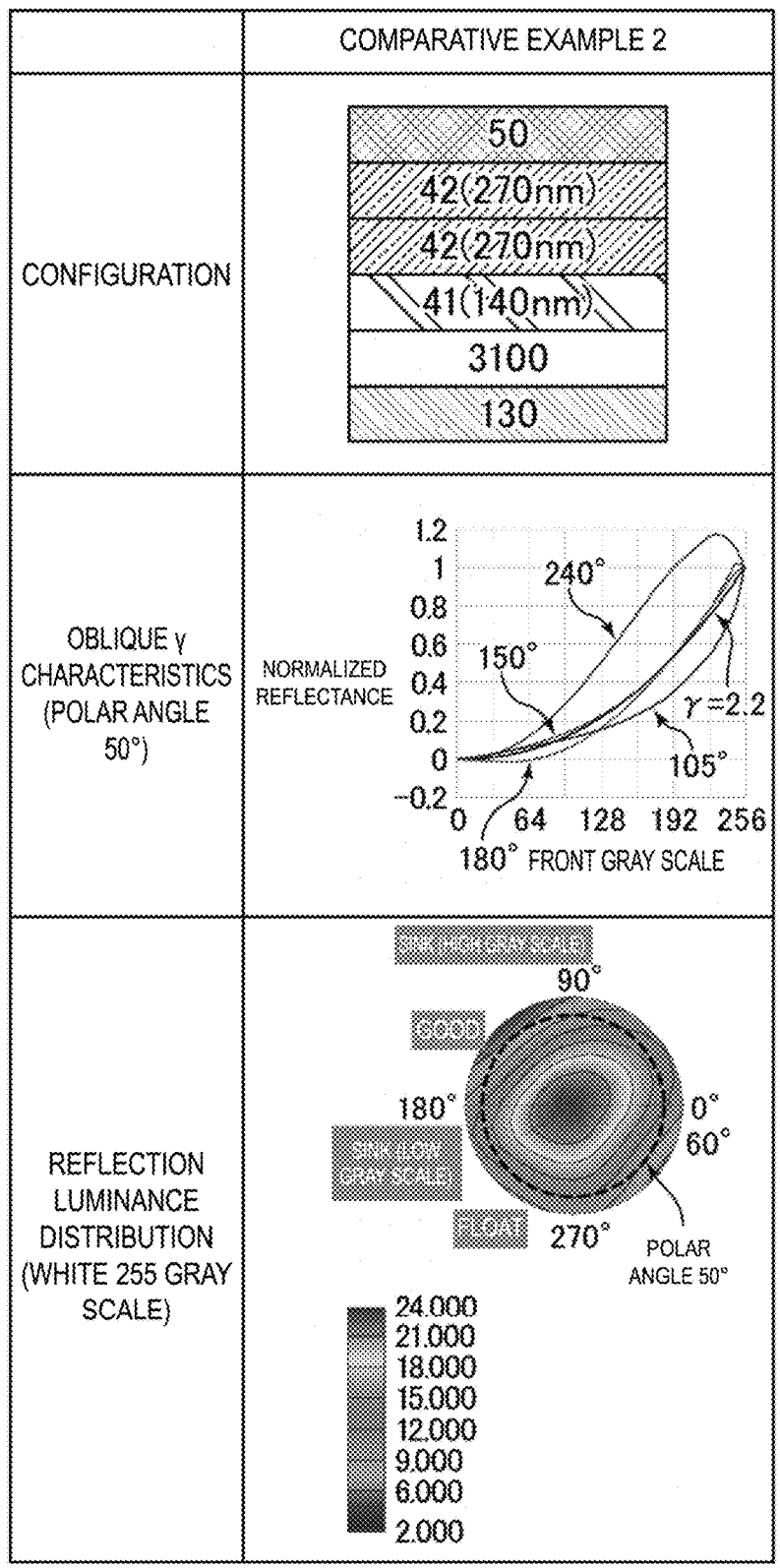
FIG. 42C is a diagram showing results in Comparative Example 2.

A γ curve was analyzed at a polar angle of 50°. The results are shown in FIGS. 42A to 42C. In each of these drawings, an upper part shows a schematic cross-sectional view of a test cell in each example, a middle part shows a graph of a γ curve, and a lower part shows a distribution diagram of a reflection luminance at a gray scale level of 255 of white display. In each of the middle graphs, the horizontal axis represents a gray scale (0 to 255 levels) in front view, and the vertical axis represents a normalized reflectance. The front was corrected to γ=2.2. In the graphs, an angle given to each γ curve (the azimuth is defined as 0° in a 3 o'clock direction, and the polar angle is defined as 0° in the normal direction of an observation surface of a panel) means an angle in the azimuth direction (here, the polar angle is 50°). For example, in Example 6, "75°" indicates a γ curve at an azimuth direction of 75° and a polar angle of 50°, "210°" indicates a γ curve at an azimuth direction of 210° and a polar angle of 50°, and "285°" indicates a γ curve at an azimuth direction of 285° and a polar angle of 50°. FIGS. 42A to 42C are diagrams showing the results in Examples 6 to 9 and Comparative Example 2.

Figure 43A:
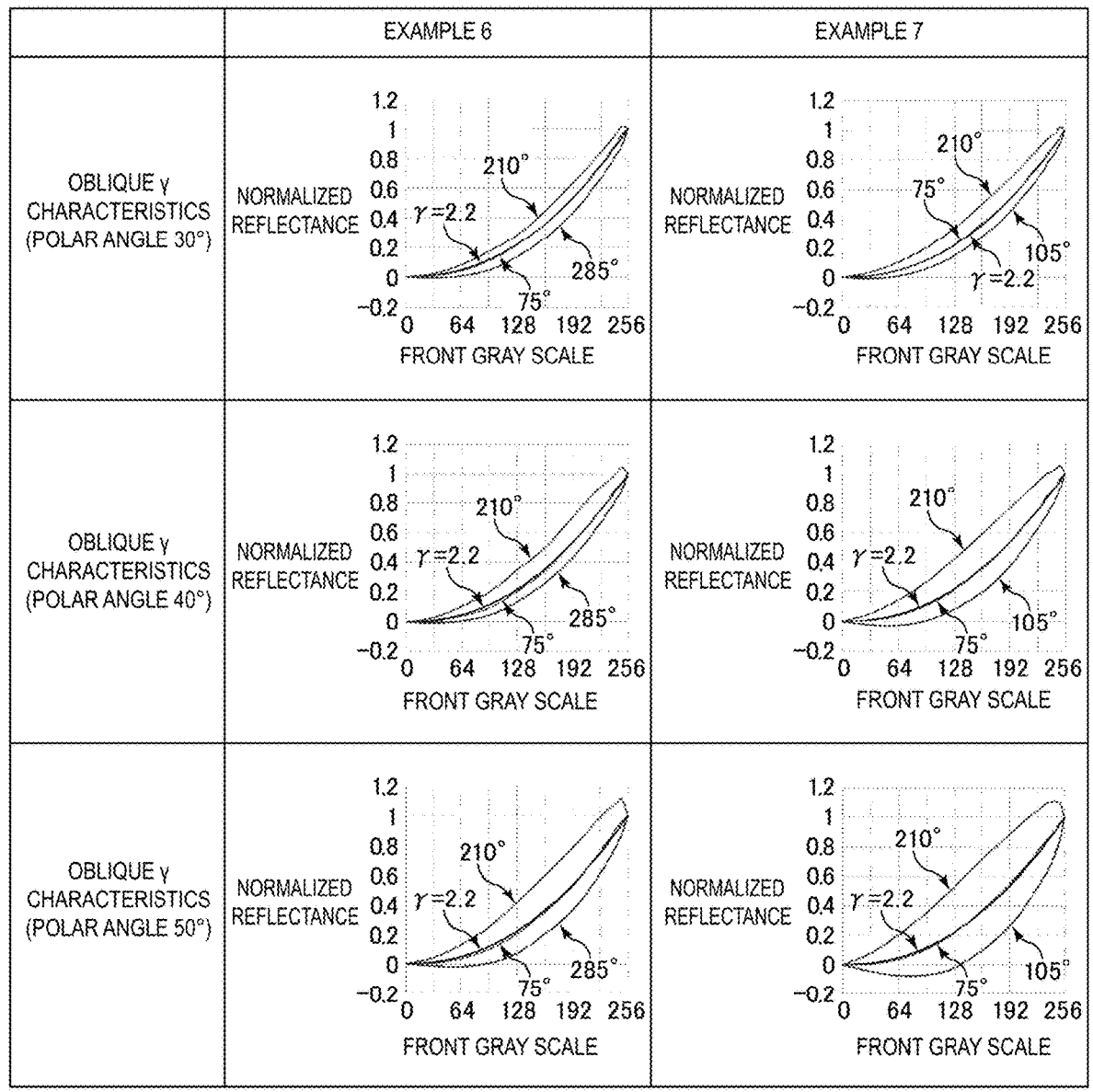
FIG. 43A is a diagram showing results in Examples 6 and 7.
Figure 43B:
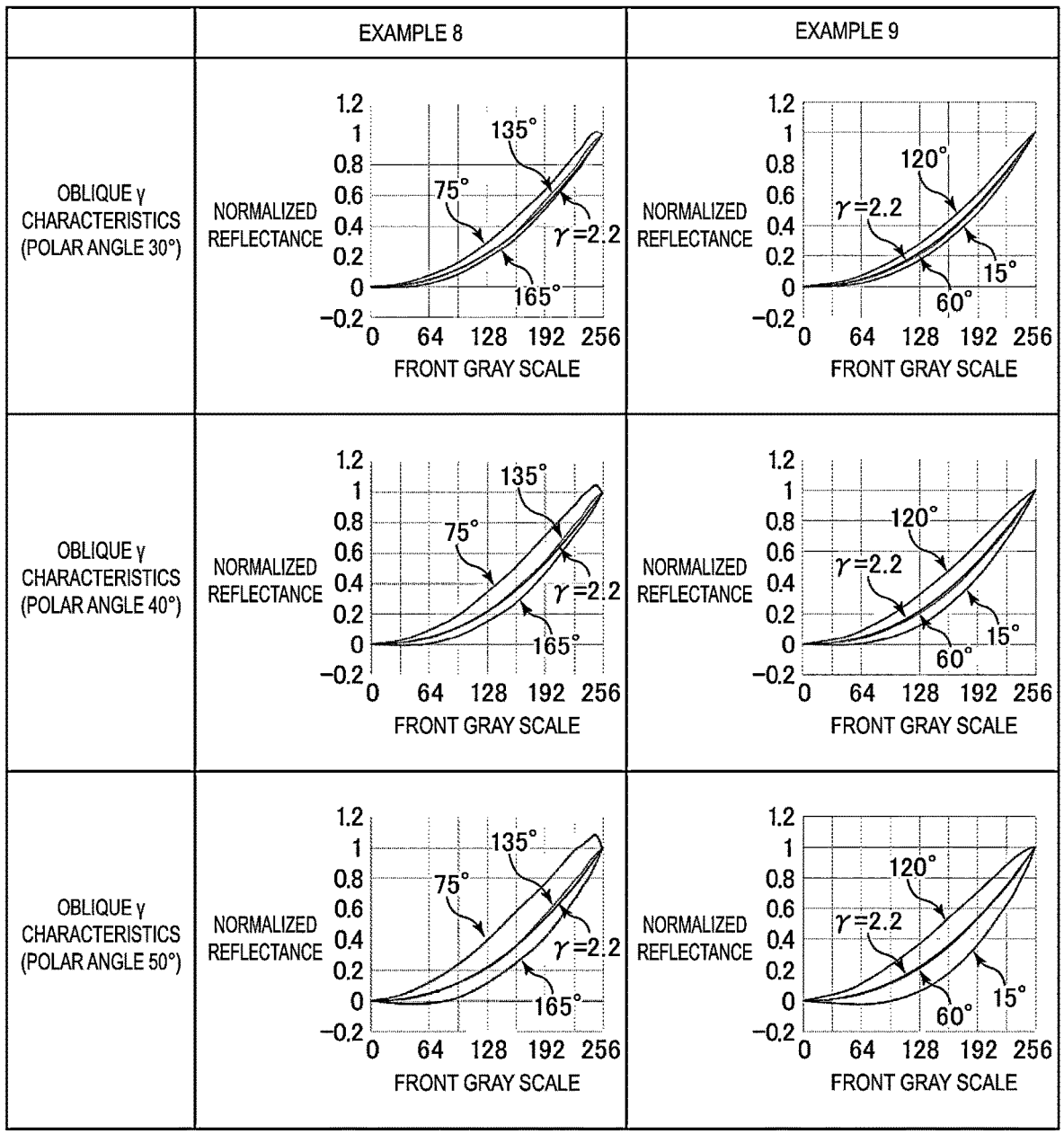
FIG. 43B is a diagram showing results in Examples 8 and 9.
Figure 43C:
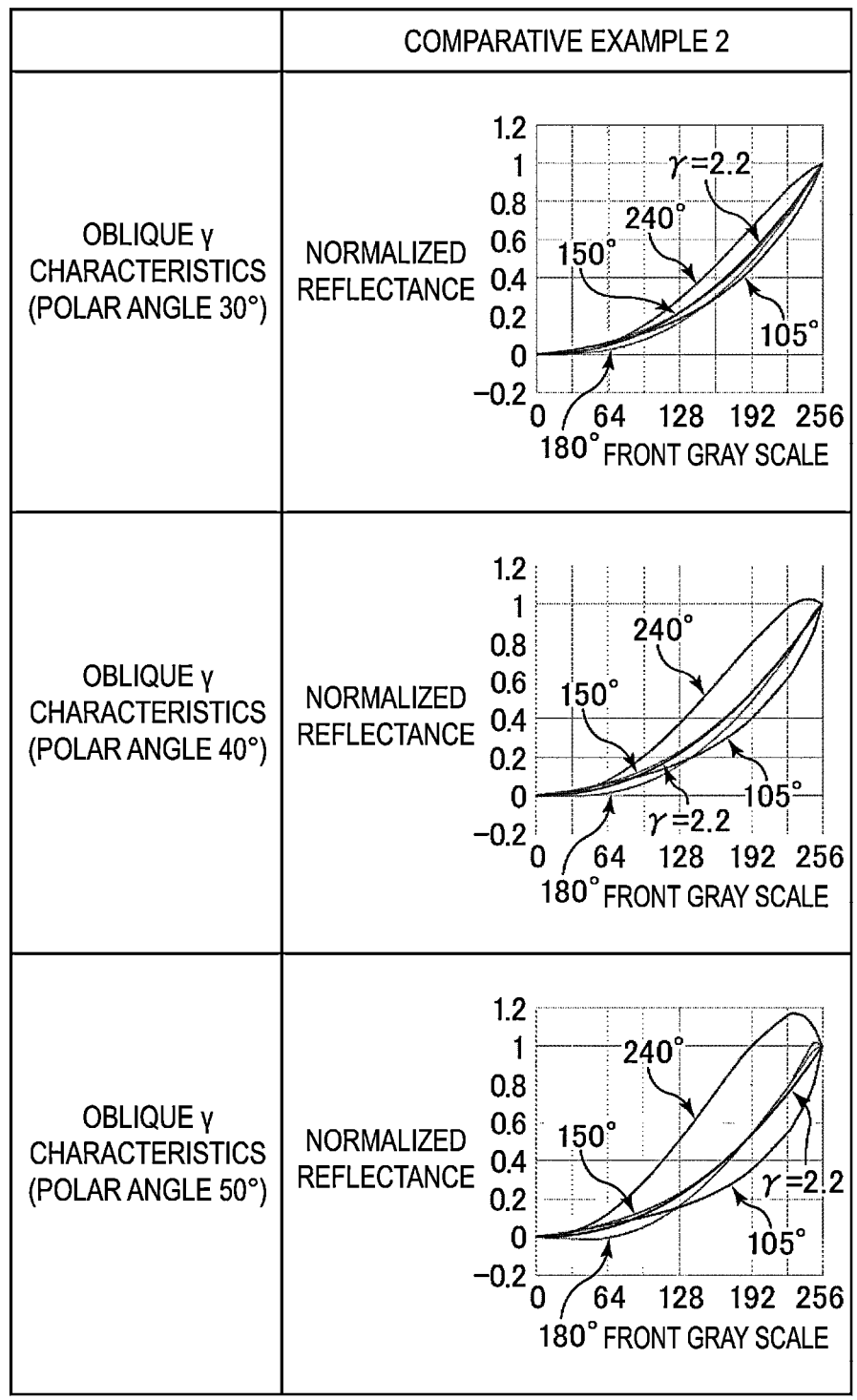
FIG. 43C is a diagram showing results in Comparative Example 2.

The polar angle was changed, and the γ curve was analyzed. The results are shown in FIGS. 43A to 43C. In each of these drawings, an upper graph shows a case where a polar angle is 30°, a middle graph shows a case where a polar angle is 40°, and a lower graph shows a case where a polar angle is 50°. In each of the graphs, the horizontal axis represents a gray scale (0 to 255 gray scale) in front view, and the vertical axis represents a normalized reflectance. FIGS. 43A to 43C also show the results in Examples 6 to 9 and Comparative Example 2.

From FIGS. 42A to 42C and FIGS. 43A and 43B, it was found that, in the positive-type liquid crystal materials (Examples 6 to 8), when the polar angle was 30°, oblique γ characteristics were substantially the same, but when the polar angle was 40° or more, the oblique γ characteristics became a problem in Example 7. However, from the comparison between Example 7 and Example 8, it was found that the oblique γ characteristics were improved by adding the positive C plate 43.

(f) Simulation Evaluation from Oblique Direction

Figure 44:
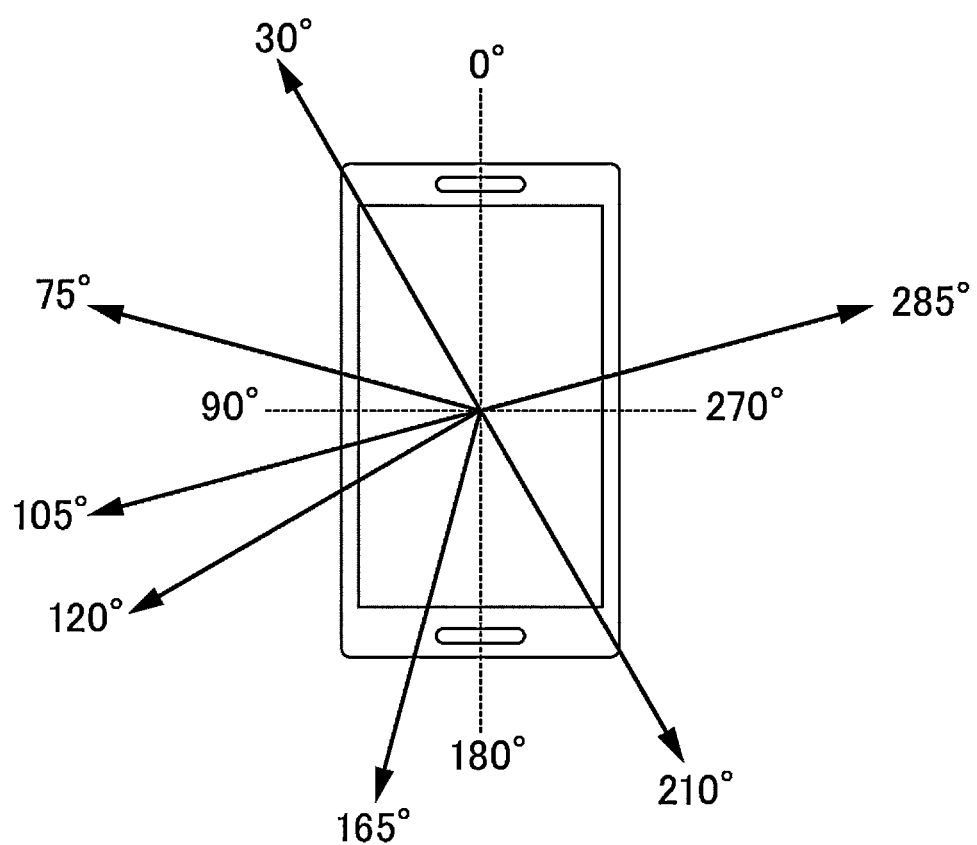
FIG. 44 is a diagram conceptually showing an azimuth angle.
Figure 45:
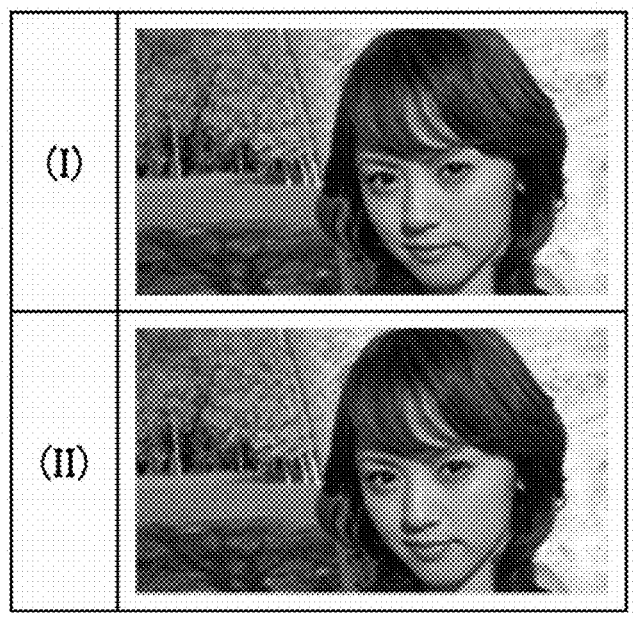
FIG. 45 is an image captured from the front.
Figure 46A:
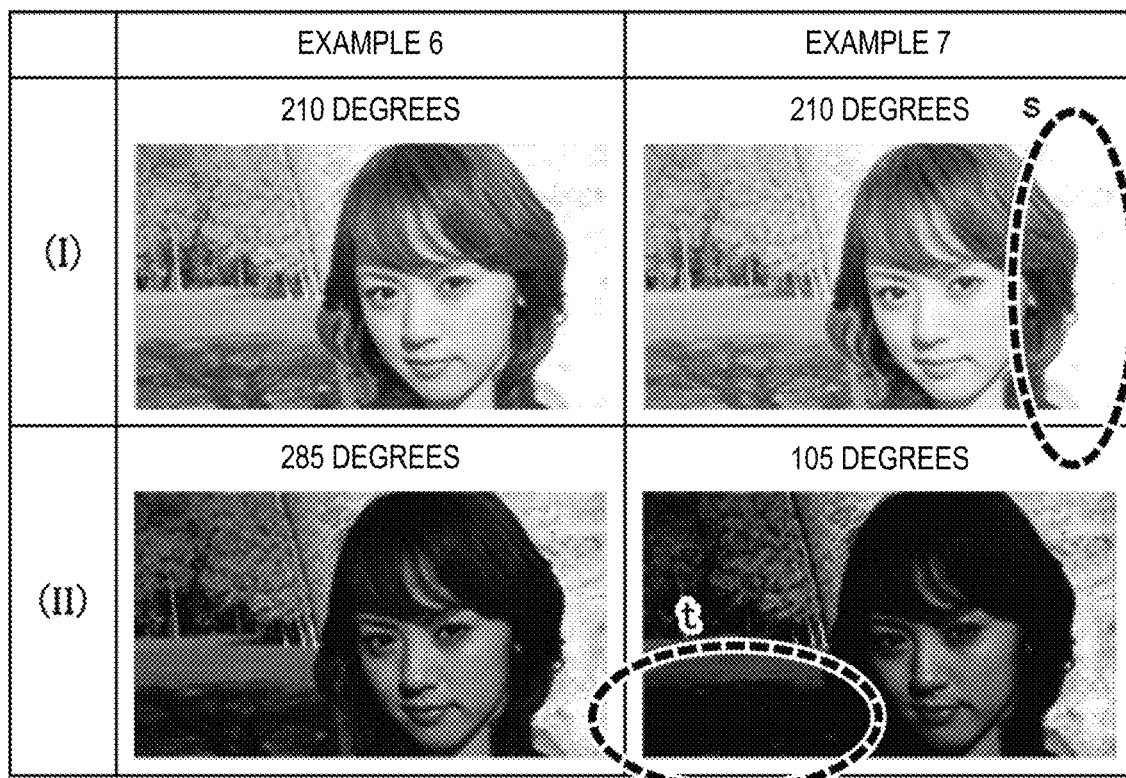
FIG. 46A is a diagram showing results in Examples 6 and 7.
Figure 46B:
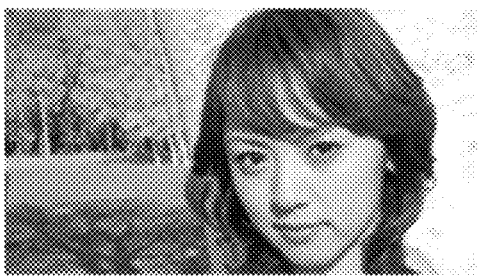
FIG. 46B is a diagram showing results in Examples 8 and 9.
Figure 46C:
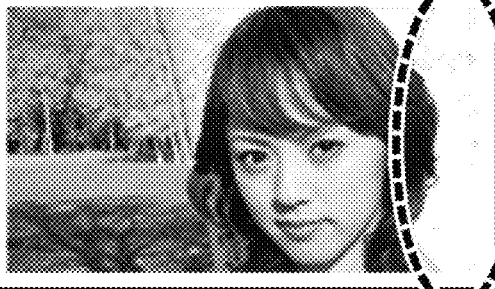
FIG. 46C is a diagram showing results in Comparative Example 2.

Relative evaluation of oblique γ characteristics was performed based on γ characteristics in front view, and an image simulation was performed when a display screen was viewed in an oblique direction. Specifically, a color original image was displayed on each test cell, and the displayed image was captured by a camera from each direction shown in FIG. 44 (captured from each direction and a polar angle of 50 degrees). The results are shown in FIGS. 46A to 46C. For comparison, an image captured from the front (also referred to as an original image) is shown in FIG. 45. FIG. 44 is a diagram conceptually showing an azimuth angle, FIG. 45 is an image captured from the front, and FIGS. 46A to 46C are diagrams showing the results in Examples 6 to 9 and Comparative Example 2.

In FIG. 45 and FIGS. 46A to 46C, a simulation image in which an image is most floated and the azimuth (angle) thereof are shown in a column (I), and a simulation image in which an image is most sunk and the azimuth (angle) thereof are shown in a column (II). "Image floating" means that a gray scale is higher than that of the front, and "image sinking" means that a gray scale is lower than that of the front.

From FIGS. 46A to 46C, among Examples 6 to 9 and Comparative Example 2, Example 8 was the most well-balanced example in terms of three points of whitening, blackening, and natural color tone (chroma of face color or the like). Whitening refers to a phenomenon in which bright areas become bright uniformly, and for example, when a change in γ curve is smaller than in the case of γ=2.2, an image will be floated and the whitening will increase. Blackening refers to a phenomenon in which dark areas become dark uniformly, and for example, when a change in γ curve is larger than in the case of γ=2.2, an image will be sunk and the blackening will increase. For example, in Comparative Example 2, whitening is large (see s in FIG. 46C) in the simulation image in which the image is most floated, and the face color of a person is unnatural (see FIG. 46C) in the simulation image in which the image is most sunk.

In FIGS. 46A and 46B, it was found from the comparison between Example 7 and Example 8 that the addition of the positive C plate 43 suppressed the whitening and the blackening (see s and t in FIG. 46A).

Each aspect of the disclosure described above may be combined as appropriate without departing from the gist of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a first substrate, a liquid crystal layer, a second substrate, a retardation layer, and a polarizer in this order from a back face side, the liquid crystal display device comprising:
    a plurality of pixels arrayed in a matrix shape,
    wherein the first substrate includes a reflective layer that reflects light, a first electrode and a second electrode that are configured to generate a transverse electrical field in the liquid crystal layer, and a first horizontal alignment film that is in contact with the liquid crystal layer,
    the second substrate includes a second horizontal alignment film that is in contact with the liquid crystal layer,
    the retardation layer includes a λ/4 plate and a λ/2 plate,
    the liquid crystal layer includes a positive-type liquid crystal material or a negative-type liquid crystal material, and has a twist alignment when no voltage is applied,
    an angle formed by a polarization axis of the polarizer and an alignment direction of liquid crystal molecules defined by the first horizontal alignment film is 63.5° or more and 71.5° or less when the liquid crystal layer includes the positive-type liquid crystal material, and
    the angle formed by the polarization axis of the polarizer and the alignment direction of the liquid crystal molecules defined by the first horizontal alignment film is 20.5° or more and 26° or less when the liquid crystal layer includes the negative-type liquid crystal material.

2. The liquid crystal display device according to claim 1, wherein the retardation layer further includes a positive C plate, and
    the positive C plate is located between the λ/4 plate and the λ/2 plate.

3. The liquid crystal display device according to claim 1, wherein the retardation layer further includes a positive C plate, and
    an absolute value of a thickness direction retardation Rth (nm) of the positive C plate is 150 nm to 270 nm.

4. The liquid crystal display device according to claim 1, wherein the retardation layer further includes a first positive C plate and a second positive C plate, and
    the second positive C plate is located between the λ/2 plate and the polarizer.

5. The liquid crystal display device according to claim 4, wherein an absolute value of a thickness direction retardation Rth (nm) of the second positive C plate is 50 nm to 130 nm.

6. The liquid crystal display device according to claim 1, wherein a twist angle of the liquid crystal layer when no voltage is applied is 70° or more and 85° or less.

7. The liquid crystal display device according to claim 1, wherein, when the liquid crystal layer includes the positive-type liquid crystal material, a product (dΔn) of a thickness d of the liquid crystal layer and a birefringence index Δn of the liquid crystal material is 218 nm or more and 255 nm or less.

8. The liquid crystal display device according to claim 1, wherein, when the liquid crystal layer includes the positive-type liquid crystal material, an angle formed by an in-plane slow axis of the λ/2 plate and the alignment direction of the liquid crystal molecules defined by the first horizontal alignment film is 47.5° or more and 52.5° or less.

9. The liquid crystal display device according to claim 1, wherein, when the liquid crystal layer includes the negative-type liquid crystal material, a product (dΔn) of a thickness d of the liquid crystal layer and a birefringence index Δn of the liquid crystal material is 230 nm or more and 260 nm or less.

10. The liquid crystal display device according to claim 1, wherein, when the liquid crystal layer includes the negative-type liquid crystal material, an angle formed by an in-plane slow axis of the λ/2 plate and the alignment direction of the liquid crystal molecules defined by the first horizontal alignment film is 38.5° or more and 42.5° or less.

11. The liquid crystal display device according to claim 1, wherein at least one of the first electrode and the second electrode includes a plurality of strip portions and a slit located between two strip portions adjacent to each other among the plurality of strip portions.

12. The liquid crystal display device according to claim 1, wherein the liquid crystal layer is a single domain alignment.

13. The liquid crystal display device according to claim 1, wherein the liquid crystal display device displays in a normally black mode.

14. The liquid crystal display device according to claim 1, wherein one of the first electrode and the second electrode is a pixel electrode provided in each of the plurality of pixels and another one of the first electrode and the second electrode is a common electrode including a plurality of segments, each configured to function as a touch sensor electrode, and the first substrate further includes a plurality of touch wiring lines, each connected to a corresponding one of the touch sensor electrodes.

15. The liquid crystal display device according to claim 1, wherein the first substrate further includes a thin film transistor provided in each of the plurality of pixels and including an oxide semiconductor layer, and the oxide semiconductor layer includes an In—Ga—Zn—O-based semiconductor.

16. The liquid crystal display device according to claim 1, further comprising a light source.

* * * * *